(12) United States Patent
Feke et al.

(10) Patent No.: US 10,641,963 B2
(45) Date of Patent: May 5, 2020

(54) POLARIZATION-BASED FILTER STABILIZATION OF BROADBAND LIGHT SOURCES

(71) Applicant: The Charles Stark Draper Laboratory, Inc., Cambridge, MA (US)

(72) Inventors: Gilbert D. Feke, Windham, NH (US); Susannah M. Dickerson, Watertown, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 0 days.

(21) Appl. No.: 15/965,821

(22) Filed: Apr. 27, 2018

(65) Prior Publication Data

US 2018/0329143 A1    Nov. 15, 2018

Related U.S. Application Data

(60) Provisional application No. 62/491,098, filed on Apr. 27, 2017.

(51) Int. Cl.
*G02B 6/27* (2006.01)
*G02B 6/293* (2006.01)
(Continued)

(52) U.S. Cl.
CPC ......... *G02B 6/2706* (2013.01); *G01C 19/721* (2013.01); *G02B 6/29325* (2013.01);
(Continued)

(58) Field of Classification Search
CPC .................................................... G02B 6/2706
See application file for complete search history.

(56) References Cited

U.S. PATENT DOCUMENTS

| 3,327,243 A | 6/1967 | Stickley |
| 3,361,990 A | 1/1968 | Gordon et al. |

(Continued)

OTHER PUBLICATIONS

Non-Final Office Action, U.S. Appl. No. 15/965,087, 12 pages, dated Jan. 15, 2019.

(Continued)

*Primary Examiner* — Sung H Pak
(74) *Attorney, Agent, or Firm* — Hamilton, Brook, Smith & Reynolds, P.C.

(57) ABSTRACT

A broadband light source apparatus, and corresponding method, includes a broadband light source configured to provide broadband source light characterized by a source wavelength spectrum. The apparatus also includes a broadband optical filter including both a polarization changer with a length, as well as an exit polarizer. The broadband optical filter receives the source light and delivers broadband output light characterized by an output wavelength spectrum that is a function of the source wavelength spectrum and the polarization changer length and has an output centroid wavelength. The polarization changer length is configured to minimize a thermal sensitivity of the output centroid wavelength. The filter can be configured in view of a particular source wavelength spectrum to thermally stabilize the centroid wavelength and to maximize relative integrated output power passively with respect to ambient temperature fluctuations.

22 Claims, 60 Drawing Sheets

(51) Int. Cl.
  *G01C 19/72* (2006.01)
  *H04B 10/572* (2013.01)
  *G02B 27/28* (2006.01)
  *G02F 1/01* (2006.01)
  *G02F 1/09* (2006.01)

(52) U.S. Cl.
  CPC ..... *G02B 6/29352* (2013.01); *G02B 6/29389* (2013.01); *G02B 27/288* (2013.01); *G02F 1/0136* (2013.01); *G02F 1/09* (2013.01); *H04B 10/572* (2013.01); *G02B 6/2746* (2013.01); *G02B 6/29398* (2013.01); *G02F 2203/21* (2013.01)

(56) References Cited

U.S. PATENT DOCUMENTS

| | | | |
|---|---|---|---|
| 3,962,578 | A | 6/1976 | Roschen |
| 4,309,604 | A | 1/1982 | Yoshikawa et al. |
| 4,887,900 | A | 12/1989 | Hall |
| 5,177,562 | A | 1/1993 | Wysocki et al. |
| 5,313,480 | A | 5/1994 | Fidric |
| 5,875,203 | A * | 2/1999 | Wagener ............ H01S 3/06795 372/1 |
| 6,097,743 | A | 8/2000 | Alphonse |
| 6,108,086 | A | 8/2000 | Michal et al. |
| 6,144,788 | A | 11/2000 | Ang |
| 6,169,832 | B1 | 1/2001 | McLandrich |
| 6,212,323 | B1 | 4/2001 | Harpin |
| 6,347,007 | B1 | 2/2002 | Grubb et al. |
| 6,373,048 | B1 | 4/2002 | Tschanun |
| 6,400,870 | B1 | 6/2002 | Hill et al. |
| 6,429,965 | B1 | 8/2002 | Falquier et al. |
| 6,483,628 | B1 | 11/2002 | Digonnet |
| 6,510,004 | B1 | 1/2003 | Wu |
| 6,563,970 | B1 | 5/2003 | Bohnert et al. |
| 6,678,293 | B2 | 1/2004 | Colace et al. |
| 6,744,793 | B2 | 6/2004 | Stoner et al. |
| 6,859,471 | B2 | 2/2005 | Gregory |
| 6,931,034 | B2 | 8/2005 | Khazaei et al. |
| 7,119,324 | B2 | 10/2006 | Voigt |
| 7,326,915 | B2 | 2/2008 | Kaluzhny |
| 7,348,583 | B2 | 3/2008 | Velez et al. |
| 7,580,441 | B2 | 8/2009 | Lee et al. |
| 8,254,416 | B2 * | 8/2012 | Park .................... H01S 3/06754 372/29.02 |
| 8,457,453 | B2 | 6/2013 | Lipson |
| 8,866,058 | B2 | 10/2014 | Voigt |
| 9,507,238 | B2 | 11/2016 | Khurgin et al. |
| 9,634,769 | B2 | 4/2017 | Liaw et al. |
| 9,683,830 | B2 * | 6/2017 | Qiu ........................ G01C 19/72 |
| 2004/0109225 | A1 | 6/2004 | Hu et al. |
| 2005/0036527 | A1 | 2/2005 | Khazaei et al. |
| 2006/0171633 | A1 | 8/2006 | Voigt |
| 2015/0188640 | A1 | 7/2015 | Liaw et al. |
| 2018/0197052 | A1 | 7/2018 | Yanson et al. |
| 2018/0314007 | A1 | 11/2018 | Feke et al. |
| 2018/0356228 | A1 | 12/2018 | Feke |

OTHER PUBLICATIONS

Chakraborty, S. and Kumari, S., "Simulation of transmission characteristics of birefringent filter using magneto-optic elements," J. Opt, vol. 44; No. 3; 281-289 (2015).

Wang, A., "High Stability Er-Doped Superfluorescent Fiber Source Improved by Incorporating Bandpass Filter," IEEE Photonics Technology Letters, vol. 23 No. 4, pp. 227-229 (Feb. 1, 2011).

Guha, B. et al., "Minimizing temperature sensitivity of silicon Mach-Zehnder interferometers," Optics Express, vol. 18; No. 3; 1879-1887 (2010).

Guha, B. et al., "Althermal silicon microring resonators with titanium oxide cladding," Optics Express, vol. 21; No. 22; 26557-26563 (2013).

Hiraki, T. et al., "Small sensivitivity to temperature variations of Si-photonic Mach-Zehnder interferometer using Si and SiN wavesguides," Frontiers in Materials, vol. 2; 1-5 (2015).

Kokubun, Y., "Athermal Waveguides and Temperature Insensitive Lightwave Devices," IEEE; 1143-1144 (1999).

Munin, E., "Analysis of a Tunable Bandpass Filter Based on Faraday Rotators," IEEE Transactions on Magnetics, vol. 32; No. 2; 316-319 (1996).

Tanobe, H. et al., "A Temperature Insensitive InGaAsP—InP Optical Filter," IEEE Photonics Technology Letters, vol. 8; No. 11; 1489-1491 (1996).

Tsuzuki, K. et al., "Temperature insensitive InGaAsP/InP optical filter integrated with dual photodiodes," Electronics Letters, vol. 33, No. 23; 1948-1949 (1997).

Uenuma, M. and Moooka, T, "Temperature-independent silicon waveguide optical filter," Optics Letters, vol. 34; No. 5; 599-601 (2009).

Xing, P. and Viegas, J., "Broadband CMOS-compatible SOI temperature insensitive Mach-Zehnder interferometer," Optics Express, vol. 23; No. 19; 24098-24107 (2015).

Lefèvre, H. C., The Fiber Optic Gyroscope, 2nd Edition, Boston: Artech House (2014).

Hall, D. C. et al., "High-stability Er3+-doped superfluorescent fiber sources," J. Lightwave Tech., vol. 13, No. 7, pp. 1452-1460, Jul. 1995.

First Sensor, WS Series Data Sheet, US Order No. 10-044; International Order No. 500008; 4 pages [Downloaded on Jun. 26, 2012].

First Sensor, First Sensor WS PD Data Sheet, Part Description WS7.56 TO, Order No. 3001222; 4 pages [downloaded Feb. 14, 2018].

International Search Report and Written Opinion, issued in International Application No. PCT/US2018/030038, filed Apr. 27, 2018, entitled "Polarization-Based Filter Stabilization of Broadband Light Sources," dated Aug. 10, 2018, 17 pages.

Gaiffe, T.P., "Wavelength stabilization of an erbium-doped fiber source with a fiber Bragg grating fir high-accuracy FOG," SPIE's International Symposium on Optical Science, 375-380 (1996).

Final Office Action for U.S. Appl. No. 15/965,087 dated Jul. 1, 2019.

Chaves, et al., "Strain and Temperature Characterization of LPGs Written by CO2 Laser in Pure Silica LMA Photonic Crystal Fibers," Photonic Sensors, vol. 5, No. 3, pp. 241-250 (2015).

Gao, et al., "Temperature compensated microfiber Bragg gratings," Optics Express, vol. 20, No. 16 (Jul. 30, 2012).

Kamikawachi, et al., "Nonlinear Temperature Dependence of Etched Fiber Bragg Gratings," IEEE Sensors Journal, vol. 7, No. 9 (Sep. 2007).

Kim, et al., "A Temperature-Insensitive Cladding-Etched Fiber Bragg Grating Using a Liquid Mixture with a Negative Thermp-Optic Coefficient," Sensors, No. 12, pp. 7886-7892 (2012).

Madhavan, et al., "Temperature and Strain Sensitivity of Long Period Grating Fiber Sensor: Review," IJRET, vol. 4, Issue 2 (Feb. 2015).

Shu, et al., "Sensitivity Characteristics of Long-Period Fiber Gratings," Journal of Lightwave Technology, vol. 20, No. 2 (Feb. 2002).

Notice of Allowance for U.S. Appl. No. 15/965,087 dated Aug. 5, 2019.

Non-Final Office Action for U.S. Appl. No. 15/965,087 entitled "Stabilized Broadband Light Source Apparatus and Methods", dated Oct. 31, 2019.

Texas Instruments Incorporated "Single-Supply, High-Speed, Precision Logarithmic Amplifier", LOG114, Texas Instruments, SBOS301A, Mar. 2007, consisting of 30 pages.

Winters et al. "Adaptive Nonlinear Cancellation for High-Speed-Fiber-Optic Systems", Journal of Lightwave Technology, vol. 10, No. 7, Jul. 1992, consisting of 7 pages.

\* cited by examiner

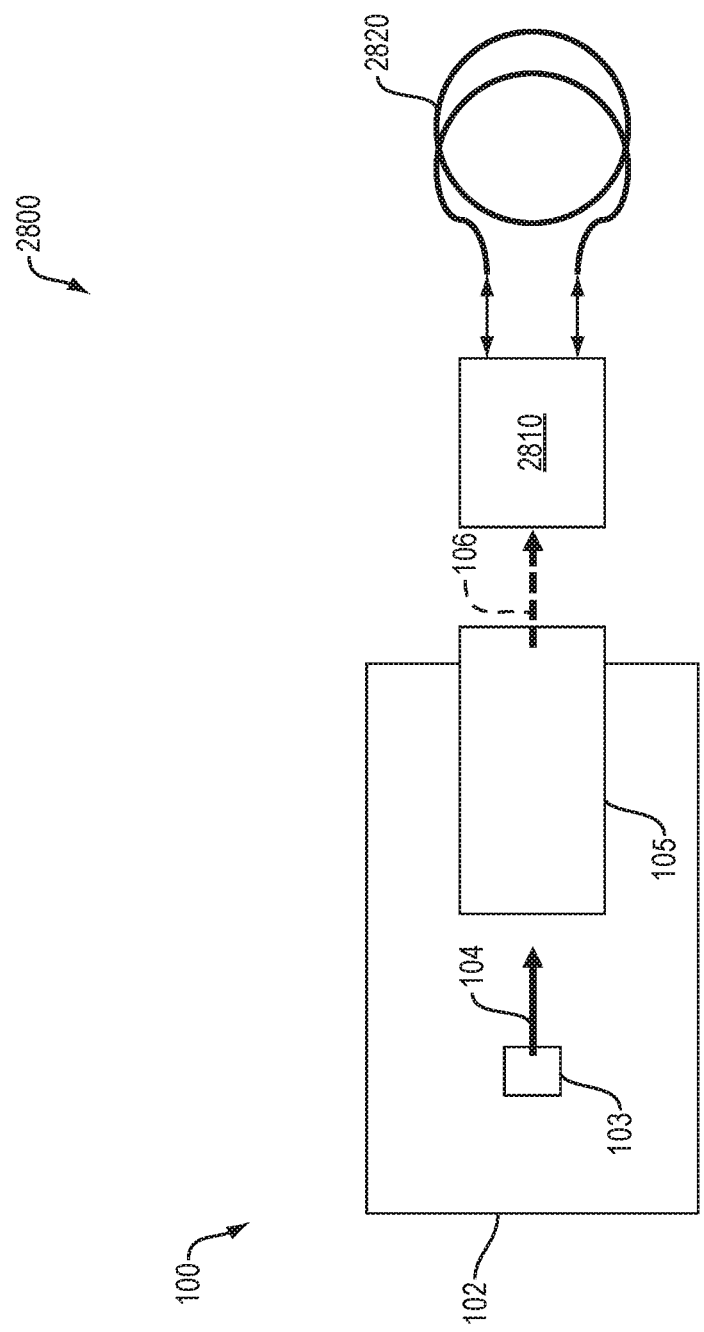

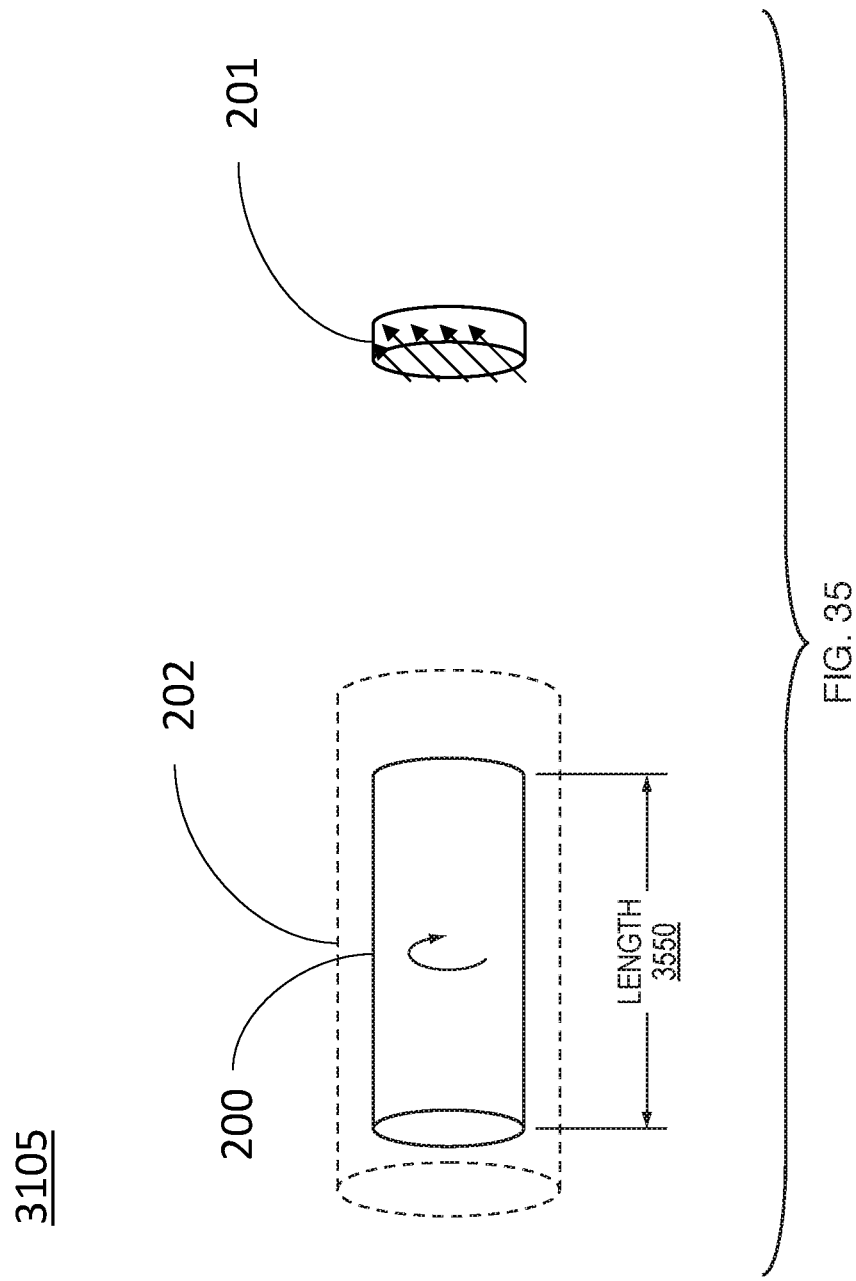

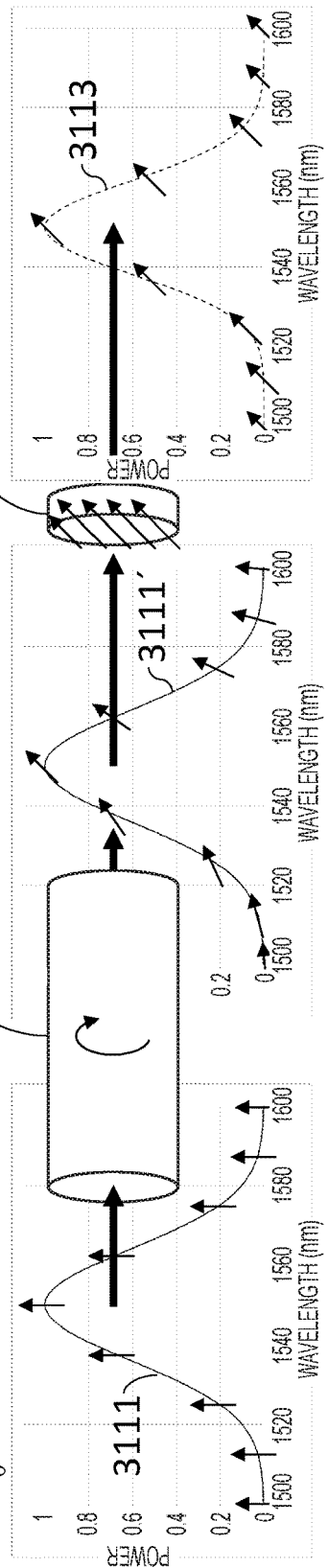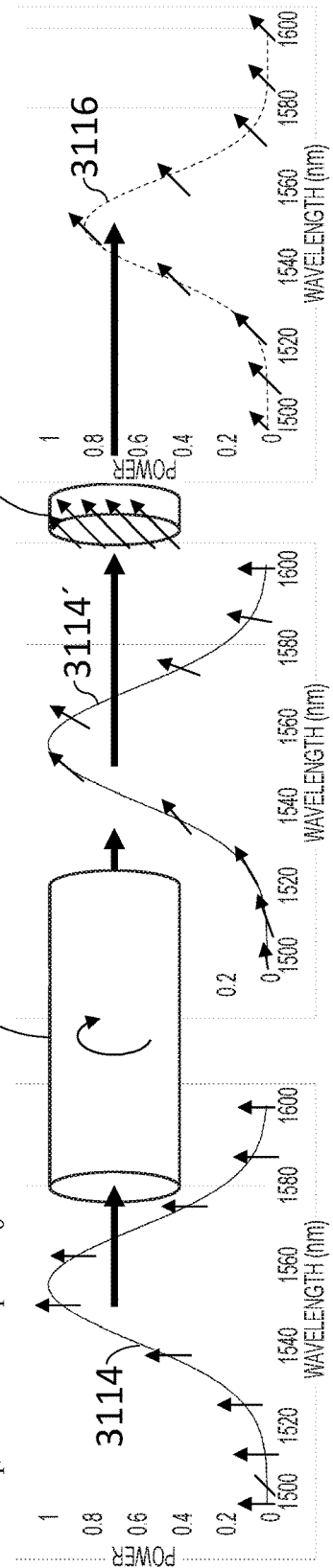
FIG. 37A
FIG. 37B

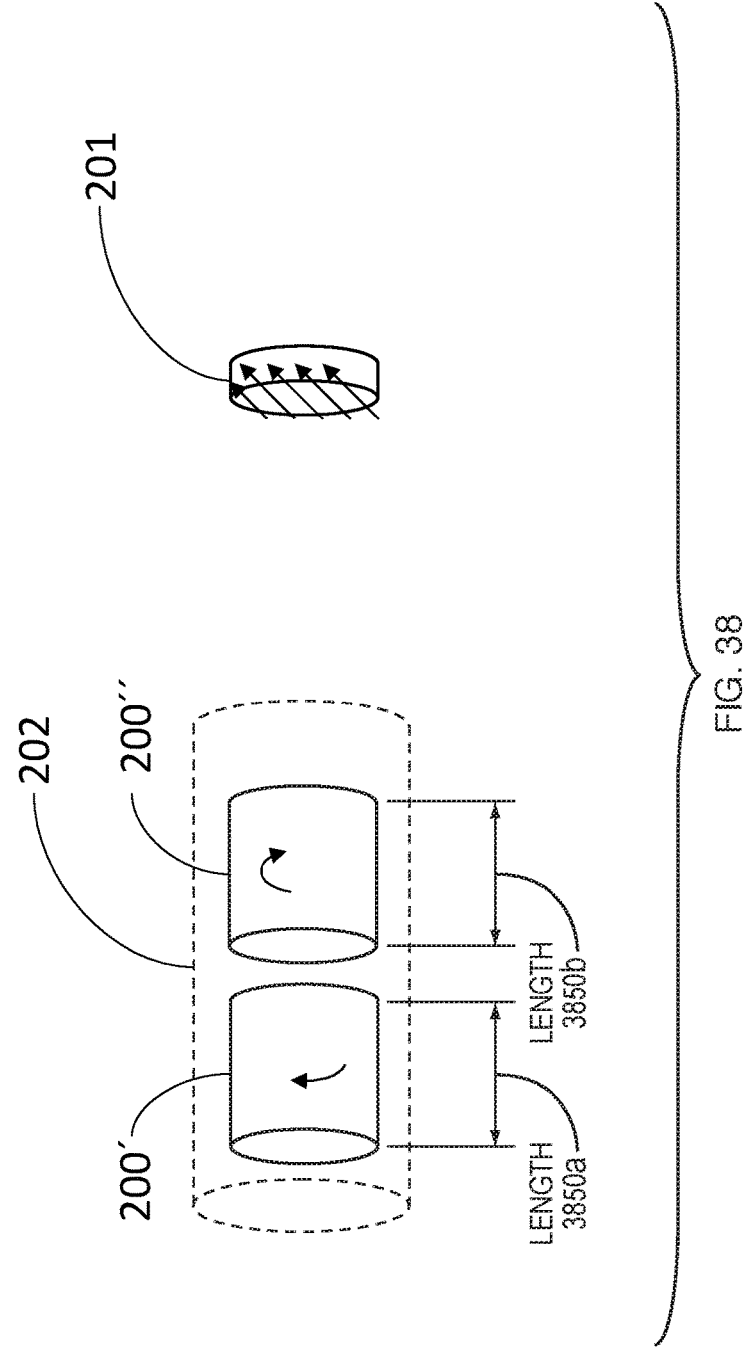

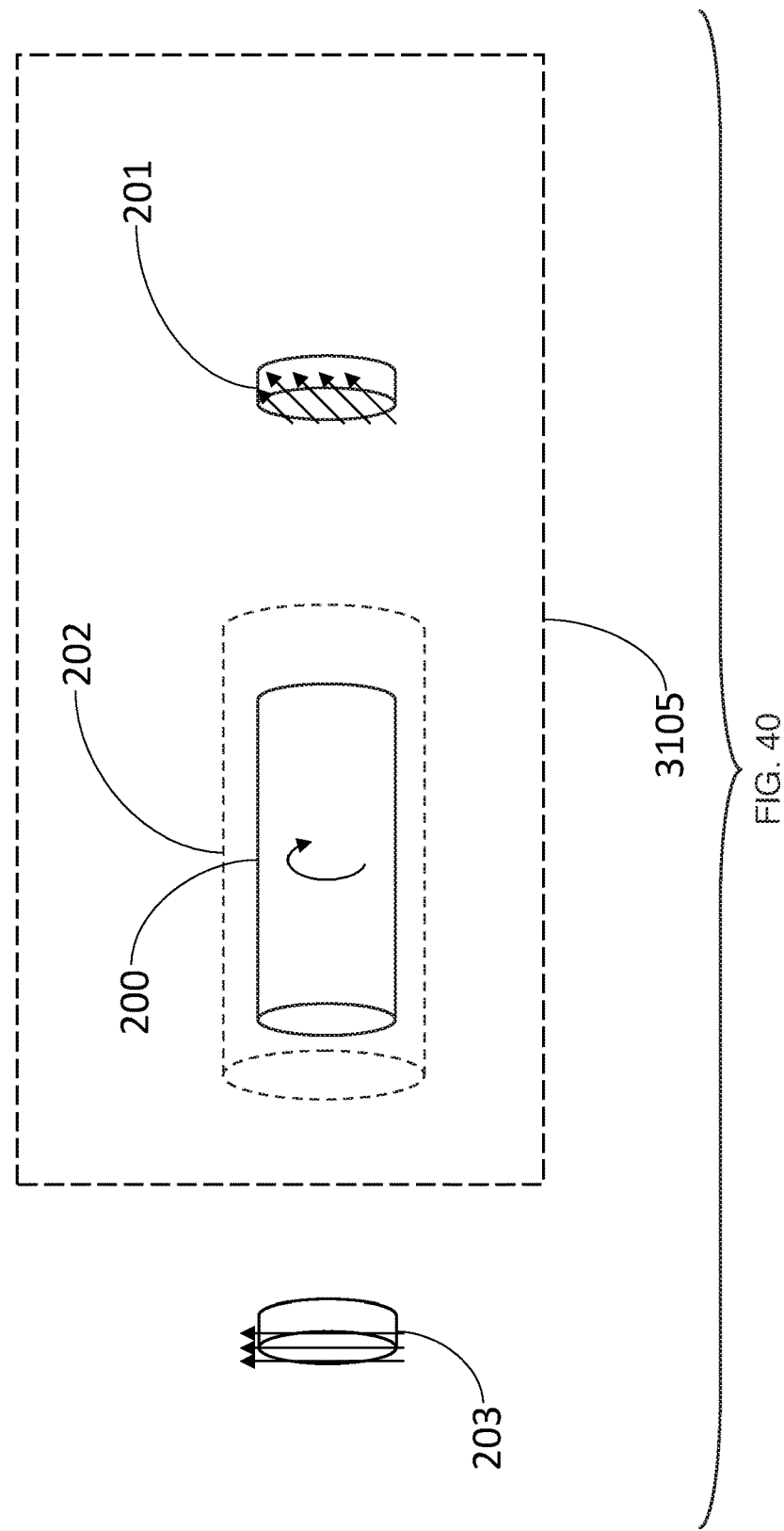

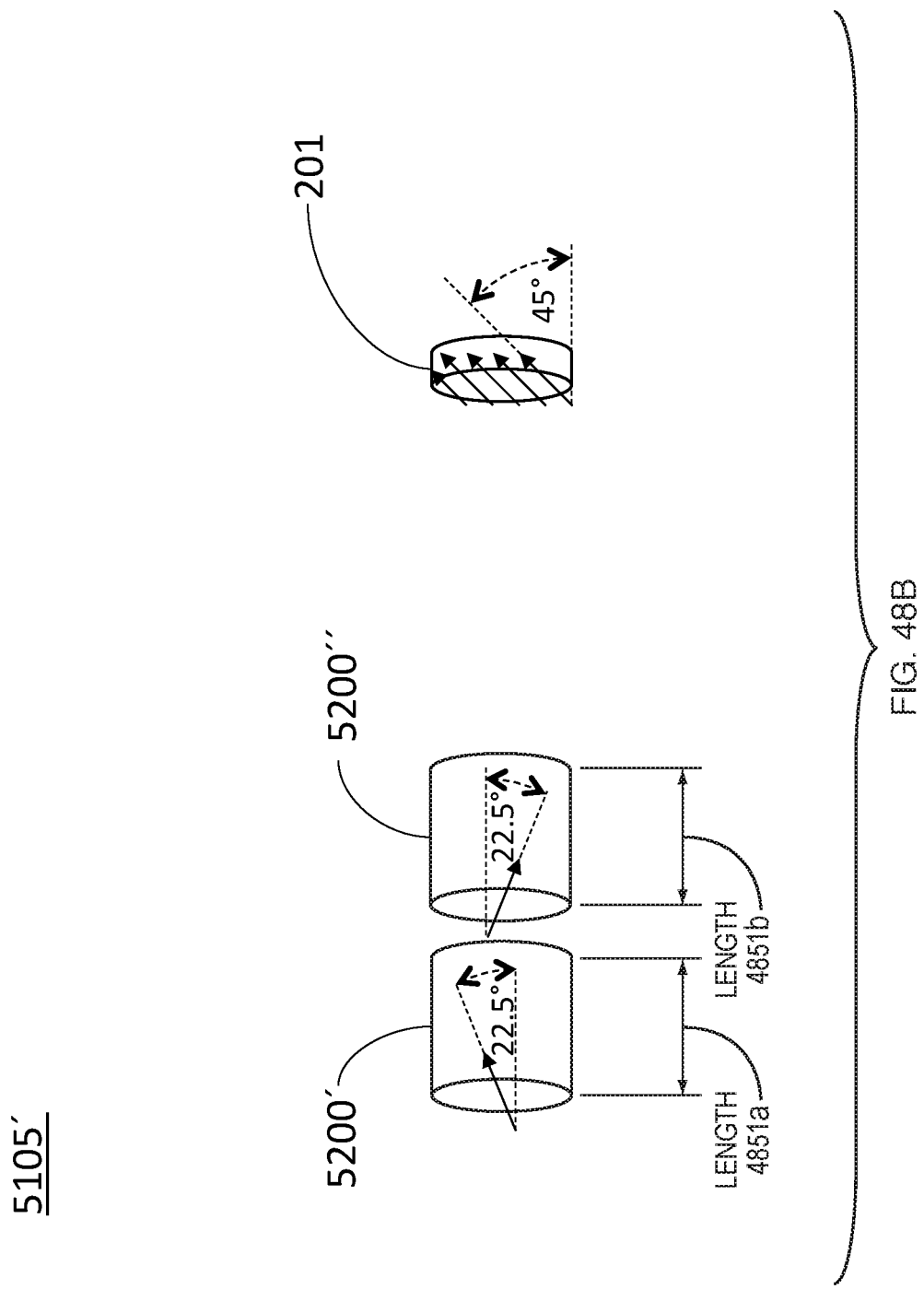

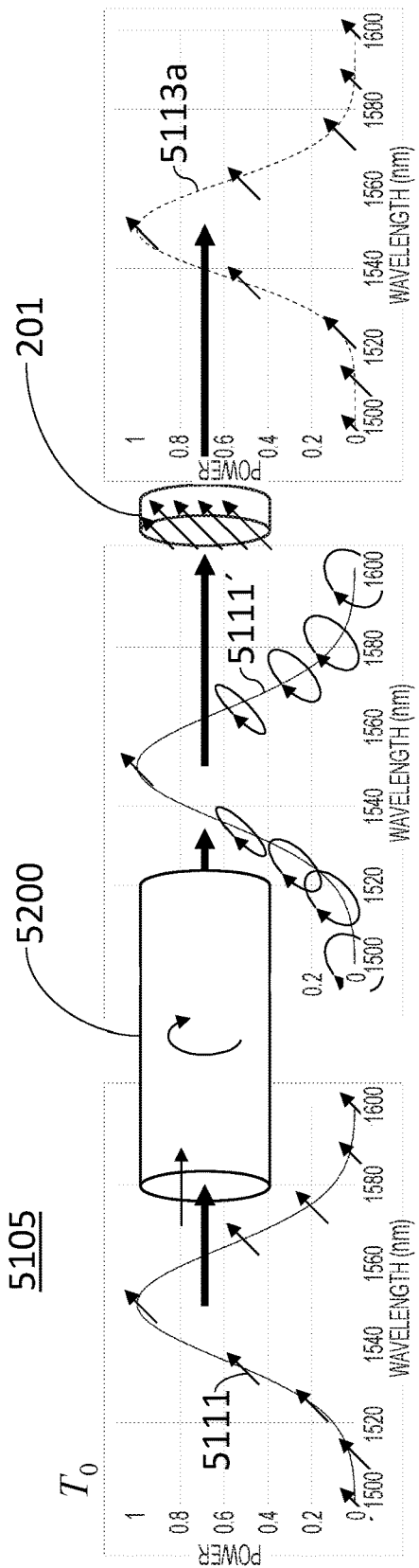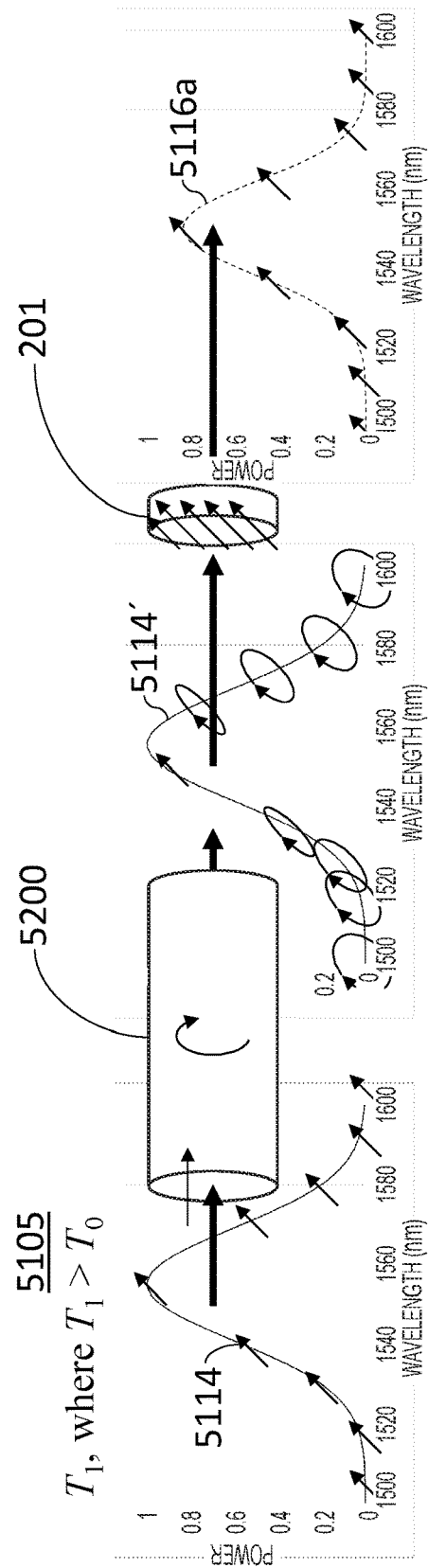
FIG. 49A
FIG. 49B

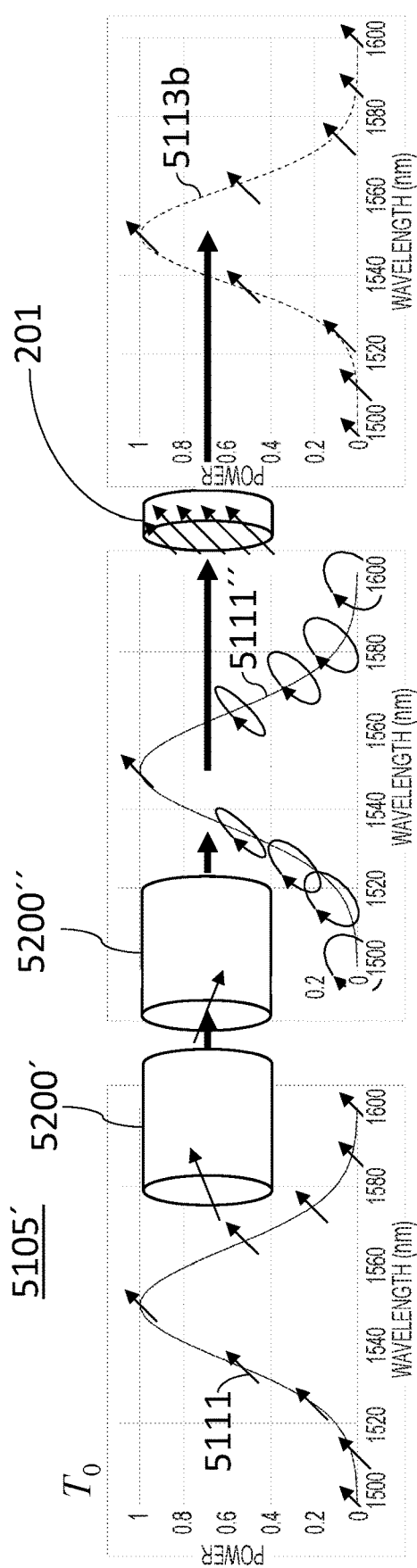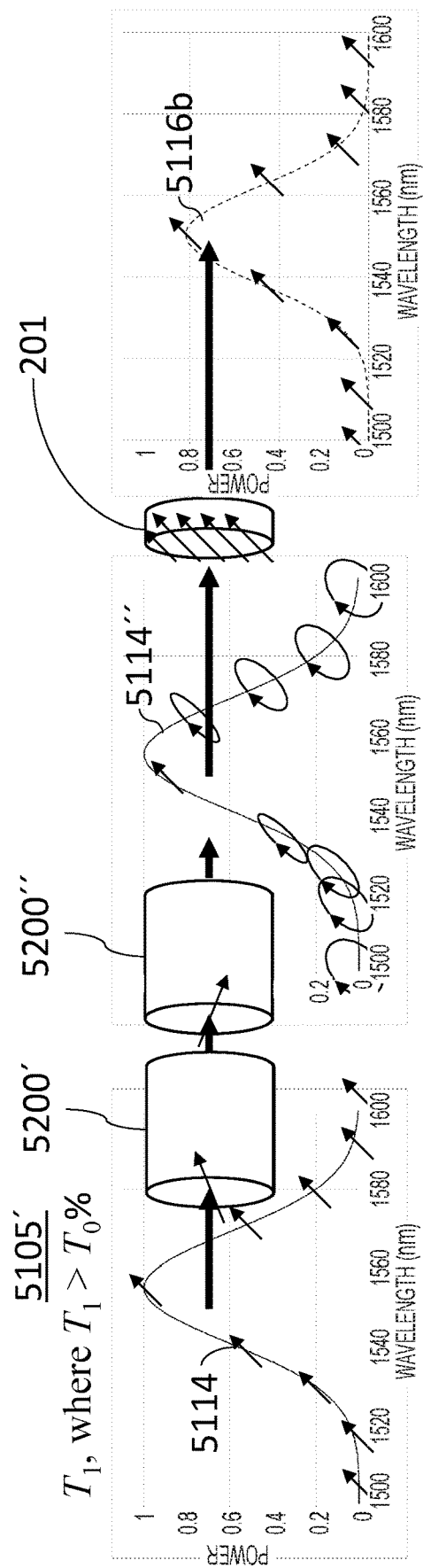
FIG. 50A
FIG. 50B

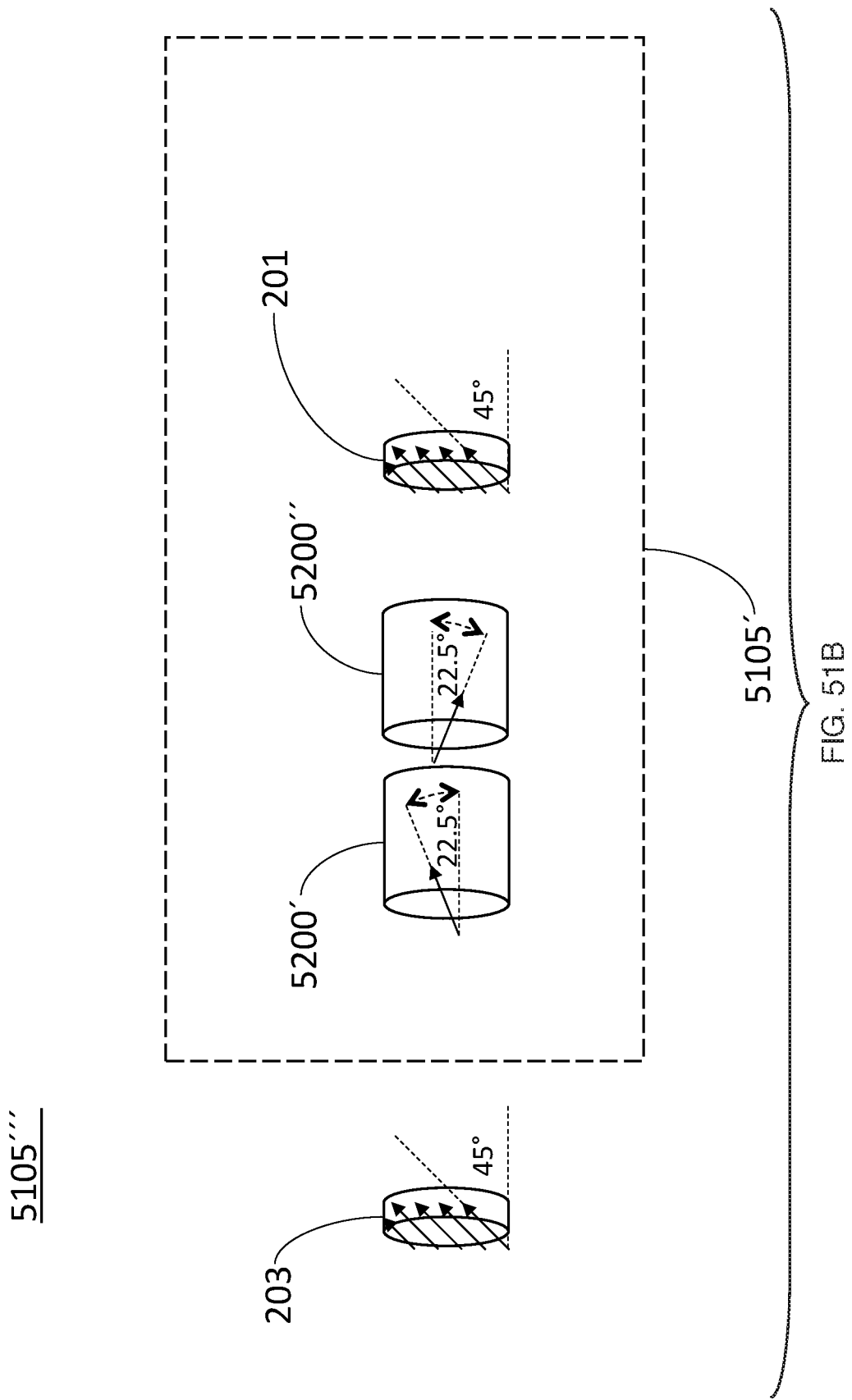

POLARIZATION-BASED FILTER STABILIZATION OF BROADBAND LIGHT SOURCES

RELATED APPLICATION

This application claims the benefit of U.S. Provisional Application No. 62/491,098, filed on Apr. 27, 2017. The entire teachings of the above Application are incorporated herein by reference.

GOVERNMENT SUPPORT

This invention was made with government support under Contract # HQ0147-17-C-0046 from Missile Defense Agency. The government has certain rights in the invention.

FIELD

This disclosure relates generally to light sources and more particularly to optical filtering and polarization-based optical filtering for a passively wavelength stabilized broadband light source apparatus and method for delivering output light with stabilized output centroid wavelength.

BACKGROUND

Broadband light sources, for example light sources with full width at half maximum (FWHM) bandwidth of about 5 nm or greater, are well known in the art and are used in a variety of applications. In particular, broadband light sources such as superluminescent diodes (SLDs), rare-earth-doped superluminescent sources (REDSLSs), and light emitting diodes (LEDs) are useful in applications related to interferometry to avoid coherence noise effects.

In one example application of broadband light sources, fiber optic gyroscopes (FOGs) use the interference of light to measure angular velocity, as known in the art. Rotation is sensed in a FOG with a large coil of optical fiber forming a Sagnac interferometer as described for example in H. C. Lefèvre, The Fiber Optic Gyroscope, 2nd Edition, Boston: Artech House (2014). The induced phase shift between the counterpropagating light waves injected in the sensor coil is proportional to the rotation rate. The proportionality constant, called "scale factor," is given by $2\pi LD/\bar{\lambda}c$, where L is the length of the fiber coil, D is the diameter of the fiber coil, c is the speed of light in vacuum, and $\bar{\lambda}$ is the average, or centroid, wavelength of the light waves propagating in the coil. The centroid wavelength is defined by equation 1:

$$\bar{\lambda} = \frac{\int \lambda\, P(\lambda) d\lambda}{\int P(\lambda) d\lambda}$$

where $\lambda$ is the wavelength of the spectral components of the light waves, and $P(\lambda)$ is the optical power as a function of $\lambda$, that is, the spectral distribution of the light waves. Hence the accuracy of the gyroscope is limited by the accuracy with which $\bar{\lambda}$ of the light source is known. In particular, for FOGs to be useful in certain navigation applications, the $\bar{\lambda}$ must be known to an accuracy of 10 parts per million (ppm) or better over a range of ambient temperature $\Delta T$ that can span up to 10° C. or more, that is $$\frac{1}{\bar{\lambda}} \frac{\Delta \bar{\lambda}}{\Delta T} = \frac{1}{\bar{\lambda}} \alpha < 10^{-6} \frac{1}{°C}$$

where the thermal sensitivity of the centroid wavelength is defined as $\alpha \equiv \Delta\bar{\lambda}/\Delta T$.

Broadband light sources are particularly advantageous for introducing the light into the sensor coil because phase coherent noise effects due to backscattering noise and polarization coupling is suppressed, the residual intensity noise (RIN) of the FOG decreases with increasing bandwidth, and the zero-rotation drift induced through the Kerr effect by relative variations in the two counterpropagating optical powers is reduced. Such effects would otherwise cause significant reduction in rotation sensitivity and accuracy. The relatively small size, low power consumption and low cost of SLDs are advantageous for many FOG applications. However, the inherent thermal sensitivity of the centroid wavelength $\alpha_{SOURCE}$ of SLDs is typically +250 to +400 ppm/° C., which is problematic for certain FOG applications even when thermoelectric cooling devices and other temperature compensation components, circuits and techniques are utilized. Consequently, REDSLSs, such as erbium-doped fiber amplifiers, having significantly lower centroid wavelength thermal sensitivity, have tended to find application in FOGs. For example, in D. C. Hall et al., "High-stability $Er^{3+}$-doped superfluorescent fiber sources," *J. Lightwave Tech.*, Vol. 13, No. 7, pp. 1452-1460, July 1995, a centroid wavelength thermal sensitivity of 3-5 ppm/° C. is reported for an erbium-doped fiber amplifier type REDSLS.

In addition to FOGs, other optical sensors and measuring devices as known in the art, such as accelerometers, pressure sensors, strain sensors, temperature sensors, profilometers, fiber optic link test equipment, and optical coherence tomography systems, provide applications for which broadband light sensors enjoy utility and wherein the accuracy of the centroid wavelength is critical to performance. Various strategies for wavelength stabilization against environmental factors, such as ambient temperature, have been invoked to improve centroid wavelength accuracy. These strategies include both active and passive stabilization methods.

SUMMARY

Applicants have recognized a need for an improved wavelength-stabilized broadband light source apparatus and method. Existing active wavelength stabilization approaches, for example, require a relatively complicated set-up using accordingly relatively expensive components and/or a high computation power to numerically compensate inaccuracies and/or bring about high losses, which makes a solution with a small form factor and no additional electronics difficult to realize.

Existing passive wavelength stabilization strategies that invoke broadband optical filters for filtering broadband sources are subject to undesirable compromises in the overall performance of the broadband light source with regard to reduced optical power and reduced bandwidth.

Embodiment apparatus and methods provide significant advantages over prior stabilization solutions, in that wavelength stabilization of broadband light sources can be achieved with less degradation of transmitted output optical power and transmitted optical bandwidth in the presence of ambient temperature fluctuations, together with benefiting from relatively less-complex passive stabilization.

In a particular embodiment, a broadband light source apparatus includes a broadband light source configured to provide broadband source light characterized by a source wavelength spectrum having a source centroid wavelength thermal sensitivity. The apparatus also includes a broadband optical filter characterized by a filter wavelength spectrum, the filter wavelength spectrum having one or more spectral characteristics, the filter wavelength spectrum further having a thermal sensitivity with magnitude and sign. The broadband optical filter is configured to receive the source light and to deliver broadband output light characterized by an output wavelength spectrum that is a function of the source and filter wavelength spectra. The broadband output light has an output centroid wavelength, and the one or more spectral characteristics and the magnitude and sign of the thermal sensitivity of the filter wavelength spectrum are configured to minimize a thermal sensitivity of the output centroid wavelength.

The one or more spectral characteristics and the magnitude and sign of the thermal sensitivity of the filter wavelength spectrum may be further configured to minimize the thermal sensitivity of the output centroid wavelength to within ±50 parts per million per degree C. (ppm/° C.), ±5 ppm/° C., ±0.5 ppm/° C., or ±0.2 ppm/° C. The one or more spectral characteristics and the magnitude and sign of the thermal sensitivity of the filter wavelength spectrum may be further configured to minimize the thermal sensitivity of the output centroid wavelength over a temperature range of 0.1° C., 1.0° C., 10° C., or 100° C.

The one or more spectral characteristics and the magnitude and sign of the thermal sensitivity of the filter wavelength spectrum may be further configured such that a relative integrated output power of the broadband output light is maximized. The relative integrated output power may be maximized to at least 0.3, at least 0.6, or at least 0.9. The sign of the thermal sensitivity of the filter wavelength spectrum may be negative.

The broadband optical filter can be an asymmetric Mach-Zehnder interferometer (MZI) structure or a waveguide Bragg grating structure. The waveguide Bragg grating structure may include at least one of a core and cladding comprising $TiO_2$. The broadband optical filter may be an interference filter. The light source and the interference filter may be mechanically attached to a bi-material strip. The thermal sensitivity of the filter wavelength spectrum can be an effective thermal sensitivity that is negative in sign due to relative angular displacement of the light source and the interference filter as a function of ambient temperature.

The broadband optical filter may include two or more sub-filters. The thermal sensitivity of the filter wavelength spectrum can be negative in sign, and the two or more sub-filters can have respective wavelength spectrum thermal sub-sensitivities, with at least one of the sub-sensitivities being positive in sign. The broadband optical filter wavelength spectrum can be at least 5 nm in width. Width may be measured or calculated using the full width at half maximum (FWHM) method.

The light source may include at least one of a superluminescent diode (SLD), a rare-earth-doped superluminescent source (REDSLS), and a light emitting diode (LED). A fiber-optic gyroscope (FOG) may include the broadband light source apparatus, and the FOG may also include a coil of optical fiber and an optical coupling configured to couple the broadband output light into the coil of optical fiber.

In another embodiment, a method for optimizing broadband light includes providing a broadband light source having a source wavelength spectrum characterized by a source centroid wavelength thermal sensitivity. The method also includes configuring a broadband optical filter to be characterized by a filter wavelength spectrum, the filter wavelength spectrum having one or more spectral characteristics, the filter wavelength spectrum further having a thermal sensitivity with magnitude and sign, to receive the source light, and to deliver broadband output light characterized by an output wavelength spectrum that is a function of the source and filter wavelength spectra, the broadband output light having an output centroid wavelength. The method further includes configuring the one or more spectral characteristics and the magnitude and sign of the thermal sensitivity of the filter wavelength spectrum to minimize a thermal sensitivity of the output centroid wavelength.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength to within ±50 parts per million per degree C. (ppm/° C.), ±5 ppm/° C., ±0.5 ppm/° C., or ±0.2 ppm/° C.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength over a temperature range of 0.1° C., 1° C., 10° C., or 100° C.

The method may further include configuring the one or more spectral characteristics and the magnitude and sign of the thermal sensitivity of the filter wavelength spectrum to maximize a relative integrated output power of the broadband output light. The relative integrated output power of the broadband output light may be maximized to at least 0.3, 0.6, or 0.9. The method may further include configuring the sign of the thermal sensitivity of the filter wavelength spectrum to be negative.

Configuring the one or more spectral characteristics and the magnitude and sign of the thermal sensitivity of the filter wavelength spectrum may include configuring the spectral characteristics and the magnitude and sign of the thermal sensitivity of the filter wavelength spectrum of an asymmetric Mach-Zehnder interferometer structure or a waveguide Bragg grating structure. The method can also include configuring the waveguide Bragg grating structure to include at least one of a core and a cladding comprising $TiO_2$.

Configuring the one or more spectral characteristics and the magnitude and sign of the thermal sensitivity of the filter wavelength spectrum may include using an interference filter mechanically attached to a bi-material strip to which a broadband light source providing the source light is also attached. Configuring the sign of the thermal sensitivity of the filter wavelength spectrum may also include configuring an effective negative sign of the thermal sensitivity of the filter wavelength spectrum due to relative angular displacement of the light source and the interference filter as a function of ambient temperature.

Configuring the one or more spectral characteristics and the magnitude and sign of the thermal sensitivity of the filter wavelength spectrum may include using two or more sub-filters. The thermal sensitivity of the filter wavelength spectrum can be negative in sign, and using the two or more sub-filters can include using sub-filters with respective wavelength thermal sub-sensitivities, at least one of the sub-sensitivities being positive in sign. Configuring the one or more spectral characteristics of the filter wavelength spectrum can include configuring the filter to deliver broadband output light with the output wavelength spectrum having a width of at least 5 nm. The width may be measured or calculated using the FWHM method.

Providing the broadband source light can include providing at least one of an SLD, a REDSLS, and an LED.

In yet another embodiment, a method of optimizing a FOG includes optimizing broadband light according to any embodiment method disclosed herein or obtaining broadband output light from any embodiment broadband light source apparatus described herein. The method may also include optically coupling the broadband output light into a coil of optical fiber of a FOG or configuring the broadband output light to be coupled into a coil of optical fiber of the FOG.

In still a further embodiment, an optical waveguide Bragg grating structure includes an optical core and an optical cladding surrounding the optical core. At least one of the optical core and the optical cladding includes a $TiO_2$ material. The optical waveguide Bragg grating structure can be a broadband optical filter characterized by a filter wavelength spectrum having a thermal sensitivity that is negative in sign.

Moreover, other embodiments benefit from polarization-based filters and filtration and exhibit many of the features described above for other embodiments, in addition to other features described hereinafter.

In one particular embodiment, a broadband light source apparatus includes a broadband light source configured to provide broadband source light characterized by a source wavelength spectrum. The apparatus also includes a broadband optical filter including a polarization changer and an exit polarizer, the polarization changer having a polarization changer length. The broadband optical filter is configured to receive the source light and to deliver broadband output light characterized by an output wavelength spectrum having an output centroid wavelength. The output wavelength spectrum is a function of the source wavelength spectrum and the polarization changer length. The polarization changer length is configured to minimize a thermal sensitivity of the output centroid wavelength.

The polarization changer length may be further configured to minimize the thermal sensitivity of the output centroid wavelength to within ±50 parts per million per degree C. (ppm/° C.), ±5 ppm/° C., ±0.5 ppm/° C., or ±0.2 ppm/° C. The polarization changer length may be further configured to minimize the thermal sensitivity of the output centroid wavelength over a temperature range of 0.1° C. The polarization changer length may be further configured to minimize the thermal sensitivity of the output centroid wavelength over a temperature range of 1.0° C., 10° C., or 100° C. The apparatus may also include an entrance polarizer configured to polarize the source light for receipt by the broadband optical filter, the entrance polarizer being set to a polarization offset angle to minimize the thermal sensitivity of the output centroid wavelength.

The polarization changer may be a magneto-optical polarization changer comprising at least one Faraday rotator. The Faraday rotator may be a rare-earth iron garnet (RIG) Faraday rotator or a magneto-optical glass (MOG) Faraday rotator. The polarization changer further may include two or more Faraday rotators.

The polarization changer may be a birefringent polarization changer, and the birefringent polarization changer may be a Lyot-type retarder or a Šolc-type retarder pair including a first retarder and a second retarder. The birefringent polarization changer may include a plurality of Lyot-type retarders, a plurality of Šolc-type retarder pairs, or at least one Lyot-type retarder and at least one Šolc-type retarder pair.

The broadband optical filter may include a bulk optic filter, a waveguide filter, or a fiber optic filter. The broadband optical filter may include two or more sub-filters. The broadband filter wavelength spectrum may have a full width at half maximum (FWHM) of at least 5 nm. The light source may include at least one of a superluminescent diode (SLD), a rare-earth-doped superluminescent source (REDSLS), and a light emitting diode (LED).

In another embodiment, a fiber-optic gyroscope (FOG) includes the broadband light source apparatus with any of the features summarized above. The FOG may further include a coil of optical fiber and an optical coupling configured to couple the broadband output light into the coil of optical fiber of the FOG.

In another embodiment, a method for optimizing broadband light includes providing broadband source light characterized by a source wavelength spectrum. The method further includes configuring a broadband optical filter to include a polarization changer and an exit polarizer, the polarization changer having a polarization changer length. The method also includes configuring the broadband optical filter to receive the source light and to deliver broadband output light characterized by an output wavelength spectrum having an output centroid wavelength, where the output wavelength spectrum is a function of the source wavelength spectrum and the polarization changer length. The method further includes configuring the polarization changer length to minimize a thermal sensitivity of the output centroid wavelength.

Configuring the polarization changer length to minimize a thermal sensitivity of the output centroid wavelength may include configuring the polarization changer length to minimize the thermal sensitivity of the output centroid wavelength to within ±50 parts per million per degree C. (ppm/° C.), ±5 ppm/° C., ±0.5 ppm/° C., or ±0.2 ppm/° C. Configuring the polarization changer length to minimize a thermal sensitivity of the output centroid wavelength may include configuring the polarization changer length to minimize the sensitivity over a temperature range of 0.1° C., 1.0° C., 10° C., or 100° C.

The method may further include configuring an entrance polarizer to polarize the source light for receipt by the broadband optical filter with a polarization offset angle to minimize the thermal sensitivity of the output centroid wavelength.

Configuring the broadband optical filter to include a polarization changer may also include using a magneto-optical polarization changer comprising at least one Faraday rotator. Using the magneto-optical polarization changer may include using a rare-earth iron garnet (RIG) Faraday rotator such as a terbium gallium garnet (TGG) Faraday rotator, a yttrium iron garnet (YIG) Faraday rotator, or a bismuth-substituted rare-earth iron garnet (BIG), a magneto-optical glass (MOG) Faraday rotator, such as a terbium doped glass (TDG) Faraday rotator; or two or more Faraday rotators.

The RIG Faraday rotator may be a latching magnet-free type RIG Faraday rotator. Alternatively, the RIG Faraday rotator may be a non-latched magnet-ready type RIG Faraday rotator, and the magneto-optical filter may further include a magnet. The at least one non-latched magnet-ready type RIG Faraday rotator may be magnetically saturated by the magnet. Alternatively the at least one non-latched magnet-ready type RIG Faraday rotator may be not magnetically saturated by the magnet, and the magneto-optical filter may further include an adjustment means to adjust the magnet so as to adjust the characteristics of the Faraday rotator.

Configuring the broadband optical filter to include a polarization changer includes using a birefringent polarization changer, which can include using a Lyot-type retarder, a Šolc-type retarder pair including a first retarder and a second retarder, a plurality of Lyot-type retarders, a plurality of Šolc-type retarder pairs, or at least one Lyot-type retarder and at least one Šolc-type retarder pair.

Configuring the broadband optical filter may include using a bulk optic filter, a waveguide filter, or a fiber optic filter, using two or more sub-filters, or configuring the filter to deliver broadband output light having a full width at half maximum (FWHM) of at least 5 nm. Providing the broadband source light may include providing light from at least one of an SLD, a REDSLS, and a LED.

In another embodiment, a method of optimizing a FOG includes optimizing broadband light according to the method described above, as well as optically coupling the broadband output light into a coil of optical fiber of a FOG.

In a further embodiment, a broadband light source apparatus includes means for providing broadband source light characterized by a source wavelength spectrum; and means for receiving the broadband source light at a polarization changer having a polarization changer length. The apparatus also includes means for delivering the broadband source light as filtered, broadband output light characterized by an output wavelength spectrum having an output centroid wavelength; and means for using the polarization changer length to minimize a thermal sensitivity of the output centroid wavelength.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description, the drawings serve to explain principles and operation of the various embodiments.

BRIEF DESCRIPTION OF THE DRAWINGS

For a fuller understanding of the nature and objects of the disclosed embodiments, reference should be made to the following detailed description, taken in connection with the accompanying drawings, in which:

FIG. 28 is a schematic diagram illustrating a fiber optic gyroscope (FOG) that incorporates the broadband light source of FIG. 8;

FIG. 35 shows a detail view of an embodiment of the magneto-optical filter of FIG. 30 comprising at least one Faraday rotator and at least one exit polarizer;

FIGS. 37A and 37B show the detail view of the magneto-optical filter of FIG. 35 overlaid onto the exemplary simulated source and output spectra of FIG. 32 to illustrate the principle of operation;

FIG. 38 shows a detail view of another embodiment of the magneto-optical filter of FIG. 30 comprising a plurality of Faraday rotators and at least one exit polarizer;

FIG. 40 shows a detail view of another embodiment magneto-optical filter further comprising an entrance polarizer.

FIG. 48B shows a detail view of an embodiment of the birefringent optical filter of FIG. 43, wherein the birefringent optical filter is a Šolc-type filter pair;

FIGS. 49A and 49B show the detail view of the birefringent filter of FIG. 48A overlaid onto the exemplary simulated source and output spectra of FIG. 45A to illustrate the principle of operation;

FIGS. 50A and 50B show the detail view of the birefringent filter of FIG. 48B overlaid onto the exemplary simulated source and output spectra of FIG. 45B to illustrate the principle of operation;

FIGS. 51A and 51B show detail views of additional birefringent optical filter embodiments further including an entrance polarizer;

Figure 1:
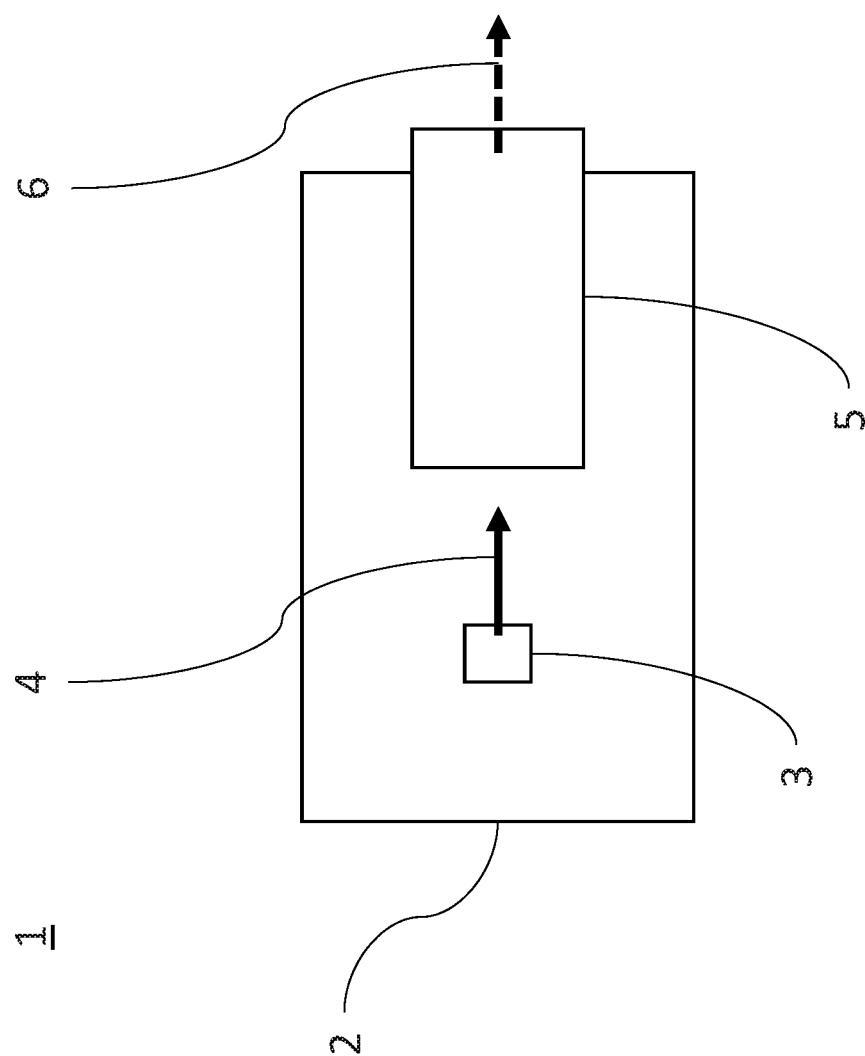
FIG. 1 is a schematic diagram of a prior art light source apparatus comprising a mount onto which a broadband light source and a broadband optical filter are arranged.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows. The following is a detailed description of the preferred embodiments of the invention, reference being made to the drawings in which the same reference numerals identify the same elements of structure in each of the several figures.

Figures shown and described herein are provided in order to illustrate key principles of operation and component relationships along their respective optical paths according to the present disclosure and are not drawn with intent to show actual size or scale. Some exaggeration may be necessary in order to emphasize basic structural relationships or principles of operations.

The existing wavelength stabilization strategies that invoke broadband optical filters for filtering broadband sources are subject to undesirable compromises in the overall performance of the broadband light source with regard to reduced optical power and reduced bandwidth.

FIG. 1 is a schematic diagram of a prior art light source apparatus 1 comprising a mount 2 onto which are arranged broadband light source 3, such as an SLD, REDSLS, or LED, whose emission light 4 has a temperature-dependent source spectrum, and a broadband optical filter 5 for delivering output light 6 with a temperature-dependent output wavelength spectrum whose centroid wavelength consequently has a temperature sensitivity.

Figure 2:
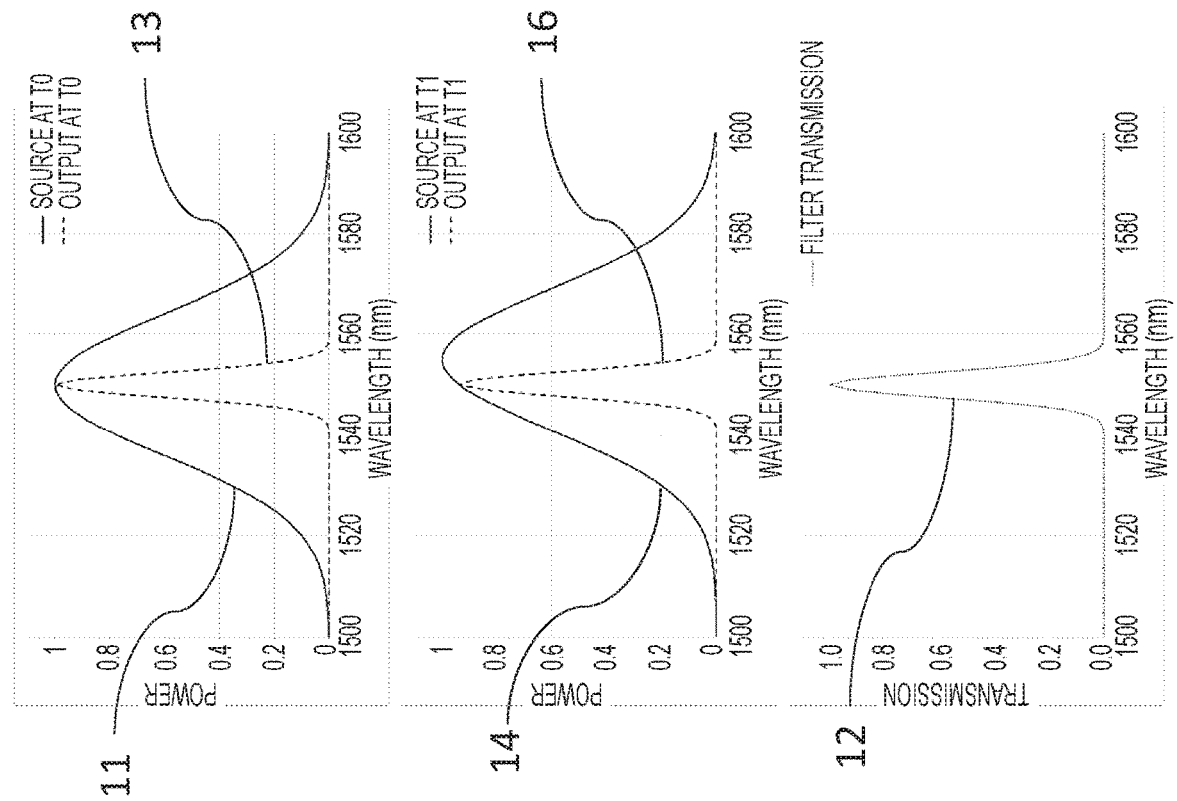
FIG. 2 shows the simulated source, filter, and output spectra for prior art light source apparatus shown in FIG. 1, whereby the filter has a Gaussian transmission spectrum.

FIG. 2 shows the simulated source spectrum 11, filter spectrum 12, and output spectrum 13, determined by the product of the source spectrum and filter spectrum, at temperature $T_0$; and the simulated source spectrum 14 and output spectrum 16, determined by the product of the source spectrum and filter spectrum, at temperature $T_1$, where $T_1 > T_0$; for prior art light source apparatus 1 whereby source wavelength spectra 11 and 14 are characterized by Gaussian functions, filter wavelength spectrum 12 is characterized by a Gaussian function, both the source wavelength spectrum 11 and filter wavelength spectrum 12 have a maximum at 1550 nm at $T_0$, and the full width at half maximum FWHM$_{SOURCE}$ spectral characteristic of source 3 is 33 nm (typical for FOG applications using SLDs or REDSLSs). Since the best-case thermal sensitivity of the filter wavelength spectrum $\alpha_{FILTER}$ of 0 nm/° C. is assumed for prior art broadband filter 5, filter spectrum 12 is identical at $T_0$ and $T_1$.

Figure 3:
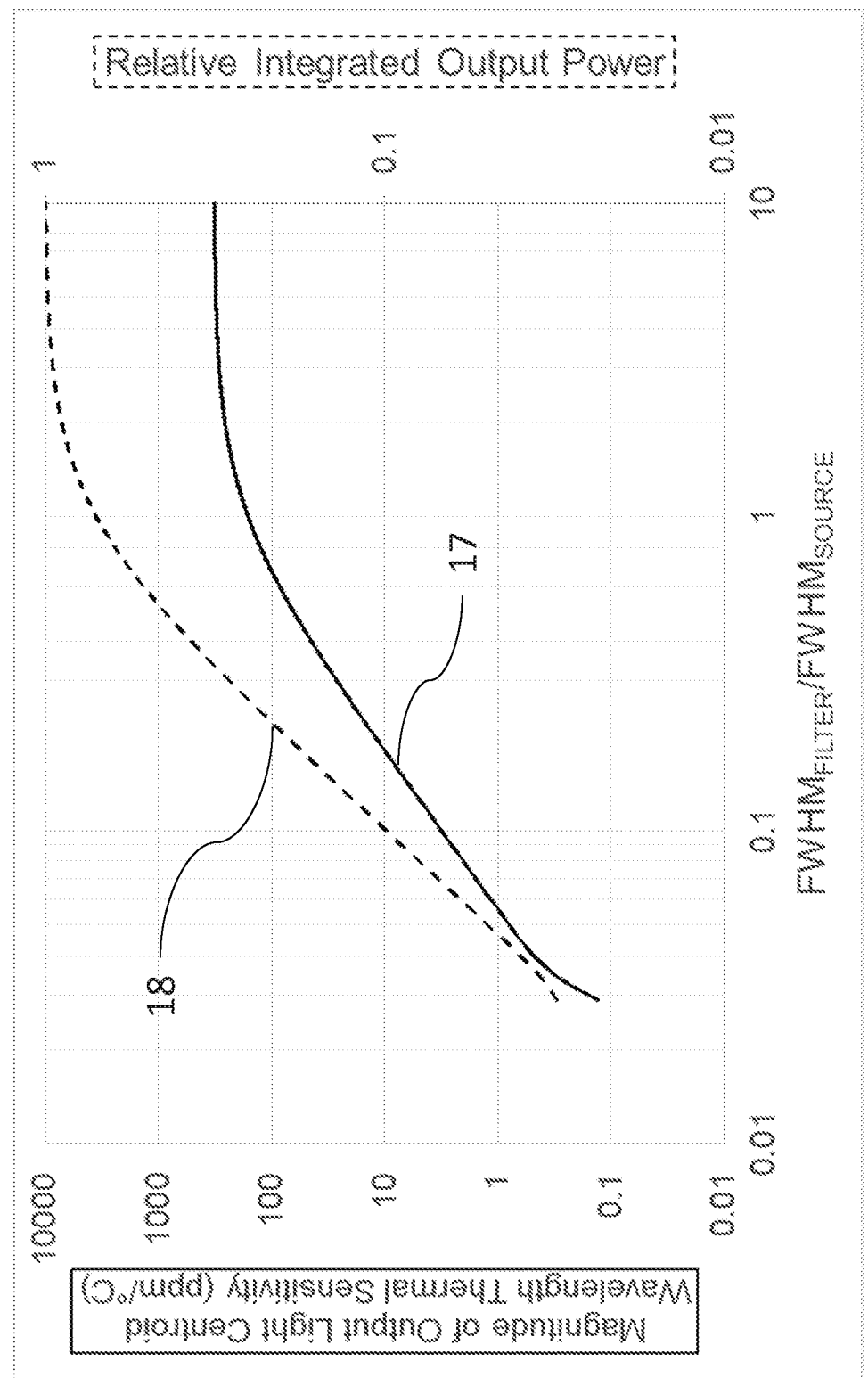
FIG. 3 shows a simulated dependence of the thermal sensitivity of the output light centroid wavelength and the relative integrated optical power on the ratio of the filter width to the source width given the spectra shown in FIG. 2.

FIG. 3 shows a simulated dependence of the thermal sensitivity $\alpha_{OUTPUT}$ 17 of the centroid wavelength of output light 6 between $T_0$ and $T_1$ (solid curve), and a simulated dependence of the integrated output power (relative to inherent source integrated output power) $\int P_{OUTPUT}(\lambda)d\lambda / \int P_{SOURCE}(\lambda)d\lambda$ 18 of output light 6 averaged over a temperature range of 1° C. (dashed curve), on the ratio of the full width at half maximum (FWHM$_{FILTER}$) spectral characteristic of filter wavelength spectrum 12 to FWHM$_{SOURCE}$ of source wavelength spectra 11 and 14 corresponding to the wavelength spectra shown in FIG. 2, whereby the inherent thermal sensitivity $\alpha_{SOURCE}$ of the centroid wavelength of source 3 is +0.5 nm/° C., or +323 ppm/° C. (typical for SLDs). According to the simulation, to achieve thermal sensitivity of the output light centroid wavelength of magnitude less than 10 ppm/° C., which is often considered a threshold requirement for many navigation applications, FWHM$_{FILTER}$/FWHM$_{SOURCE}$ must be less than 0.18, in which case the relative integrated output power is only 0.177 or 17.7%, which is relatively inefficient.

Figure 4:
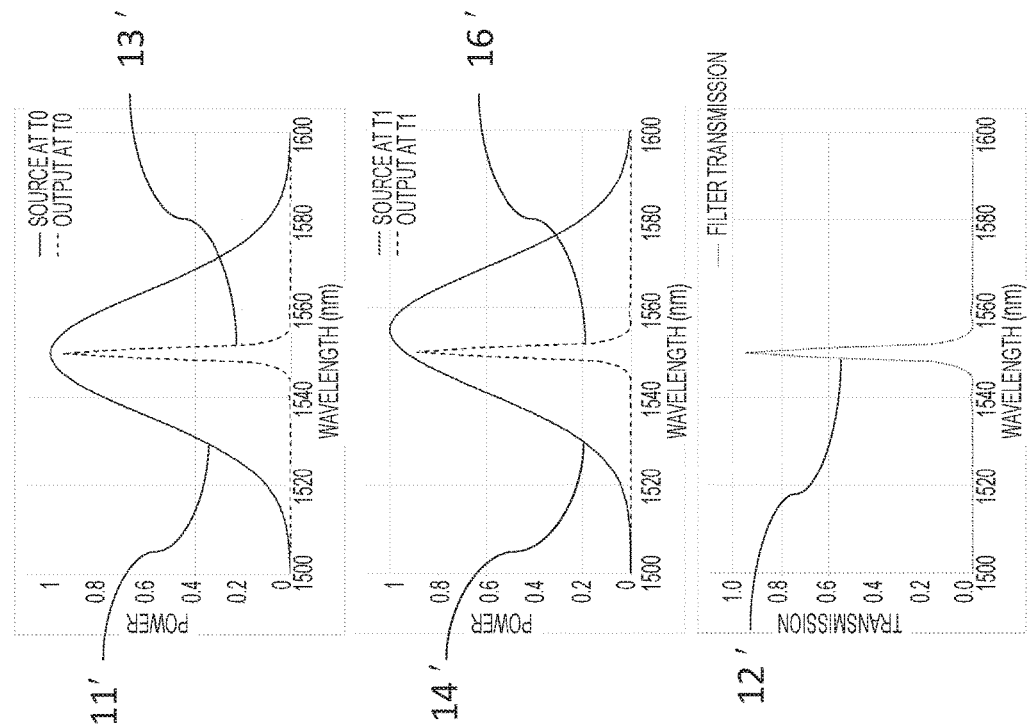
FIG. 4 shows the simulated source, filter, and output spectra for prior art light source apparatus shown in FIG. 1, whereby the filter has a transmission spectrum characteristic of a Bragg grating.
Figure 5:
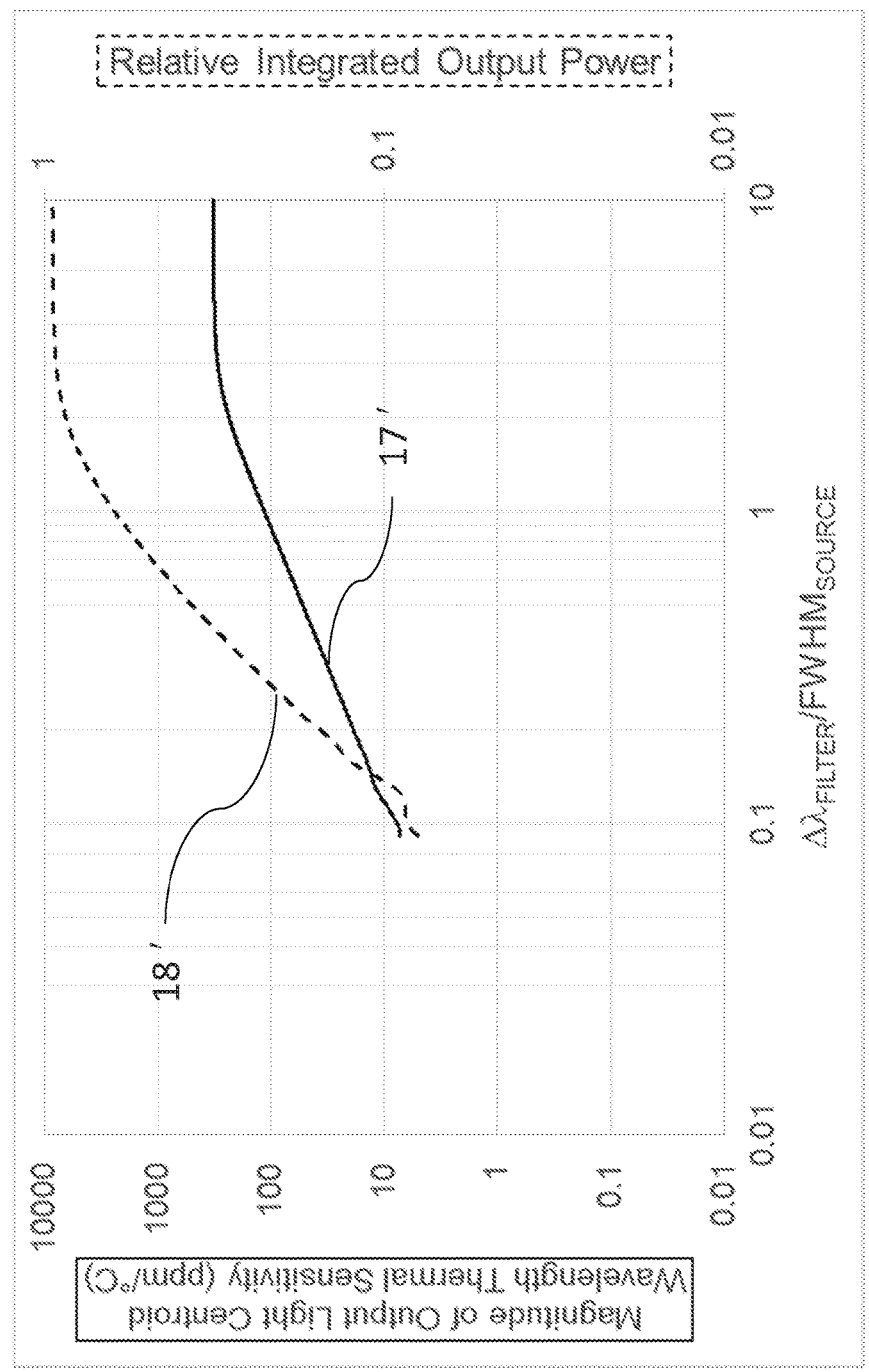
FIG. 5 shows a simulated dependence of the thermal sensitivity of the output light centroid wavelength and the relative integrated optical power on the ratio of the filter width to the source width given the spectra shown in FIG. 4.

FIG. 4 shows the simulated source wavelength spectrum 11', filter wavelength spectrum 12', and output wavelength spectrum 13', determined by the product of the source wavelength spectrum and filter wavelength spectrum, at temperature $T_0$; and the simulated source wavelength spectrum 14' and output wavelength spectrum 16', determined by the product of the source wavelength spectrum and filter wavelength spectrum, at temperature $T_1$, where $T_1 > T_0$; for prior art light source apparatus 1 whereby source wavelength spectra 11' and 14' are characterized by Gaussian functions, filter wavelength spectrum 12' is characterized by a function characteristic of a Bragg grating, both the source wavelength spectrum 11' and filter wavelength spectrum 12' have a maximum at 1550 nm at $T_0$, and $FWHM_{SOURCE}$ is 33 nm. Since the best-case thermal sensitivity of the filter wavelength spectrum $\alpha_{FILTER}$ of 0 nm/° C. is assumed for prior art broadband filter 5, filter wavelength spectrum 12' is identical at $T_0$ and $T_1$. FIG. 5 shows a simulated dependence of the thermal sensitivity $\alpha_{OUTPUT}$ 17' of the centroid wavelength of output light 6 between $T_0$ and $T_1$ (solid curve), and a simulated dependence of the integrated output power (relative to inherent source integrated output power) $\int P_{OUTPUT}(\lambda)d\lambda / \int P_{SOURCE}(\lambda)d\lambda$ 18' of output light 6 averaged over a temperature range of 1° C. (dashed curve), on the ratio of the width of filter wavelength spectrum 12' between the first zeros on either side of the maximum reflectivity ($\Delta\lambda_{FILTER}$) spectral characteristic of filter wavelength spectrum 12' to $FWHM_{SOURCE}$ of source wavelength spectra 11' and 14' corresponding to the wavelength spectra shown in FIG. 4, whereby the inherent thermal sensitivity $\alpha_{SOURCE}$ of the centroid wavelength of source 3 is +0.5 nm/° C., or +323 ppm/° C. According to the simulation, to achieve thermal sensitivity of the output light centroid wavelength of magnitude less than 10 ppm/° C., $\Delta\lambda_{FILTER}/FWHM_{SOURCE}$ must be less than 0.11, in which case the relative integrated output power is only 0.087 or 8.7%, which is relatively inefficient.

Figure 6:
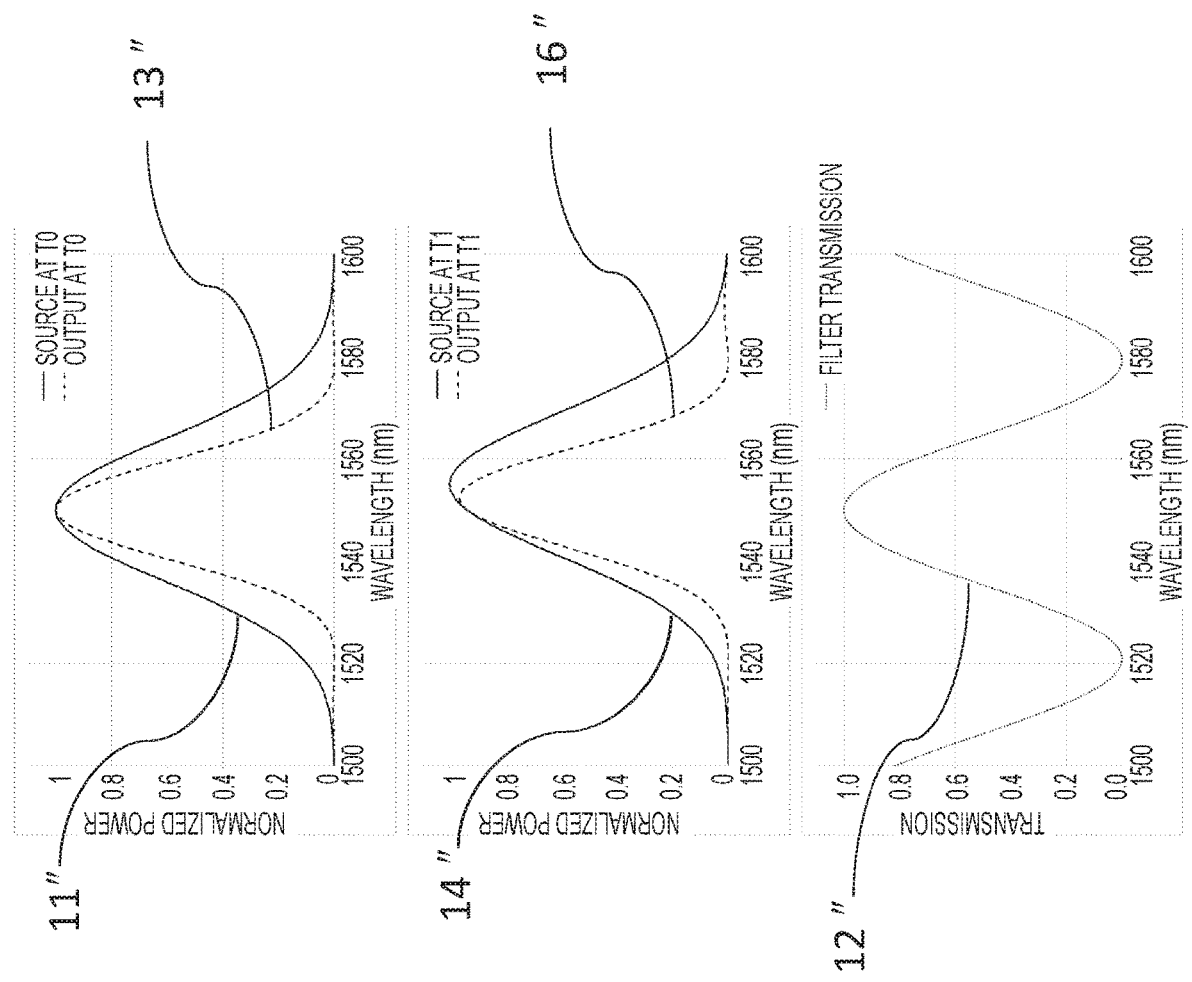
FIG. 6 shows the simulated source, filter, and output spectra for prior art light source apparatus shown in FIG. 1 whereby the filter has a raised sinusoidal transmission spectrum.
Figure 7:
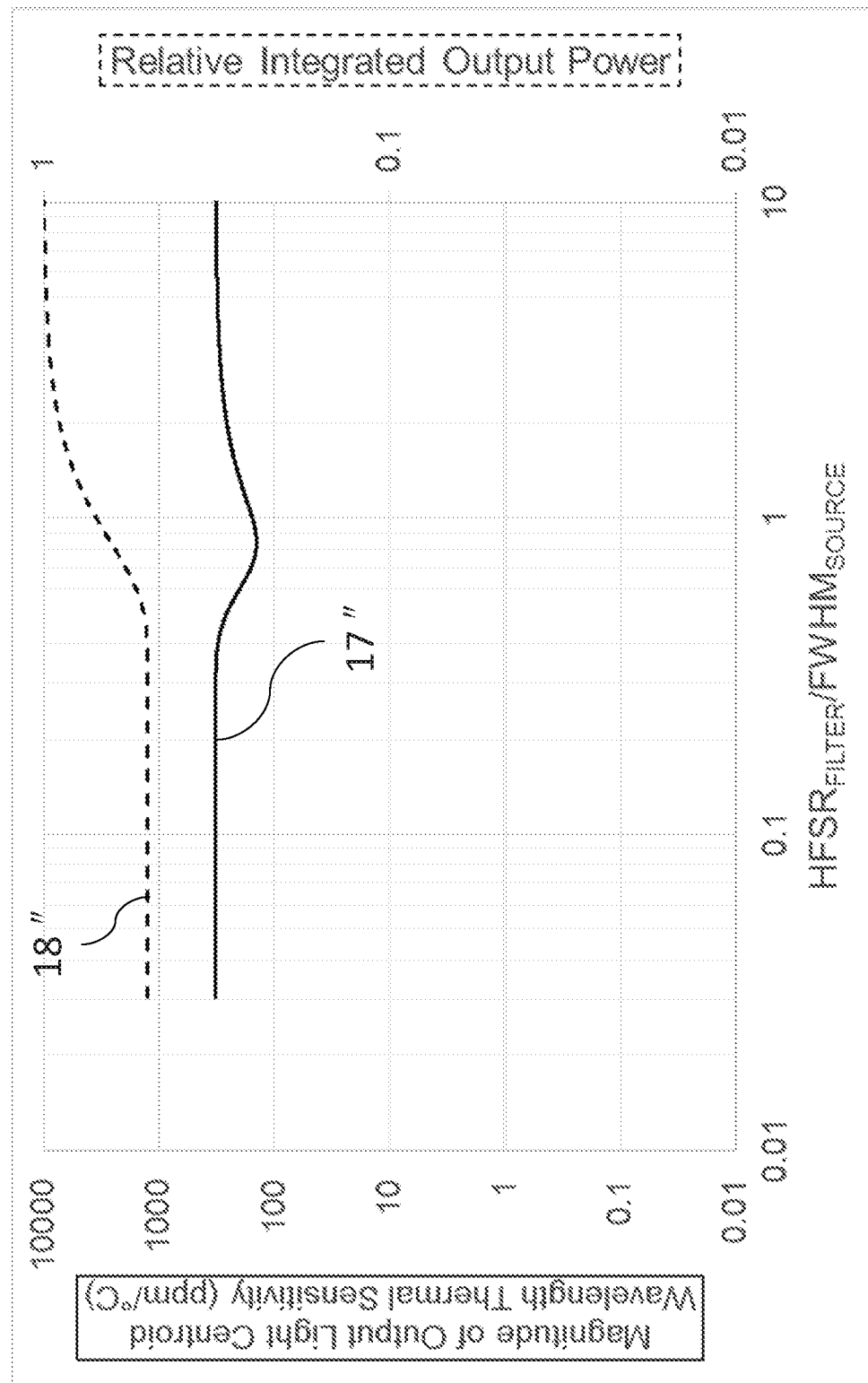
FIG. 7 shows a simulated dependence of the thermal sensitivity of the output light centroid wavelength and the relative integrated optical power on the ratio of the filter width to the source width given the spectra shown in FIG. 6.

FIG. 6 shows the simulated source wavelength spectrum 11", filter wavelength spectrum 12", and output wavelength spectrum 13", determined by the product of the source wavelength spectrum and filter wavelength spectrum, at temperature $T_0$; and the simulated source wavelength spectrum 14" and output wavelength spectrum 16", determined by the product of the source wavelength spectrum and filter wavelength spectrum, at temperature $T_1$, where $T_1 > T_0$; for prior art light source apparatus 1 whereby source wavelength spectra 11" and 14" are characterized by Gaussian functions, filter wavelength spectrum 12" is characterized by a raised sinusoidal function, both the source wavelength spectrum 11" and filter wavelength spectrum 12" have a maximum at 1550 nm at $T_0$, and $FWHM_{SOURCE}$ is 33 nm. Since the best-case thermal sensitivity of the filter wavelength spectrum $\alpha_{FILTER}$ of 0 nm/° C. is assumed for prior art broadband filter 5, filter wavelength spectrum 12" is identical at $T_0$ and $T_1$. FIG. 7 shows a simulated dependence of the thermal sensitivity $\alpha_{OUTPUT}$ 17" of the centroid wavelength of output light 6 between $T_0$ and $T_1$ (solid curve), and a simulated dependence of the integrated output power (relative to inherent source integrated output power) $\int P_{OUTPUT}(\lambda)d\lambda / \int P_{SOURCE}(\lambda)d\lambda$ 18" of output light 6 averaged over a temperature range of 1° C. (dashed curve), on the ratio of the width of filter wavelength spectrum 12" as defined by one half of the FSR of the raised sinusoidal function ($HFSR_{FILTER}$) spectral characteristic of filter wavelength spectrum 12" to $FWHM_{SOURCE}$ of source wavelength spectra 11" and 14" corresponding to the wavelength spectra shown in FIG. 6, whereby the inherent thermal sensitivity $\alpha_{SOURCE}$ of the centroid wavelength of source 3 is +0.5 nm/° C. or +323 ppm/° C. According to the simulation, the minimum thermal sensitivity of the output light centroid wavelength is only +143 ppm/° C. where $HFSR_{FILTER}/FWHM_{SOURCE}$ is 0.833, in which case the relative integrated output power is 0.639 or 63.9% (in the absence of any secondary filtering to attenuate side lobes).

Although various strategies are known in the art for enhancing the source wavelength spectrum, such as tailoring the shape to a flat-top or super-Gaussian wavelength spectrum, to reduce thermal sensitivity of the output light centroid wavelength in conjunction with bandpass filtering, all such known strategies are subject to undesirable compromises in the overall performance of the broadband light source with regard to reduced optical power and reduced bandwidth.

Accordingly, the inventors have recognized a need for an improved wavelength-stabilized broadband light source apparatus and method.

Figure 8:
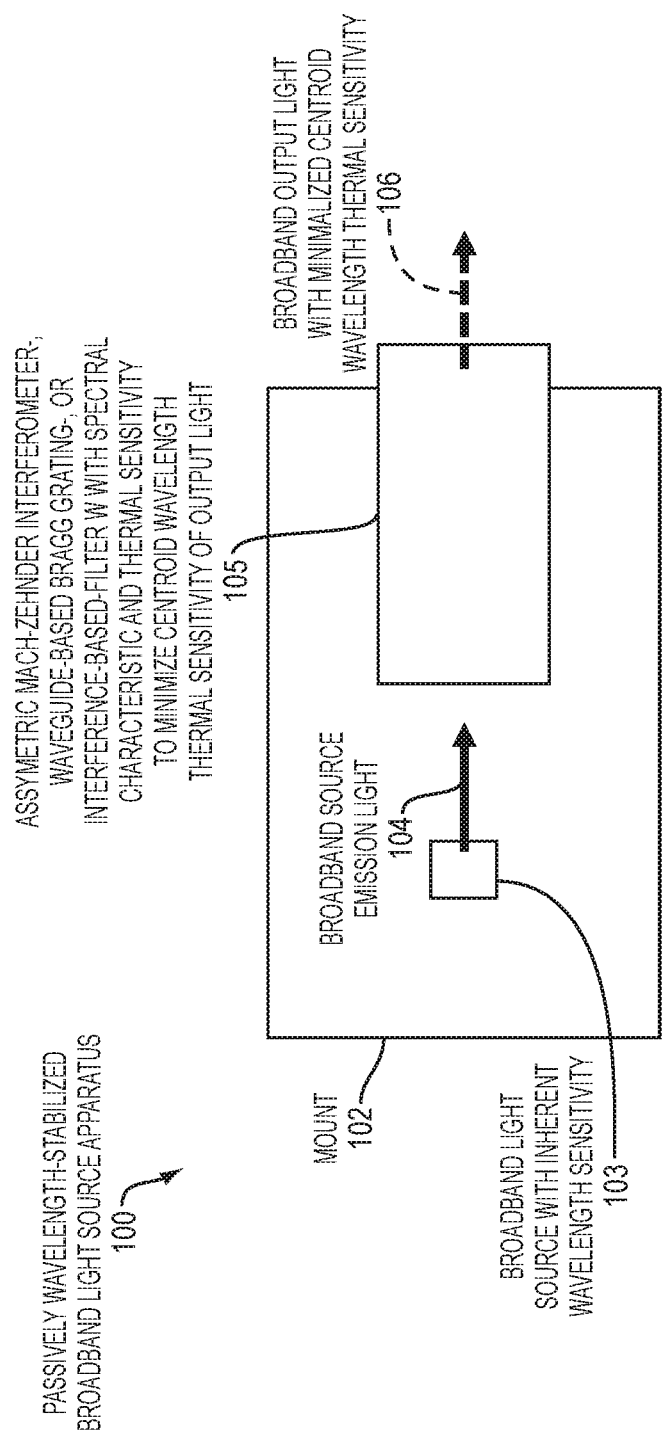
FIG. 8 is a schematic top plan view of an embodiment passively wavelength-stabilized broadband light source apparatus for delivering output light with output centroid wavelength having minimized thermal sensitivity, the apparatus comprising a broadband light source and at least one broadband optical filter.

Embodiments Including Interferometer Structures, Bragg Grating Structures, or Interference Filters FIG. 8 is a schematic top plan view of passively wavelength-stabilized broadband light source apparatus 100 for delivering broadband output light 106 with output centroid wavelength having minimized thermal sensitivity comprising a mount 102 that serves as a mechanical base for broadband light source 103, such as a superluminescent diode (SLD), rare-earth-doped superluminescent source (REDSLS), or light emitting diode (LED), whose emission light 104 (also referred to herein as broadband source light) is characterized by a temperature-dependent source wavelength spectrum having a source centroid wavelength thermal sensitivity. The apparatus 100 also includes at least one broadband optical filter 105 with a filter wavelength spectrum, whose thermal sensitivity has magnitude and sign. The broadband optical filter 105 is configured to receive the source light 104 and to deliver the broadband output light 106. The light 106 has an output wavelength spectrum that is a function of the source and filter wavelength spectra. The broadband optical filter 105 is characterized by a filter wavelength spectrum, the filter wavelength spectrum having one or more spectral characteristics, and the filter wavelength spectrum has a thermal sensitivity with magnitude and sign. The broadband output light 106 has an output centroid wavelength. One or more spectral characteristic of the filter 105, as well as the magnitude and sign of the thermal sensitivity of the filter wavelength spectrum, are configured to minimize a thermal sensitivity of the output centroid wavelength of the broadband output light 106.

The broadband optical filter 105 is configured to receive the source light 104 and to deliver the broadband output light 106, which is characterized by an output wavelength spectrum that is a function of the source and filter wavelength spectra. The broadband optical filter 105 may be an asymmetric Mach-Zehnder interferometer structure or a waveguide Bragg grating structure, as described in connection with specific embodiments hereinafter. The waveguide Bragg grating structure may include at least one of a core and cladding comprising $TiO_2$. As a further alternative, the broadband optical filter may be an interference filter. The light source and the interference filter may be mechanically attached to a bi-material strip. The filter wavelength thermal sensitivity can be an effective filter wavelength thermal sensitivity that is negative in sign due to relative angular displacement of the light source and the interference filter as a function of ambient temperature.

The broadband optical filter may include two or more sub-filters in some embodiments. The thermal sensitivity of the filter wavelength spectrum can be negative in sign, and the two or more sub-filters can have respective wavelength thermal sub-sensitivities, with at least one of the sub-sensitivities being positive in sign.

The filter 105 may be configured based on the spectral characteristics of the source 103. Specifically, the filter 105 may be configured to have a filter wavelength spectrum with one or more spectral characteristics such as spectral width, spectral shape, or other spectral characteristics. Furthermore, the filter wavelength spectrum of filter 105 may be configured to have a thermal sensitivity with magnitude and sign, and a combination of these filter characteristics can result in of the broadband output light 106, which is characterized by an output wavelength spectrum. Some output wavelength spectra, and their variation with ambient temperature, are described hereinafter in connection with elements 113a-e and 116a-e of FIG. 10, for example. The filter wavelength spectrum characterizing the output light 106 can be configured such that the thermal sensitivity of the output centroid wavelength can be minimized, as further described hereinafter.

In various embodiments, the one or more spectral characteristics and the magnitude and sign of the thermal sensitivity of the filter wavelength spectrum may be configured to minimize the thermal sensitivity of the output spectrum centroid wavelength to within ±50 parts per million per degree C. (ppm/° C.), ±5 ppm/° C., ±0.5 ppm/° C., or ±0.2 ppm/° C., for example. The one or more spectral characteristics and the magnitude and sign of the thermal sensitivity of the filter wavelength spectrum may be further configured to minimize the thermal sensitivity of the output centroid wavelength over a temperature range of 0.1° C., 1.0° C., 10° C., or 100° C., for example.

Furthermore, in some embodiments described hereinafter, the filter 105 may be configured to be characterized by filter wavelength spectral characteristics or filter centroid wavelength thermal sensitivity magnitude and sign that are configured such that the output light 106 is maximized. In particular, a relative integrated output power of the broadband output light may be maximized to at least 0.3, at least 0.6, or at least 0.9, for example. The sign of the thermal sensitivity of the filter wavelength spectrum may be negative in many embodiments, such that an inherent positive thermal sensitivity of the centroid wavelength of the broadband light source may be carefully counteracted to produce an output spectrum having output centroid wavelength with minimized thermal sensitivity.

The filter 105 is configured to receive the broadband light 104 from the source 103 at one side of the filter and to deliver the output light 106 from the opposite side of the filter. Examples of filter wavelength spectra are described hereinafter in connection with elements 112a-112e in FIG. 10, for example. Spectral characteristics of the filter can include specific filter spectral shape, such as Gaussian shape, spectral width, such as a FWHM width, which can be at least 5 nm, for example.

Figure 9:
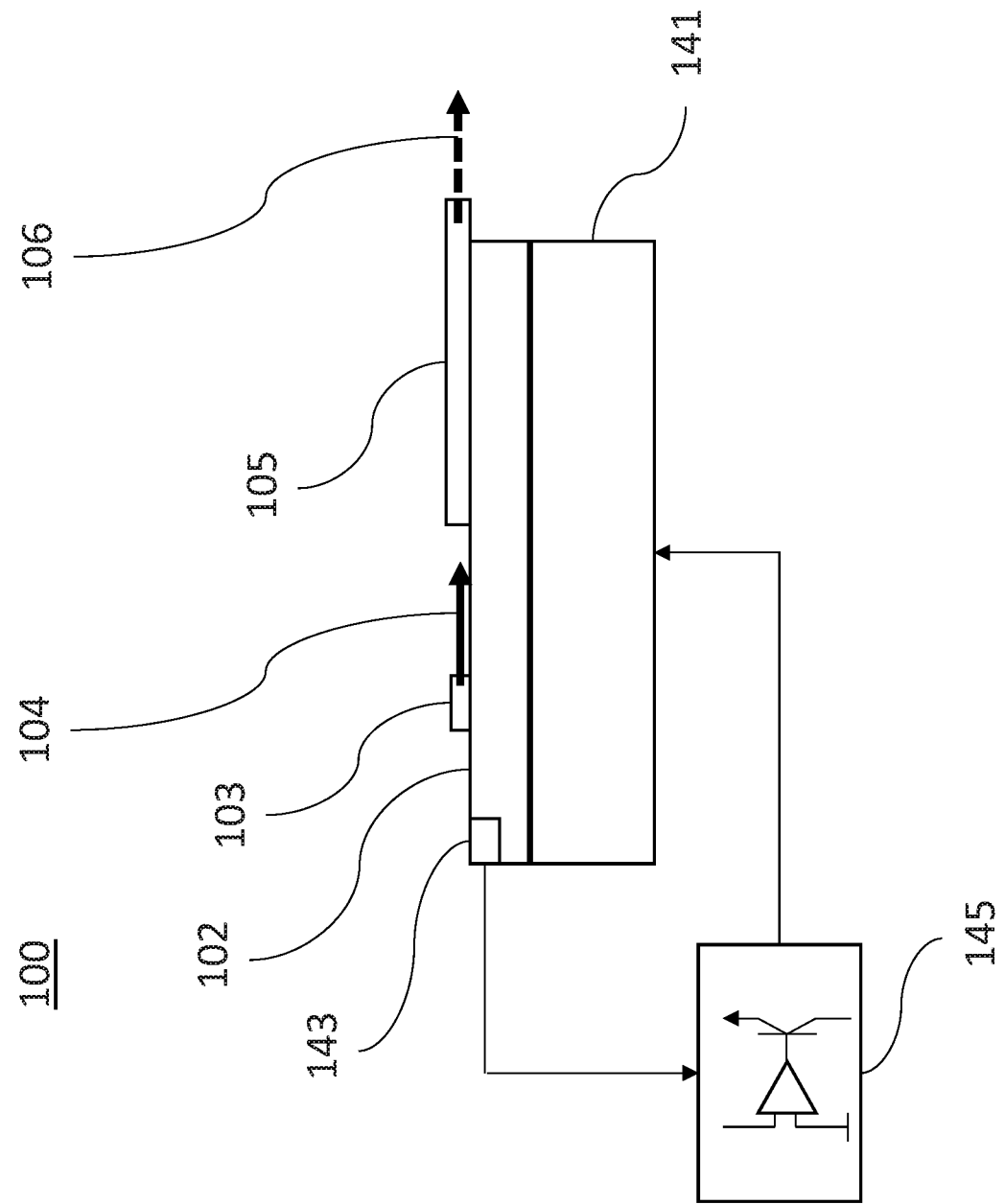
FIG. 9 is a schematic lateral view of the apparatus of FIG. 8 in thermal contact with an active temperature control element according to a preferred embodiment.

FIG. 9 is a schematic lateral view of wavelength-stabilized light source apparatus 100. Preferably mount 102 includes a common temperature stabilizer in thermal contact with both source 103 and filter 105 for defining the relative temperature of source 103 and filter 105 against environmental (ambient) temperature fluctuations in the vicinity of the apparatus 100, or even temperature fluctuations within the apparatus 100. The temperature stabilization may be entirely passive. Alternatively, mount 102 may be in thermal contact with an active temperature control device, for example a thermoelectric cooler 141 acting, together with a temperature sensor 143 and a temperature controller 145, as a temperature stabilizer against environmental temperature fluctuations.

Figure 10:
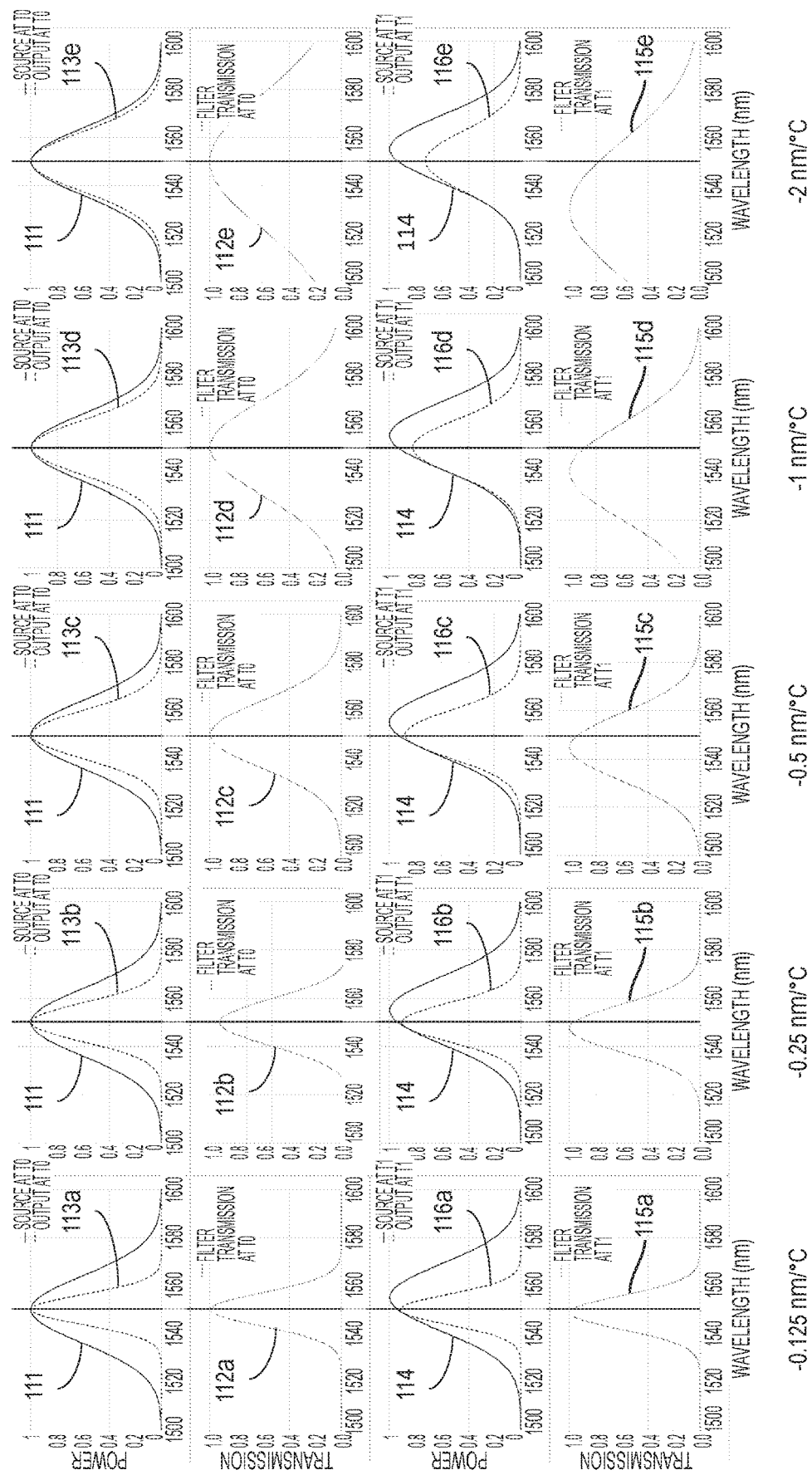
FIG. 10 shows the simulated source, filter, and output spectra with filter widths configured to minimize the thermal sensitivity of the output centroid wavelength for various values of the thermal sensitivity of the filter wavelength spectrum for the apparatus shown in FIG. 8 whereby the temperature-dependent filter has a Gaussian transmission spectrum.

FIG. 10 shows exemplary simulated source wavelength spectrum 111, filter wavelength spectra 112a, 112b, 112c, 112d, and 112e, and output wavelength spectra 113a, 113b, 113c, 113d, and 113e determined by the product of the source wavelength spectrum and filter wavelength spectra, at temperature $T_0$; and exemplary simulated source wavelength spectrum 114, filter wavelength spectra 115a, 115b, 115c, 115d, and 115e, and output wavelength spectra 116a, 116b, 116c, 116d, and 116e, determined by the product of the source wavelength spectrum and filter wavelength spectra, at temperature $T_1$, where $T_1 > T_0$; for light source apparatus 100 whereby source wavelength spectra 111 and 114 are characterized by Gaussian functions, filter wavelength spectra 112a, 112b, 112c, 112d, and 112e and 115a, 115b, 115c, 115d, and 115e are characterized by Gaussian functions, both source wavelength spectrum 111 and each of filter wavelength spectra 112a, 112b, 112c, 112d, and 112e have a maximum at 1550 nm at $T_0$, and $FWHM_{SOURCE}$ is 33 nm (typical for FOG applications using SLDs or REDSLSs). The FWHM spectral characteristic of each filter wavelength spectrum 112a, 112b, 112c, 112d, and 112e is configured to minimize the thermal sensitivity of the output centroid wavelength of output light 106 for filter wavelength spectrum sensitivities $\alpha_{FILTER}$ of −0.125 nm/° C., −0.25 nm/° C., −0.5 nm/° C., −1 nm/° C., and −2 nm/° C., respectively.

Figure 11:
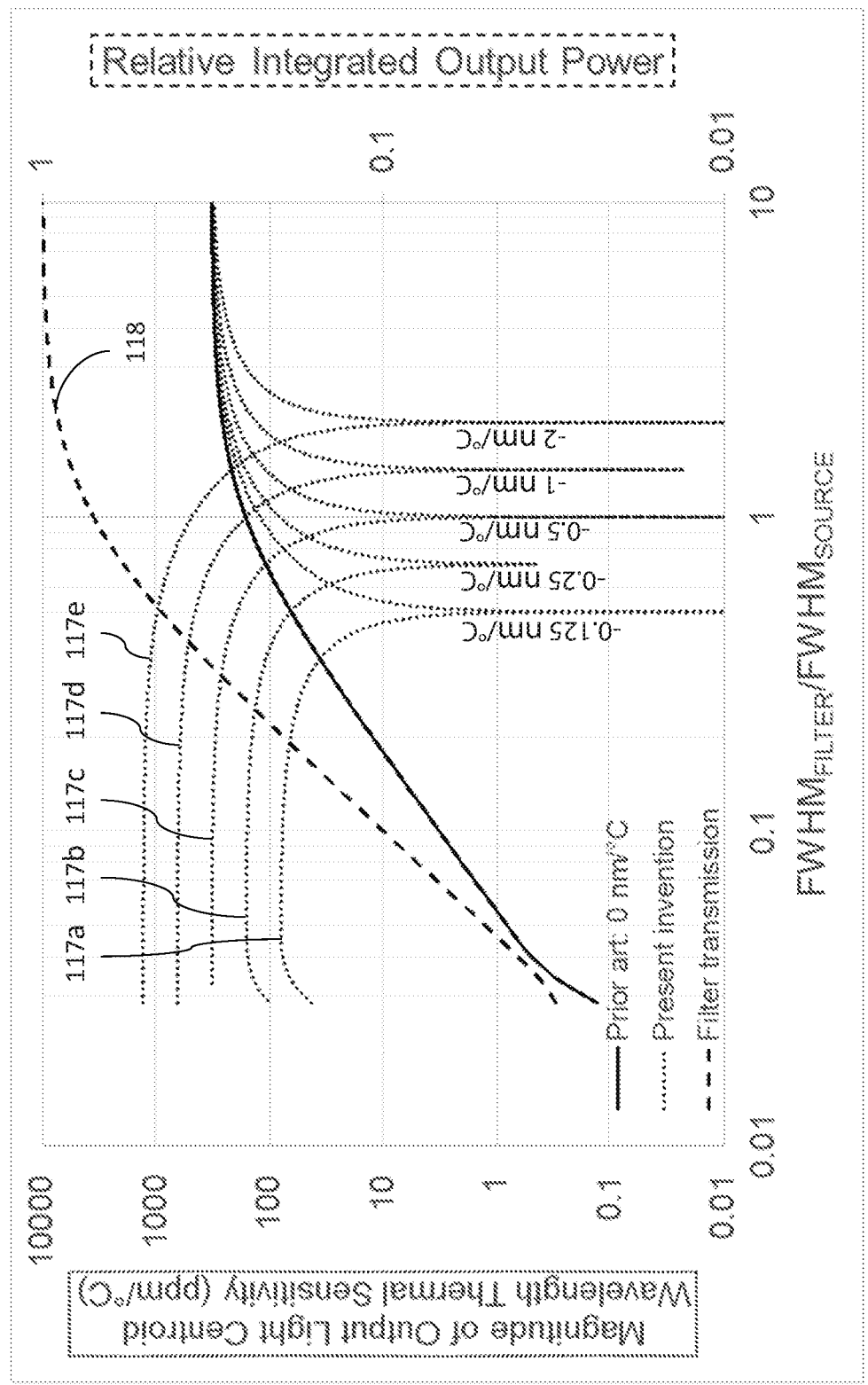
FIG. 11 shows a simulated dependence of the thermal sensitivity of the output light centroid wavelength and the integrated optical power on the ratio of the filter width to the source width for different thermal sensitivities of the temperature-dependent filter wavelength spectrum given the spectra shown in FIG. 10.

FIG. 11 shows a simulated dependence of the thermal sensitivity $\alpha_{OUTPUT}$ 117a, 117b, 117c, 117d, and 117e of the output centroid wavelength of output light 106 between $T_0$ and $T_1$ (solid curve), and a simulated dependence of the relative integrated output power 118 of output light 106 averaged over a temperature range of 1° C. (dashed curve), on the ratio of $FWHM_{FILTER}$ of filter spectra 112a, 112b, 112c, 112d, and 112e to $FWHM_{SOURCE}$ of source spectra 111 and 114 corresponding to the spectra shown in FIG. 10, whereby the inherent thermal sensitivity $\alpha_{SOURCE}$ of the centroid wavelength of source 103 is +0.5 nm/° C. or +323 ppm/° C. (typical for SLDs).

It is evident in FIG. 11 that for given characteristics of the emission spectrum, for example $FWHM_{SOURCE}$, of source 103 and for given inherent thermal sensitivity of the centroid wavelength of the source wavelength spectrum of source 103, the thermal sensitivity of the output centroid wavelength of output light 106 can be minimized (i.e., such that centroid wavelength is stabilized with respect to ambient temperature fluctuations) for appropriate combinations of the characteristics of the filter wavelength spectrum, for example $FWHM_{FILTER}$, of filter 105 and magnitude of the thermal sensitivity of the filter wavelength spectrum of filter 105 when the sign of the thermal sensitivity of the filter wavelength spectrum of filter 105 is opposite to the sign of the inherent thermal sensitivity of the centroid wavelength of the source wavelength spectrum of source 103.

In some cases, the thermal sensitivity of the centroid wavelength of output light 106 may be minimized when the magnitude of the thermal sensitivity of the filter wavelength spectrum is approximately equal in magnitude to the thermal sensitivity of the centroid wavelength of the source wavelength spectrum. Furthermore, in many cases the thermal sensitivity of the centroid wavelength of the source wavelength spectrum is positive in sign, so the filter can be configured to have a thermal sensitivity of the filter wavelength spectrum that is negative sign such that the thermal sensitivity of the output centroid wavelength may be minimized passively. However, embodiments also include cases for which the thermal sensitivity of the centroid wavelength of the source wavelength spectrum is negative in sign, and the thermal sensitivity of the filter wavelength spectrum that is positive in sign is appropriate for passive stabilization of the output centroid wavelength in those cases.

Moreover, in view of this disclosure, a person of ordinary skill in the art will understand how filter parameters, including filter spectral characteristics and thermal sensitivity magnitude and sign, may be iteratively changed, in view of a given source spectrum, to determine the best filter parameters for minimized thermal sensitivity of the output centroid wavelength. Modelling software can facilitate such iterative calculations. FIGS. 10 and 11, for example, illustrate results of iterative calculations to configure filter parameters to minimize the thermal sensitivity of the output centroid wavelength and to maximize relative integrated output power.

Figure 12:
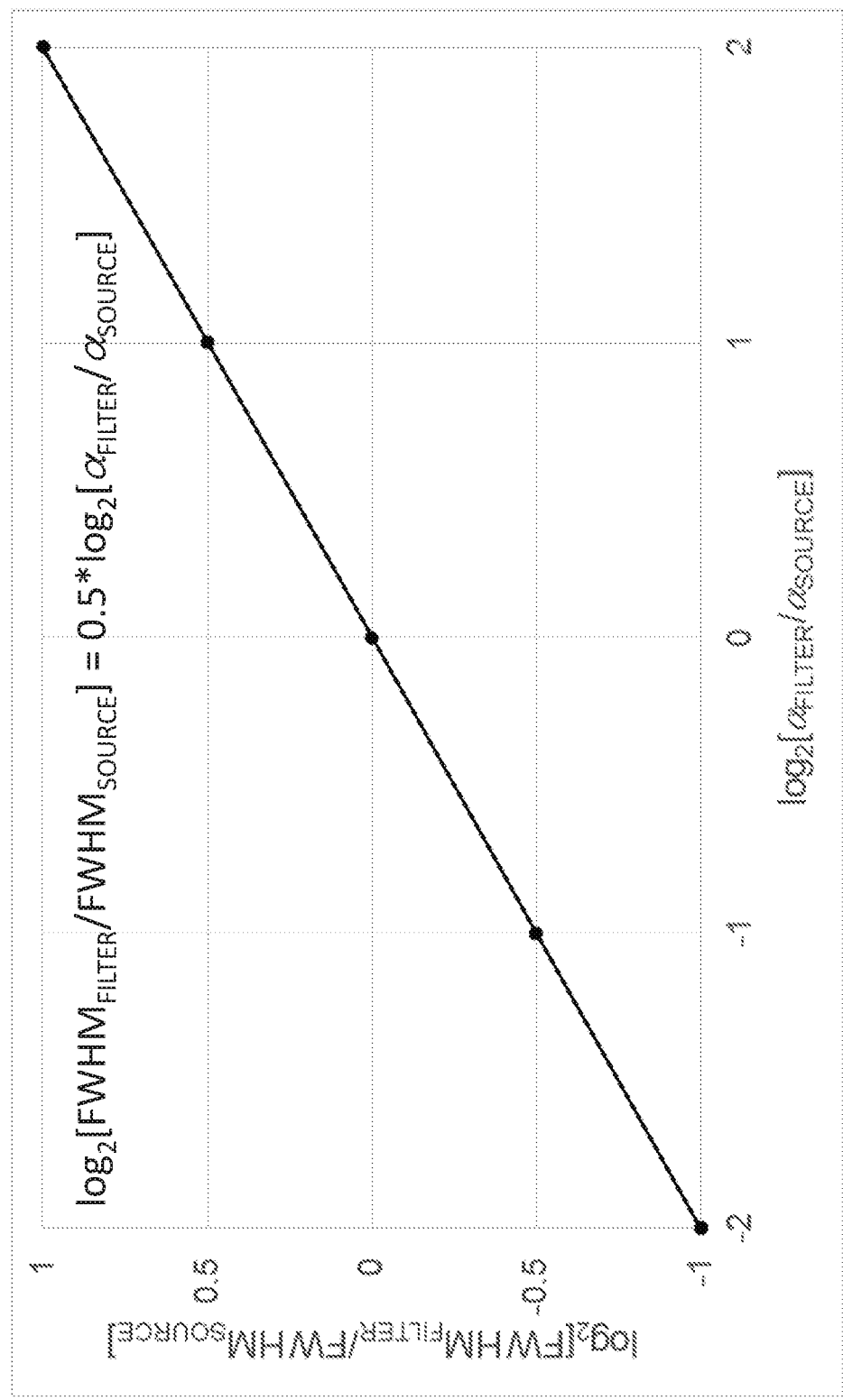
FIG. 12 shows a plot of $\log_2 [\text{FWHM}_{FILTER}/\text{FWHM}_{SOURCE}]$ vs. $\log_2 [\alpha_{FILTER}/\alpha_{SOURCE}]$ for the simulated optimal ratios of the filter width to the source width for the different thermal sensitivities of the temperature-dependent filter wavelength spectrum shown in FIG. 11.

FIG. 12 shows a plot of $\log_2$ [$FWHM_{FILTER}$/$FWHM_{SOURCE}$] vs. $\log_2$ [$\alpha_{FILTER}$/$\alpha_{SOURCE}$] for the simulated optimal ratios of $FWHM_{FILTER}$ to $FWHM_{SOURCE}$ for the different thermal sensitivities of the filter wavelength spectrum $\alpha_{FILTER}$ of filter 105 shown in FIG. 11. The plot depicts the relationship $\log_2$ [$FWHM_{FILTER}$/$FWHM_{SOURCE}$]=0.5*$\log_2$ [$\alpha_{FILTER}$/$\alpha_{SOURCE}$]. Such a relationship may be applied to optimize the ratio of $FWHM_{FILTER}$/$FWHM_{SOURCE}$ for any given thermal sensitivity of the filter wavelength spectrum of filter 105.

Figure 13:
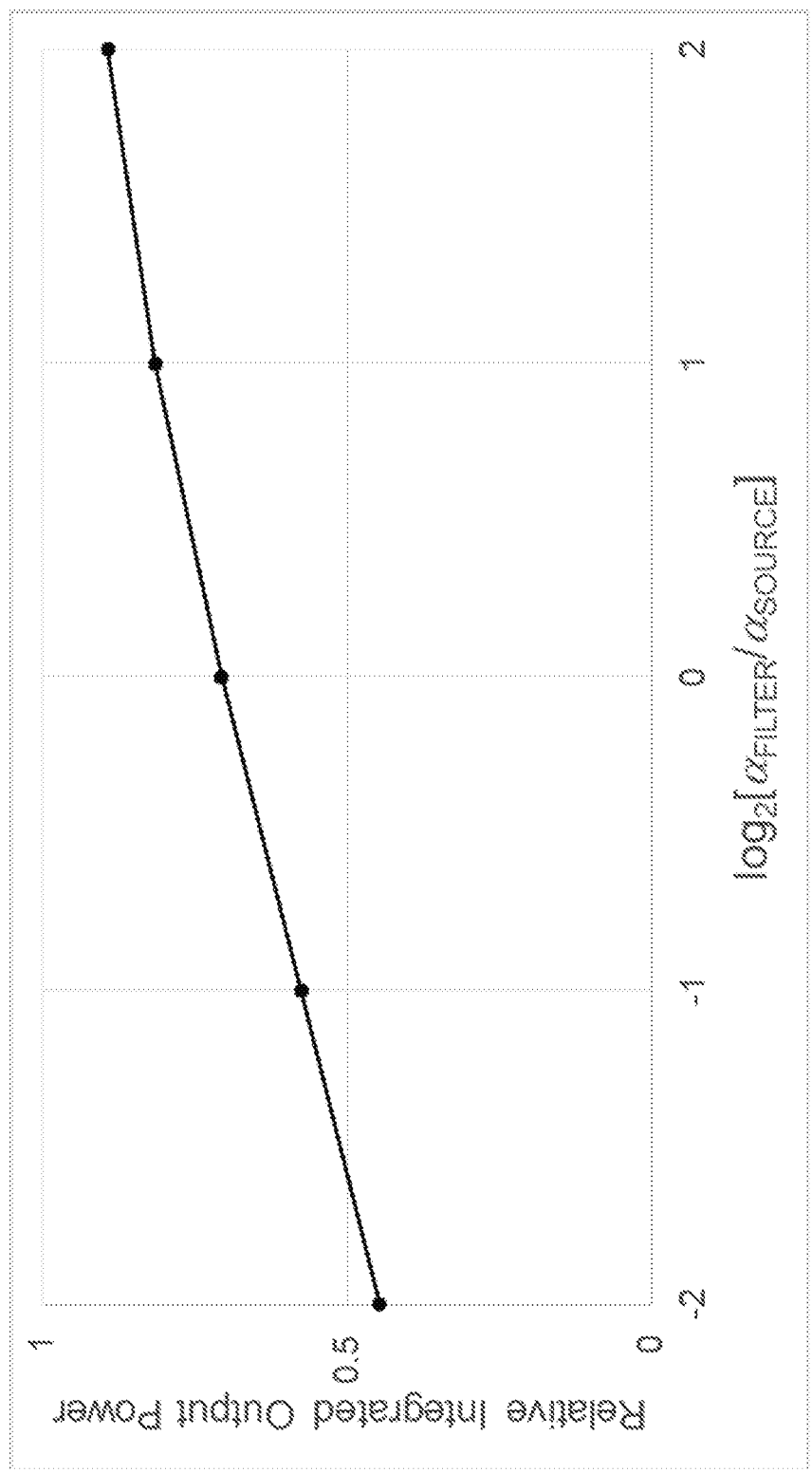
FIG. 13 shows a plot of relative integrated output power vs. $\text{Log}_2[\text{Abs}(\text{Filter centroid wavelength thermal sensitivity})]$ for the simulated optimal ratios of the filter width to the source width for the different thermal sensitivities of the temperature-dependent filter wavelength spectrum shown in FIG. 11.

FIG. 13 shows a plot of relative integrated output power vs. $\log_2$ [$\alpha_{FILTER}$/$\alpha_{SOURCE}$] for the simulated optimal ratios of $FWHM_{FILTER}$ to $FWHM_{SOURCE}$ for the different thermal sensitivities of the filter wavelength spectrum $\alpha_{FILTER}$ of filter 105 shown in FIG. 11. An advantage of embodiments encompassed by the present disclosure is evident from FIG. 13 in that the thermal sensitivity $\alpha_{OUTPUT}$ of the centroid wavelength of output light 106 can be minimized while the reduction of integrated output power is limited to only 0.45× to 0.89× over the range $-0.125$ nm/° C.$<\alpha_{FILTER}<-2$ nm/° C.

Figure 14:
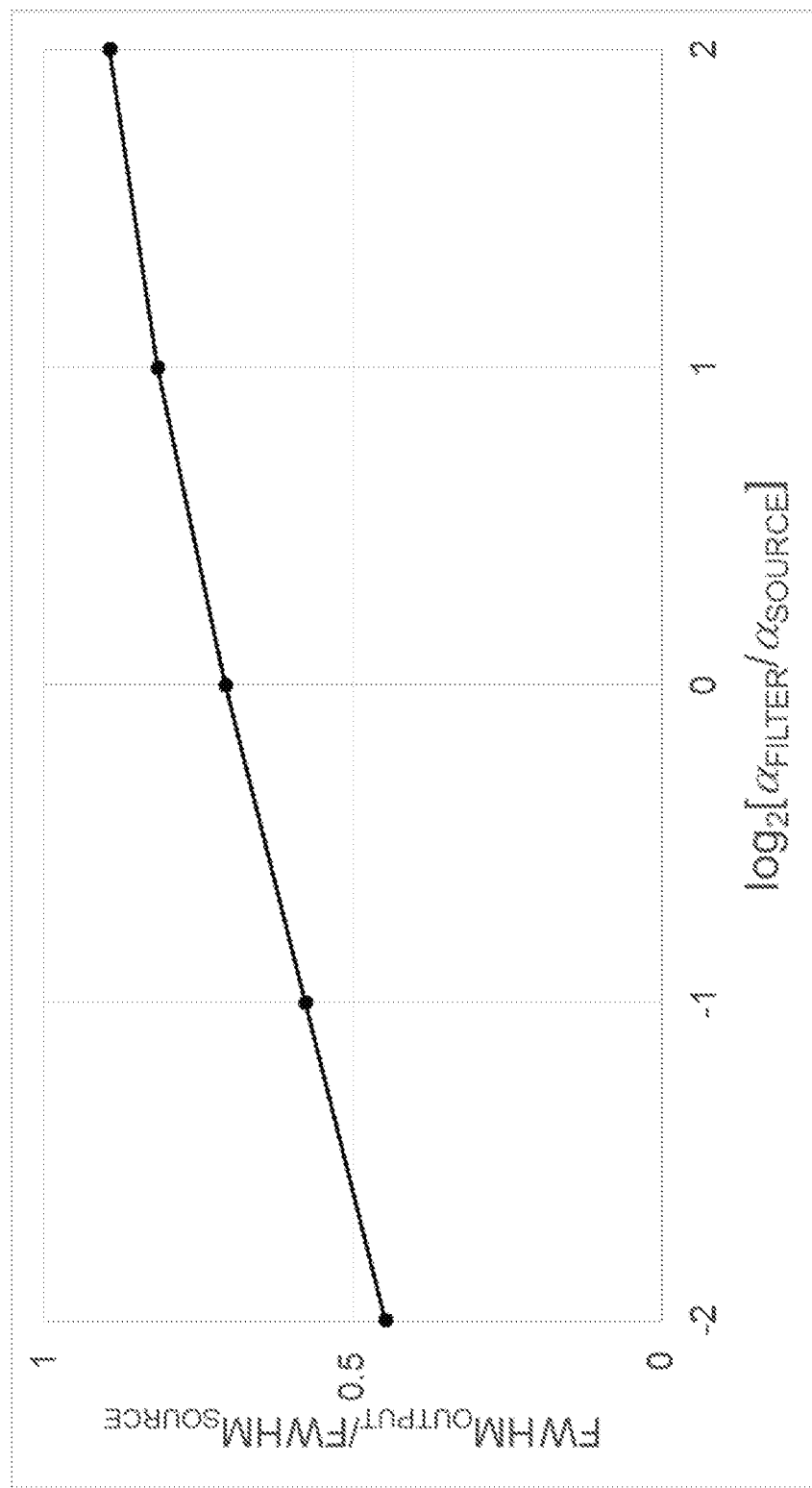
FIG. 14 shows a plot of $\text{FWHM}_{OUTPUT}/\text{FWHM}_{SOURCE}$ for the simulated optimal ratios of the filter width to the source width for the different thermal sensitivities of the temperature-dependent filter wavelength spectrum shown in FIG. 11.

FIG. 14 shows a plot of $FWHM_{OUTPUT}$/$FWHM_{SOURCE}$ vs. $\log_2$ [$\alpha_{FILTER}$/$\alpha_{SOURCE}$], where $FWHM_{OUTPUT}$ is the full width at half maximum of the output wavelength spectra 116a, 116b, 116c, 116d, and 116e, for the simulated optimal ratios of $FWHM_{FILTER}$ to $FWHM_{SOURCE}$ for the different thermal sensitivities of filter wavelength spectrum $\alpha_{FILTER}$ of filter 105 shown in FIG. 11. Another advantage of embodiments described herein is evident from FIG. 14 in that the thermal sensitivity $\alpha_{OUTPUT}$ of the centroid wavelength of output light 106 can be minimized while the reduction of $FWHM_{OUTPUT}$ is limited to only 0.45× to 0.89× over the range $-0.125$ nm/° C.$<\alpha_{FILTER}<-2$ nm/° C.

Figure 15:
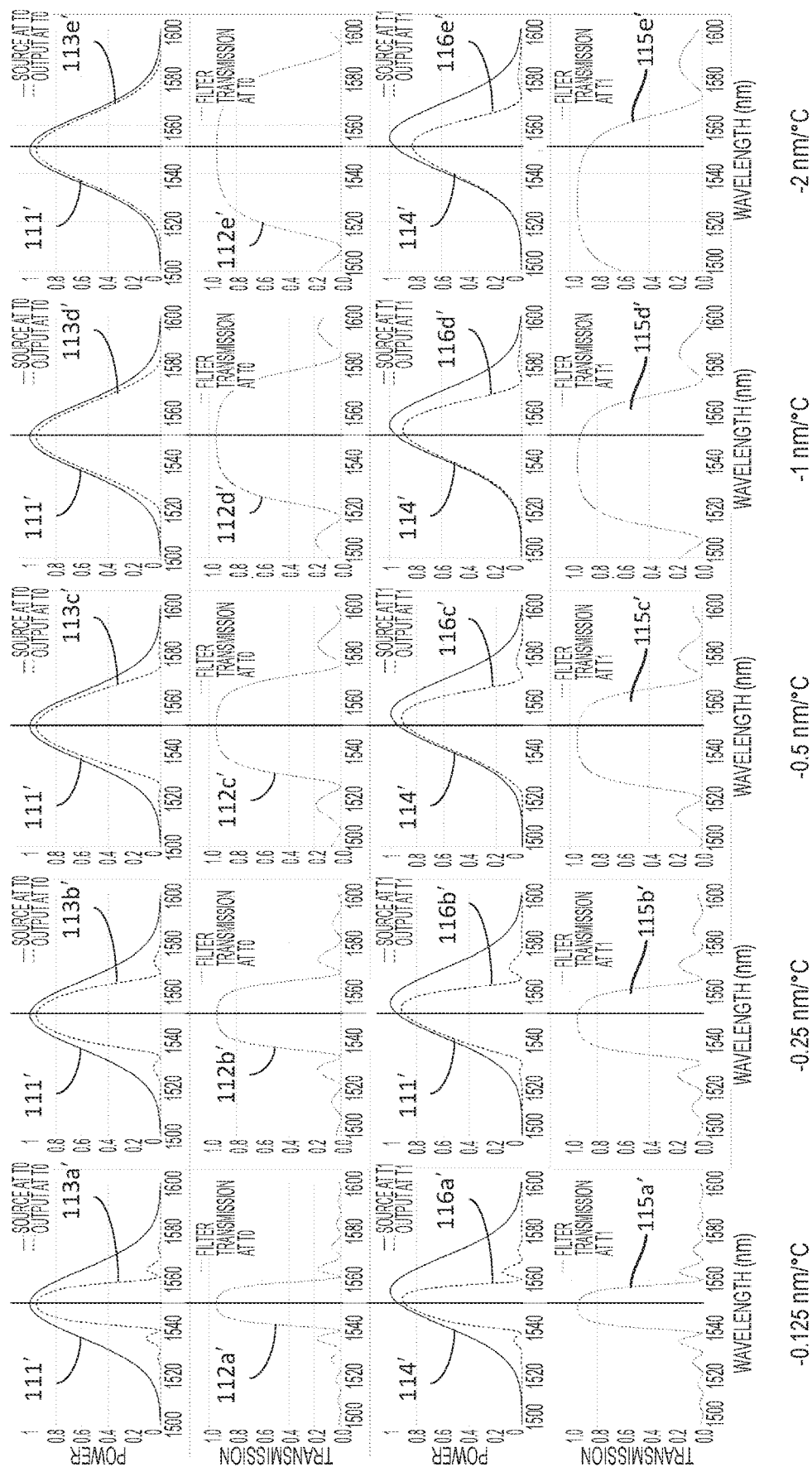
FIG. 15 shows the simulated source, filter, and output spectra with filter widths configured to minimize thermal sensitivity of the output centroid wavelength for various values of the thermal sensitivity of the filter wavelength spectrum for the apparatus shown in FIG. 8 whereby the temperature-dependent filter has a transmission spectrum characteristic of a Bragg grating.

FIG. 15 shows exemplary simulated source wavelength spectrum 111', filter wavelength spectra 112a', 112b', 112c', 112d', and 112e', and output wavelength spectra 113a', 113b', 113c', 113d', and 113e' determined by the product of the source wavelength spectrum and filter wavelength spectra, at temperature $T_0$; and exemplary simulated source wavelength spectrum 114', filter wavelength spectra 115a', 115b', 115c', 115d', and 115e', and output wavelength spectra 116a', 116b', 116c', 116d', and 116e', determined by the product of the source wavelength spectrum and filter wavelength spectra, at temperature $T_1$, where $T_1>T_0$; for light source apparatus 100 whereby source wavelength spectra 111' and 114' are characterized by Gaussian functions, filter wavelength spectra 112a', 112b', 112c', 112d', and 112e' and 115a', 115b', 115c', 115d', and 115e' are characterized by functions characteristic of a Bragg grating, both source wavelength spectrum 111' and each of filter wavelength spectra 112a', 112b', 112c', 112d', and 112e' have a maximum at 1550 nm at $T_0$, and $FWHM_{SOURCE}$ is 33 nm.

Figure 16:
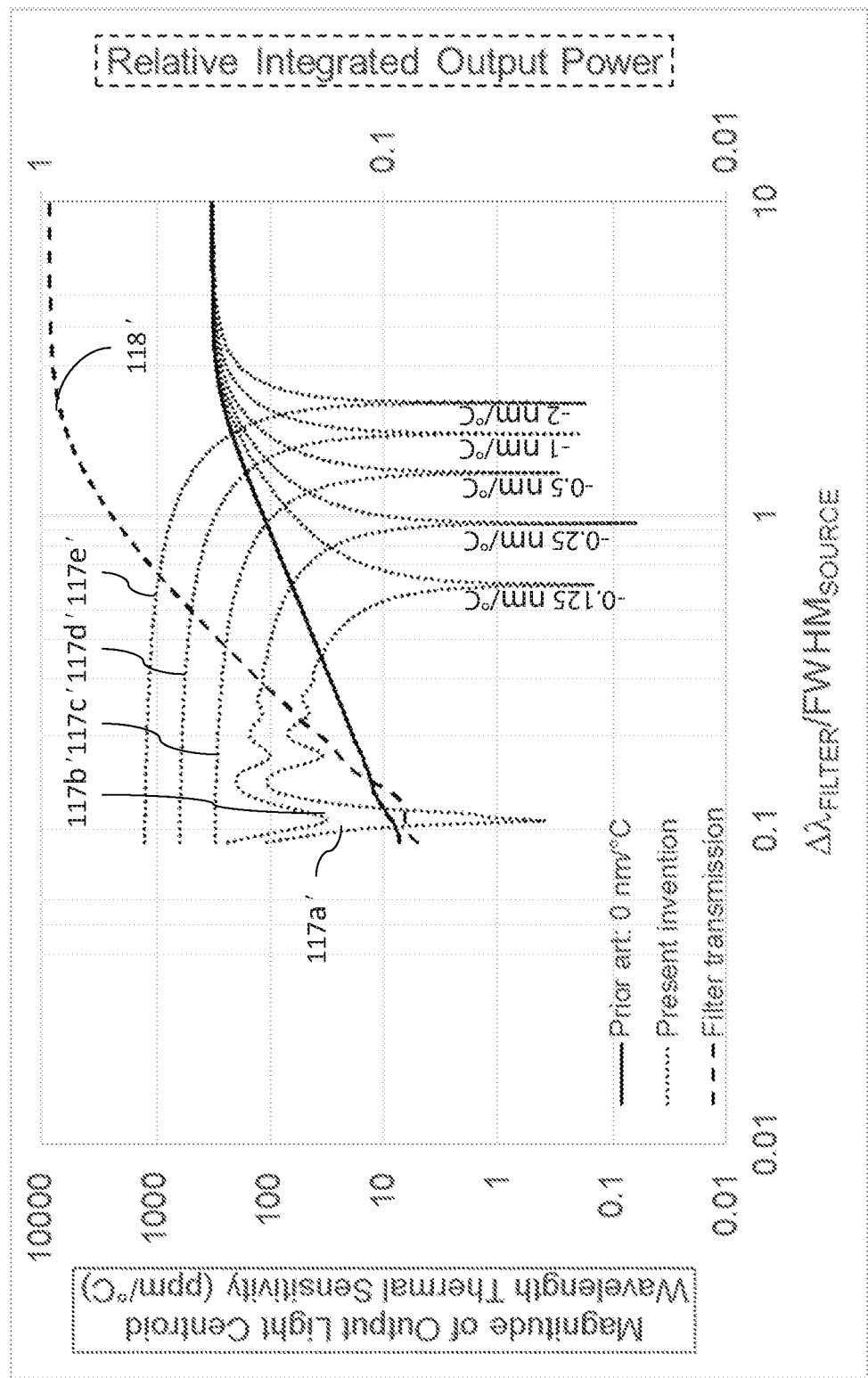
FIG. 16 shows a simulated dependence of the thermal sensitivity of the output light centroid wavelength and the integrated optical power on the ratio of the filter width to the source width for different thermal sensitivities of the temperature-dependent filter wavelength spectrum given the spectra shown in FIG. 15.

The width between the first zeros on either side of the maximum reflectivity ($\Delta\lambda_{FILTER}$) spectral characteristic of each filter wavelength spectrum 112a', 112b', 112c', 112d', and 112e' is configured to minimize the thermal sensitivity of the output centroid wavelength of output light 106 for filter wavelength spectrum sensitivities $\alpha_{FILTER}$ of $-0.125$ nm/° C., $-0.25$ nm/° C., $-0.5$ nm/° C., $-1$ nm/° C., and $-2$ nm/° C., respectively. FIG. 16 shows a simulated dependence of the thermal sensitivity $\alpha_{OUTPUT}$ 117a', 117b', 117c', 117d', and 117e' of the output centroid wavelength of output light 106 between $T_0$ and $T_1$ (solid curve), and a simulated dependence of the relative integrated output power 118' of output light 106 averaged over a temperature range of 1° C. (dashed curve), on the ratio of $\Delta\lambda_{FILTER}$ of filter wavelength spectra 112a', 112b', 112c', 112d', and 112e' to $FWHM_{SOURCE}$ of source wavelength spectra 111' and 114' corresponding to the wavelength spectra shown in FIG. 15, whereby the inherent thermal sensitivity $\alpha_{SOURCE}$ of the centroid wavelength of source 103 is +0.5 nm/° C. or +323 ppm/° C.

It is evident in FIG. 16 that for given characteristics of the emission wavelength spectrum, for example $FWHM_{SOURCE}$, of source 103 and for given inherent thermal sensitivity of the centroid wavelength of the source wavelength spectrum of source 103, the thermal sensitivity of the output centroid wavelength of output light 106 can be minimized, i.e., stabilized, for appropriate combinations of the characteristics of the filter wavelength spectrum, for example $\Delta\lambda_{FILTER}$, of filter 105 and magnitude of the thermal sensitivity of the filter wavelength spectrum of filter 105 when the sign of the thermal sensitivity of the filter wavelength spectrum of filter 105 is opposite to the sign of the inherent thermal sensitivity of the centroid wavelength of the source wavelength spectrum of source 103.

Figure 17:
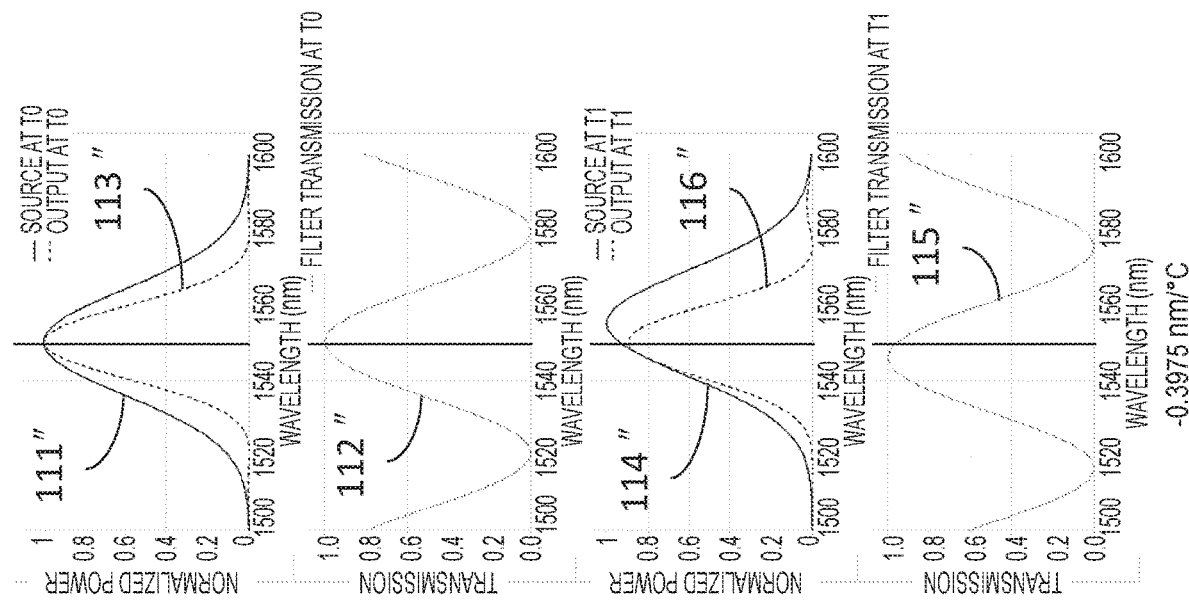
FIG. 17 shows the simulated source, filter, and output spectra with filter widths configured to minimize the thermal sensitivity of the output centroid wavelength for various values of thermal sensitivity of the filter wavelength spectrum for the apparatus shown in FIG. 8 whereby the temperature-dependent filter has a raised sinusoidal transmission spectrum.

FIG. 17 shows exemplary simulated source wavelength spectrum 111'', filter wavelength spectrum 112'', and output wavelength spectrum 113'', determined by the product of the source wavelength spectrum and filter wavelength spectrum, at temperature $T_0$; and exemplary simulated source wavelength spectrum 114'', filter wavelength spectrum 115'', and output wavelength spectrum 116'', determined by the product of the source wavelength spectrum and filter wavelength spectrum, at temperature $T_1$, where $T_1>T_0$; for light source apparatus 100 whereby source wavelength spectra 111'' and 114'' are characterized by Gaussian functions, filter wavelength spectra 112'' and 115'' are characterized by raised sinusoidal functions, both source wavelength spectrum 111'' and filter wavelength spectrum 112'' have a maximum at 1550 nm at $T_0$, and $FWHM_{SOURCE}$ is 33 nm.

The width as defined by one half of the free spectral range ($HFSR_{FILTER}$) of the raised sinusoidal function spectral characteristic of filter wavelength spectrum 112'' is optimized to minimize the thermal sensitivity of the output centroid wavelength of output light 106 for the combination of $HFSR_{FILTER}$=0.836*$FWHM_{SOURCE}$ and thermal sensitivity of the filter wavelength spectrum $\alpha_{FILTER}$–0.3975 nm/° C.

Figure 18:
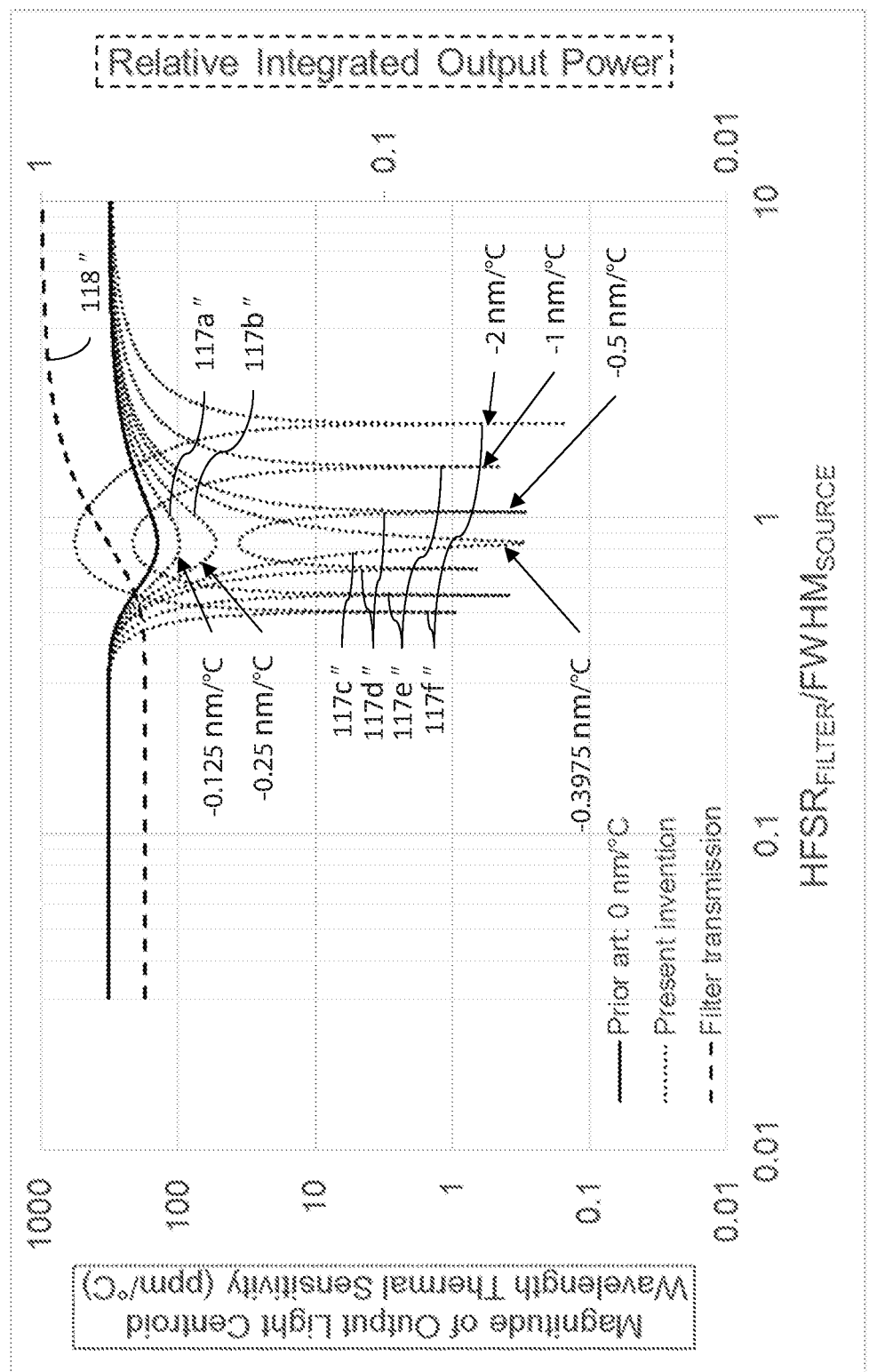
FIG. 18 shows a simulated dependence of the thermal sensitivity of the output light centroid wavelength and the integrated optical power on the ratio of the filter width to the source width for different thermal sensitivities of the temperature-dependent filter wavelength spectrum given the spectra shown in FIG. 17.

FIG. 18 shows a simulated dependence of the thermal sensitivity $\alpha_{OUTPUT}$ 117a'', 117b'', 117c'', 117d'', 117e'', and 117f'' of the output centroid wavelength of output light 106 between $T_0$ and $T_1$ (solid curve), and a simulated dependence of the relative integrated output power 118'' of output light 106 averaged over a temperature range of 1° C. (dashed curve), on the ratio of $HFSR_{FILTER}$ of filter wavelength spectrum 112'' to $FWHM_{SOURCE}$ of source wavelength spectra 111'' and 114'' corresponding to the wavelength spectra shown in FIG. 17, whereby the inherent thermal sensitivity $\alpha_{SOURCE}$ of the centroid wavelength of source 103 is +0.5 nm/° C. or +323 ppm/° C.

It is evident in FIG. 18 that for given characteristics of the emission wavelength spectrum, for example $FWHM_{SOURCE}$, of source 103 and for given inherent thermal sensitivity of the centroid wavelength of source 103, the thermal sensitivity of the output centroid wavelength of output light 106 can be minimized, and therefore stabilized, for appropriate combinations of the characteristics of the filter wavelength spectrum, for example $HFSR_{FILTER}$, of filter 105 and magnitude of the thermal sensitivity of the filter wavelength spectrum of filter 105 when the sign of the thermal sensitivity of the filter wavelength spectrum of filter 105 is opposite to the sign of the inherent thermal sensitivity of the centroid wavelength of the source wavelength spectrum of source 103. In particular, for the combination of a source wavelength spectrum characterized by a Gaussian function and a filter wavelength spectrum characterized by a raised sinusoidal function, the thermal sensitivity of the output centroid wavelength of output light 106 is minimized for one particular value of the ratio of $HFSR_{FILTER}$ to $FWHM_{SOURCE}$, in this case $0.836*FWHM_{SOURCE}$ given the inherent thermal sensitivity of the centroid wavelength of the source wavelength spectrum of source 103, whereby this minimization is enhanced as the thermal sensitivity of the filter wavelength spectrum of filter 105 becomes more negative in sign until a certain value, in this case −0.3975 nm/° C., for which the minimization of the thermal sensitivity of the output centroid wavelength of the output wavelength spectrum output light 106 is optimized, and whereby the optimal ratio of $HFSR_{FILTER}$ to $FWHM_{SOURCE}$ becomes dual-valued as the thermal sensitivity of the filter wavelength spectrum of filter 105 becomes even more negative beyond that certain value.

Although the exemplary source and filter wavelength spectra shown in FIGS. 10, 15 and 17 depict specific spectral characteristics such as peak wavelength, spectral width and generally spectral shape or functional form, embodiments within the scope of the present disclosure are not limited to any particular set of spectral characteristics. For example, source and filter wavelength spectra may be non-Gaussian, non-symmetric, etc. As such, a further advantage of embodiments is that the filter optimization described herein to minimize thermal sensitivity of output centroid wavelength, maximize relative integrated output power, or both may be applied in the case of particular known source wavelength spectrum.

Figure 19:
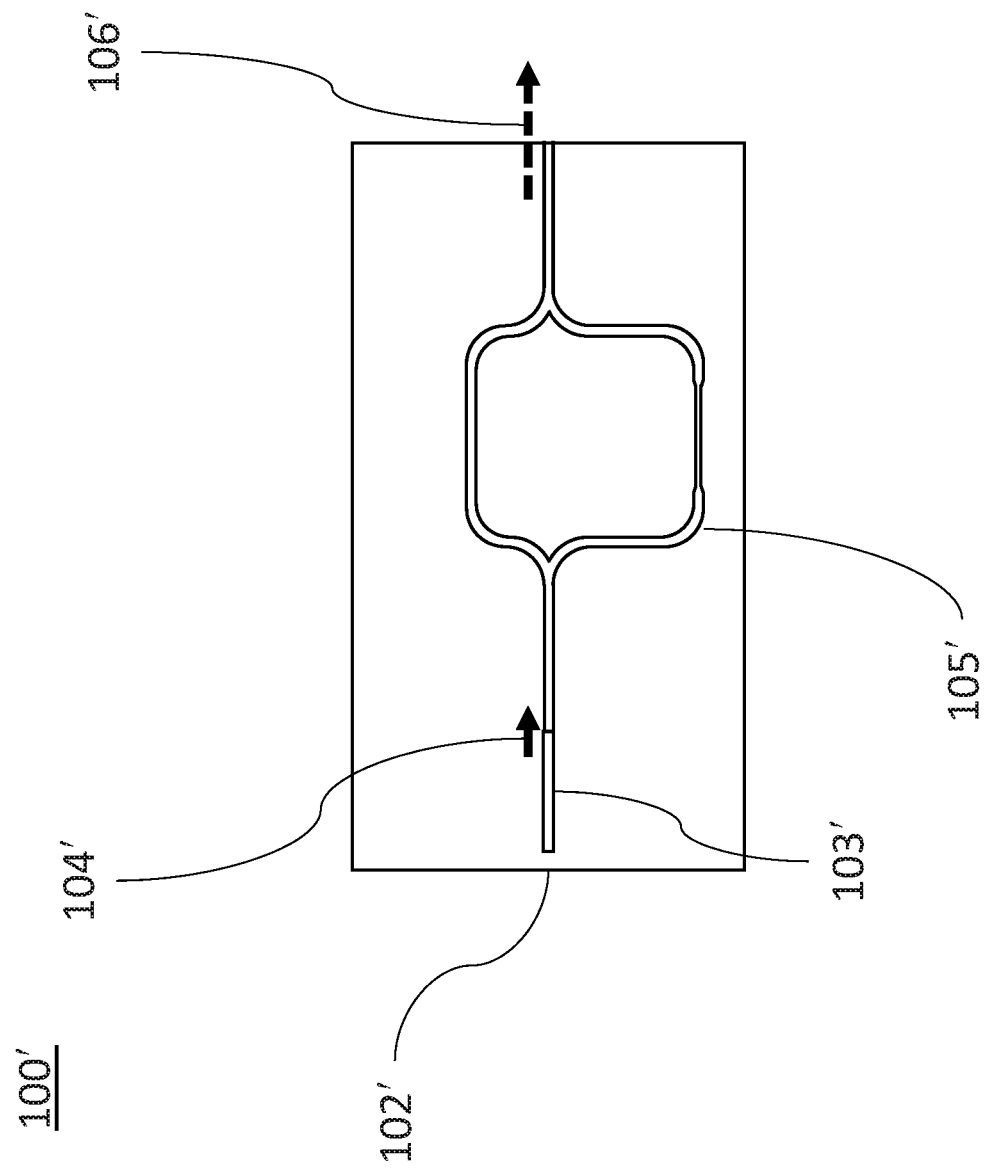
FIG. 19 is a schematic view of the wavelength-stabilized light source apparatus of FIG. 8 comprising an asymmetric Mach-Zehnder interferometer (MZI) structure according to a further embodiment.

Referring to FIG. 19, according to a further embodiment, a broadband optical filter 105' of passively wavelength-stabilized broadband light source apparatus 100' may include at least one asymmetric Mach-Zehnder interferometer (MZI) structure whose wavelength spectrum is known to be characterized by a raised sinusoidal function. Source 103' and filter 105' may include discrete components in optical communication, for example via optical fiber.

As an alternative to discrete components, source 103' and filter 105' may include features of an integrated photonic device, for example an integrated photonic device comprising waveguides formed by patterning features into combinations of indium phosphide layers and quarternary indium gallium arsenide phosphide layers epitaxially grown on an indium phosphide substrate using deposition processes such as low-pressure metal organic chemical vapor deposition as known in the art.

As a further alternative, source 103' and filter 105' may include separate components wafer-bonded or butt-coupled together, for example an indium phosphide SLD source bonded or butt-coupled to a filter comprising waveguides formed by patterning features into silicon or silicon nitride films as known in the art. An important advantage of integrated photonic devices, wafer-bonded devices and butt-coupled devices is that the temperature of source 103' and filter 105' may be matched with excellent precision due to their close proximity.

Figure 20:
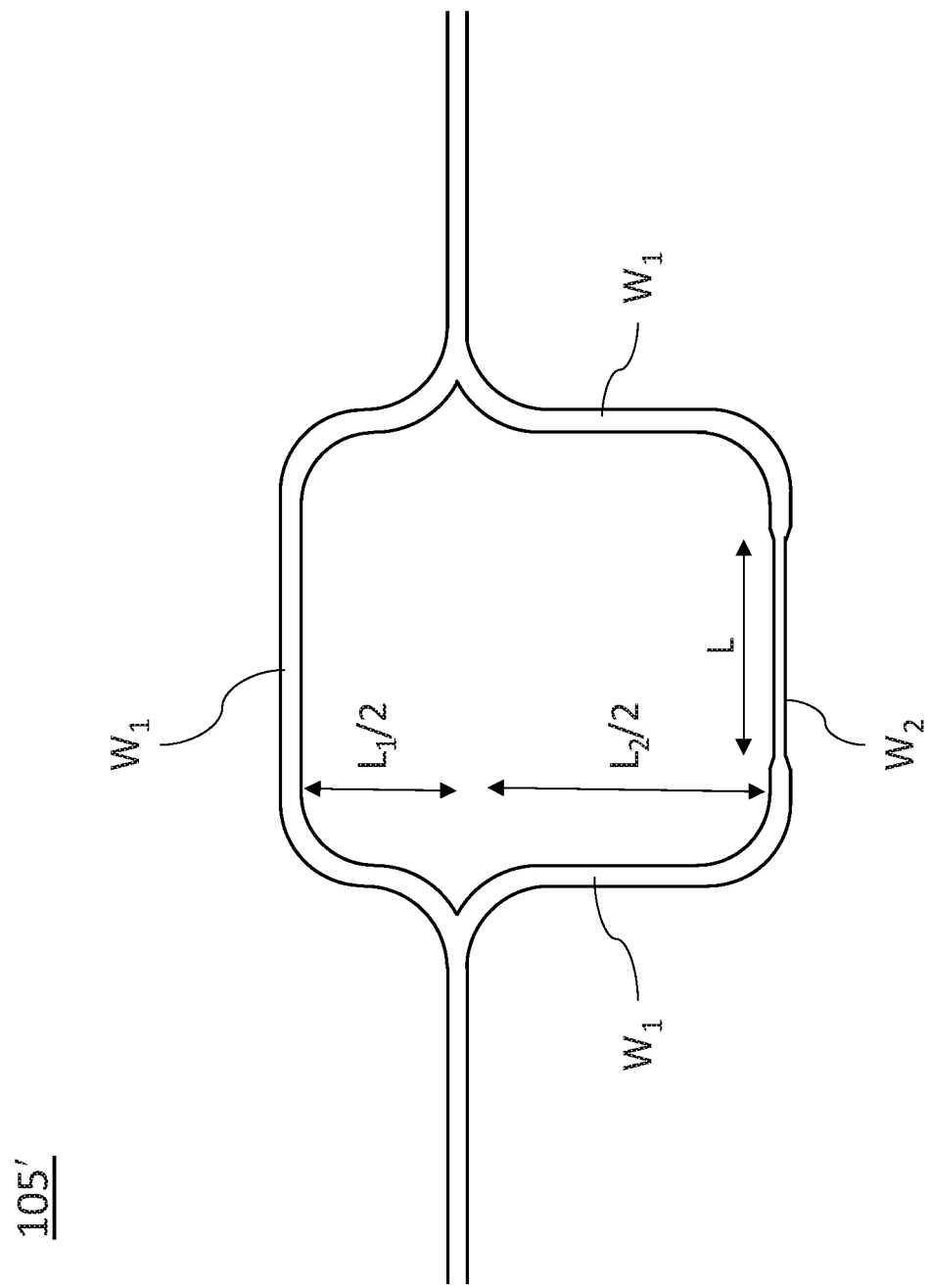
FIG. 20 shows a detail view of the asymmetric MZI structure of FIG. 19.

FIG. 20 shows a detail view of asymmetric MZI structure 105' shown in FIG. 19. Filter 105' works on the principle that the guided mode encounters different changes of effective mode index $n_{eff}$ with temperature T, i.e., different $\partial n_{eff}/\partial T$, in the two arms of the asymmetric MZI structure, induced by different waveguide widths, and by careful design of the arm lengths the relative temperature sensitivity between the arms is set to achieve an overall thermal sensitivity of the filter wavelength spectrum configured to minimize the thermal sensitivity of the output centroid wavelength.

The asymmetric MZI structure includes two Y-junctions that respectively split into and combine two arms. Alternatively the two arms of filter 105' may be coupled using directional couplers or multimode interferometers. While one of the arms propagates a length of L horizontally and $L_1$ vertically with constant waveguide width of $W_1$, the other arm propagates a length $L_2$ with waveguide width of $W_1$ and tapers down to a width of $W_2$ for length L, where $W_2<W_1$. The overall thermal sensitivity of the filter wavelength spectrum of filter 105' can be derived from the temperature dependence of the net optical path length, given by the difference in propagating lengths in the two arms ($\Delta L$) with a given $n_{eff}$ and the difference in mode indices ($\Delta n_{eff}$) over a fixed length (L). It can be expressed as Eq. (1):

$$m\lambda_0 = n_{eff} \cdot \Delta L + \Delta n_{eff} \cdot L$$

Here $\Delta L = L_2 - L_1$, $\Delta n_{eff} = n_{eff}(W_2) - n_{eff}(W_1)$ and m is the interference order at a given wavelength ($\lambda_0$). m can be chosen to be an integer to give constructive interference at that wavelength, or a half-integer to give destructive interference. Alternatively the different $\partial n_{eff}/\partial T$ in the two arms of the MZI structure may be induced by a difference in core and/or cladding materials having different refractive indices. Due to waveguide dispersion (the change in $n_{eff}$ with wavelength $\lambda$, i.e., $\partial n_{eff}/\partial \lambda$), the interference order is modified as expressed by Eq. (2):

$$M = m - \Delta L \cdot \frac{\partial n_{eff}}{\partial \lambda} - L \cdot \frac{\partial(\Delta n_{eff})}{\partial \lambda}$$

The thermal sensitivity of any minima point of the spectrum ($\lambda_0$) can then be expressed as Eq. (3):

$$\frac{\Delta \lambda_0}{\Delta T} = \frac{\Delta L \cdot \frac{\partial n_{eff}}{\partial \lambda} + L \cdot \frac{\partial(\Delta n_{eff})}{\partial \lambda}}{M}$$

From Eq. (3) it can be shown that if $\Delta L$ and $\Delta n_{eff}$ are chosen appropriately, the minima shift can be set to achieve an overall thermal sensitivity of the filter wavelength spectrum configured to minimize the thermal sensitivity of the output centroid wavelength.

Figure 21:
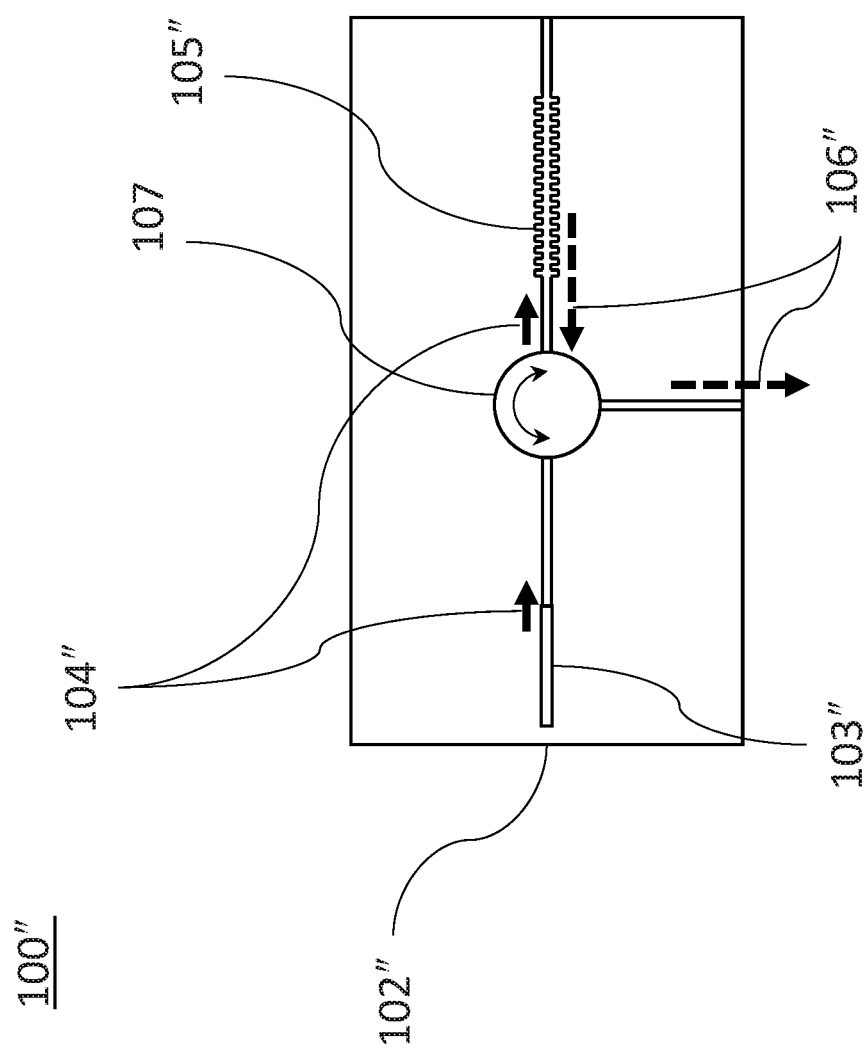
FIG. 21 is a schematic view of the apparatus of FIG. 8, wherein the broadband optical filter includes a waveguide Bragg grating structure according to a further embodiment.

Referring to FIG. 21, according to a further embodiment, a broadband optical filter 105" of passively wavelength-stabilized broadband light source apparatus 100" may include at least one waveguide Bragg grating structure. Emission light 104" is shown to be delivered to filter 105" by circulator 107, and output light 106" is shown to be reflected from filter 105" and delivered by circulator 107 to an output of apparatus 100". Source 103" and filter 105" may include discrete components in optical communication, for example via optical fiber. Alternatively source 103" and filter 105" may include features of an integrated photonic device. Alternatively source 103" and filter 105" may include separate components wafer-bonded or butt-coupled together. An important advantage of integrated photonic devices, wafer-bonded devices and butt-coupled devices is that the temperature of source 103" and filter 105" may be easily matched with excellent precision due to their close proximity.

Figure 22:
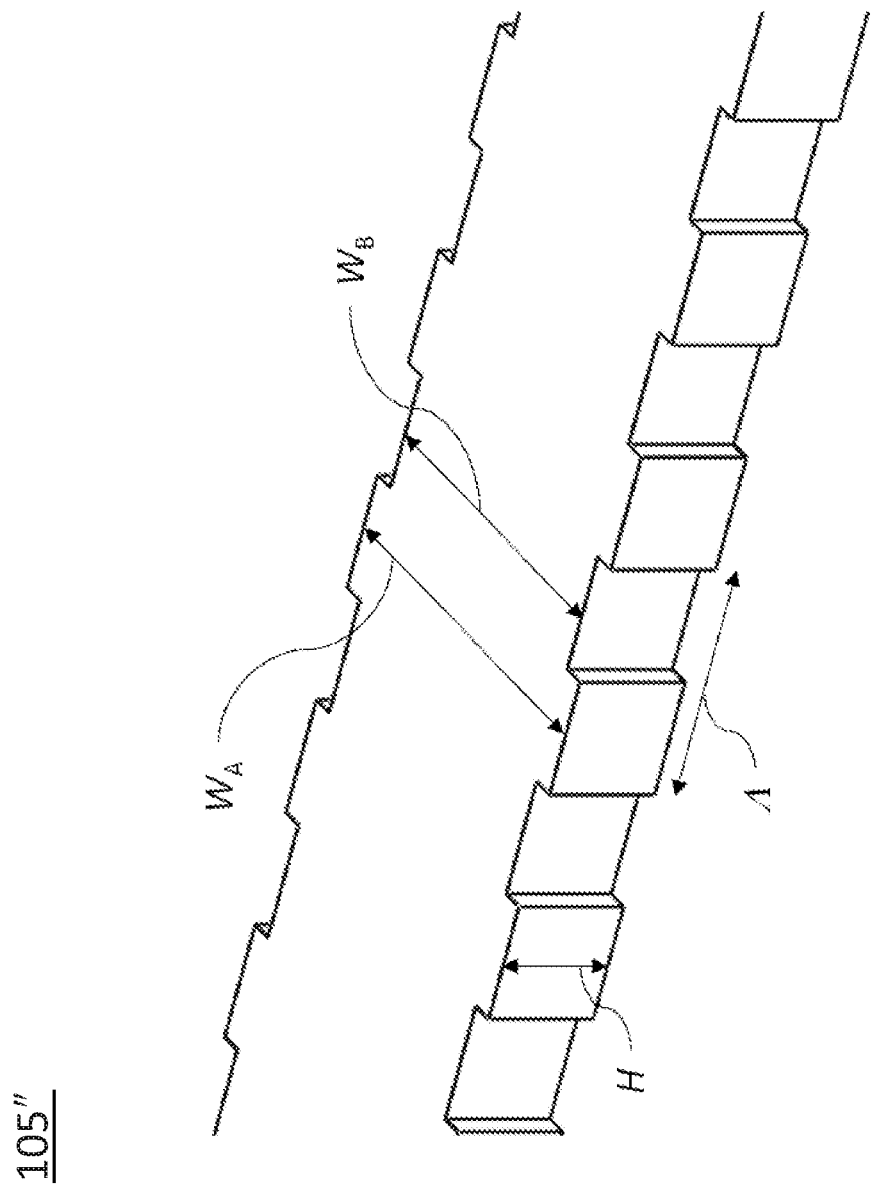
FIG. 22 shows a detail view of the waveguide Bragg grating structure of FIG. 21.

FIG. 22 shows a detail view of filter 105" shown in FIG. 21. In the embodiment shown the waveguide Bragg grating structure includes a planar core material with refractive index $n_{core}$ having height H and periodically alternating segments with widths $W_A$ and $W_B$, where $W_B < W_A$, with periodicity Λ; surrounded by at least one cladding material with refractive index $n_{cladding}$, where $n_{cladding} < n_{core}$. Alternatively filter 105" may include a fiber Bragg grating (FBG). The Bragg wavelength $\lambda_B$, which is the wavelength for peak reflectivity of the filter reflection spectrum such as 112a', 112b', 112c', 112d', or 112e', is a function of the effective mode index $n_{eff}$ and the grating period Λ as expressed by Eq. (4):

$$\lambda_B = 2n_{eff}\Lambda$$

Eq. (4) may be differentiated with respect to temperature T to obtain the variation of $\lambda_B$ with respect to T as expressed by Eq. (5):

$$\frac{\partial \lambda_B}{\partial T} = 2\left(\Lambda \cdot \frac{\partial n_{eff}}{\partial T} + n_{eff} \cdot \frac{\partial \Lambda}{\partial T}\right)$$

From Eq. (5) it can be shown that if $n_{eff}$, Λ, $$\frac{\partial n_{eff}}{\partial T}, \text{ and } \frac{\partial \Lambda}{\partial T}$$

are chosen appropriately, the $\lambda_B$ shift can be set to achieve an overall thermal sensitivity of the filter wavelength spectrum configured to minimize the thermal sensitivity of the output centroid wavelength. $n_{eff}$ and the effective thermo-optic coefficient $$\frac{\partial n_{eff}}{\partial T}$$

are functions of $n_{core}$ and $n_{cladding}$. When the inherent centroid wavelength thermal sensitivity of source 103' is greater than zero, as is typical for SLDs and REDSLSs, embodiments require that $$\frac{\partial \lambda_B}{\partial T}$$

be less than zero, so $$\Lambda \cdot \frac{\partial n_{eff}}{\partial T} + n_{eff} \cdot \frac{\partial \Lambda}{\partial T}$$

must be less than zero and hence $$\frac{\partial n_{eff}}{\partial T}$$

must be less than zero and/or $$\frac{\partial \Lambda}{\partial T}$$

must be less than zero. Anatase titanium dioxide ($TiO_2$) is an example of a material known to have negative thermooptic coefficient of about $-4.9 \times 10^{-5}$ $K^{-1}$, so core or cladding material comprising anatase $TiO_2$ can be used to design a Bragg grating with $$\frac{\partial \lambda_B}{\partial T} < 0.$$

Other examples of materials known to have negative thermooptic coefficient include certain glasses such as certain phosphate glasses and fluoride glasses, certain polymers such as polymethylmethacrylate (PMMA), polydimethylsiloxane (PDMS), polyimide, and benzocyclobutene (BCB), and organic-inorganic hybrid materials such as materials of 3-acryloxypropyl trimethoxysilane and 4,4'-(hexafluoroisopropylidene)diphenol. These other materials, therefore, can also be used for a core or cladding in embodiment devices. Furthermore, a stand-alone optical waveguide Bragg grating structure, even separate from the broadband source stabilization apparatus and methods described herein, may include an optical core and an optical cladding surrounding the core, and at least one of the optical core and optical cladding can include $TiO_2$ or another example material above having a negative thermooptic coefficient. In certain embodiments, the optical waveguide Bragg grating structure can be a broadband optical filter characterized by a filter wavelength spectrum having thermal sensitivity of the filter wavelength spectrum that is negative in sign.

Figure 23:
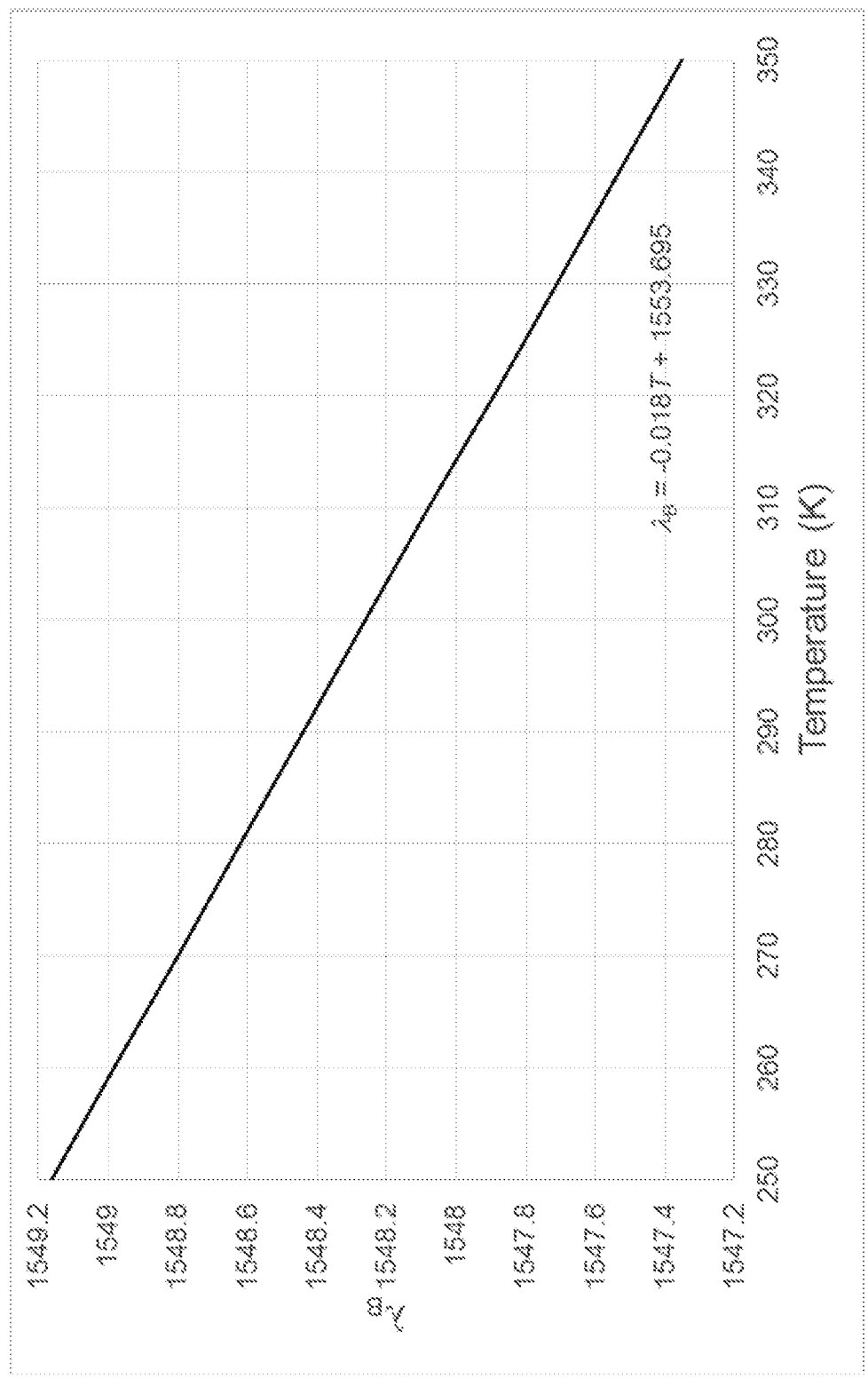
FIG. 23 shows a plot of Bragg wavelength vs. temperature for the Bragg grating structure of FIGS. 21 and 22.

FIG. 23 shows a plot of $\lambda_B$ vs. T depicting the negative thermal sensitivity of $-0.018$ nm/K for the filter wavelength spectrum of filter 105" shown in FIGS. 21 and 22 where, by way of example, $W_A = 800$ nm, $W_B = 700$ nm, $H = 220$ nm, $\Lambda = 458$ nm, the core material is anatase $TiO_2$ having a refractive index of 2.41 at 1550 nm and a thermo-optic coefficient of $-4.9 \times 10^{-5}$ $K^{-1}$, and the cladding material surrounding the core is silicon dioxide ($SiO_2$) having a refractive index of 1.444 at 1550 nm and a thermo-optic coefficient of $1 \times 10^{-5}$ $K^{-1}$.

Figure 24:
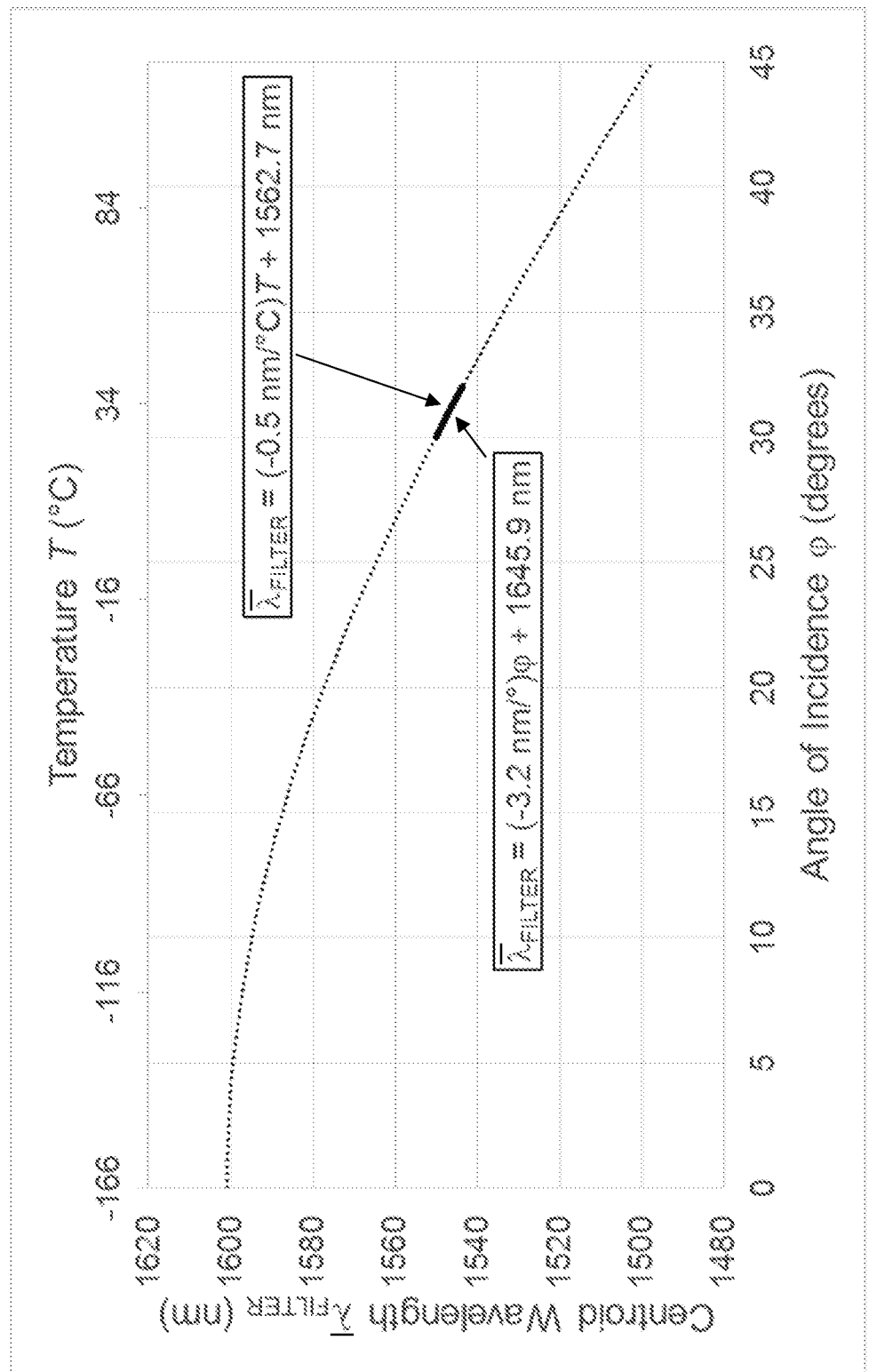
FIG. 24 shows the simulated dependence of the filter wavelength spectrum on the angle of incidence for an interference filter according to another embodiment.

According to a different further embodiment, a broadband optical filter 105''' may include at least one interference filter. It is known in the art that the wavelength spectrum of an interference filter is dependent upon the angle of the incident light with respect to the multilayer interference coating. This dependence to a near approximation is described by $$\sqrt{1 - \left(\frac{\sin\varphi}{N}\right)^2}$$

where φ is the angle of incidence, and N is the effective refractive index of the multilayer interference coating. The effective refractive index of the coating is determined by the coating materials used and the sequence of thin-film layers in the coating. FIG. 24 shows the simulated dependence for an interference filter with peak wavelength 1601 nm and $N = 2$. Tilting the filter with respect to the light path axis causes the transmission spectrum of the filter to shift to shorter wavelengths. In particular, over an angle of incidence range of 30°<φ<32°, the corresponding peak wavelength spans 1550 nm>$\bar{\lambda}_{FILTER}$>1544 nm and is approximated by a linear dependence given by (−3.2 nm/°)φ+1645.9 nm. The secondary horizontal axis shown at the top of the plot in FIG. 24 indicates an exemplary temperature T dependence desirable for a filter whose peak wavelength is 1550 nm at 25° C. and whose temperature sensitivity $\alpha_{FILTER}$ is −0.5 nm/° C. in the temperature range 25° C.<T<38° C., which is approximated by a linear dependence given by (−0.5 nm/° C.)T+1562.7 nm.

Figure 25:
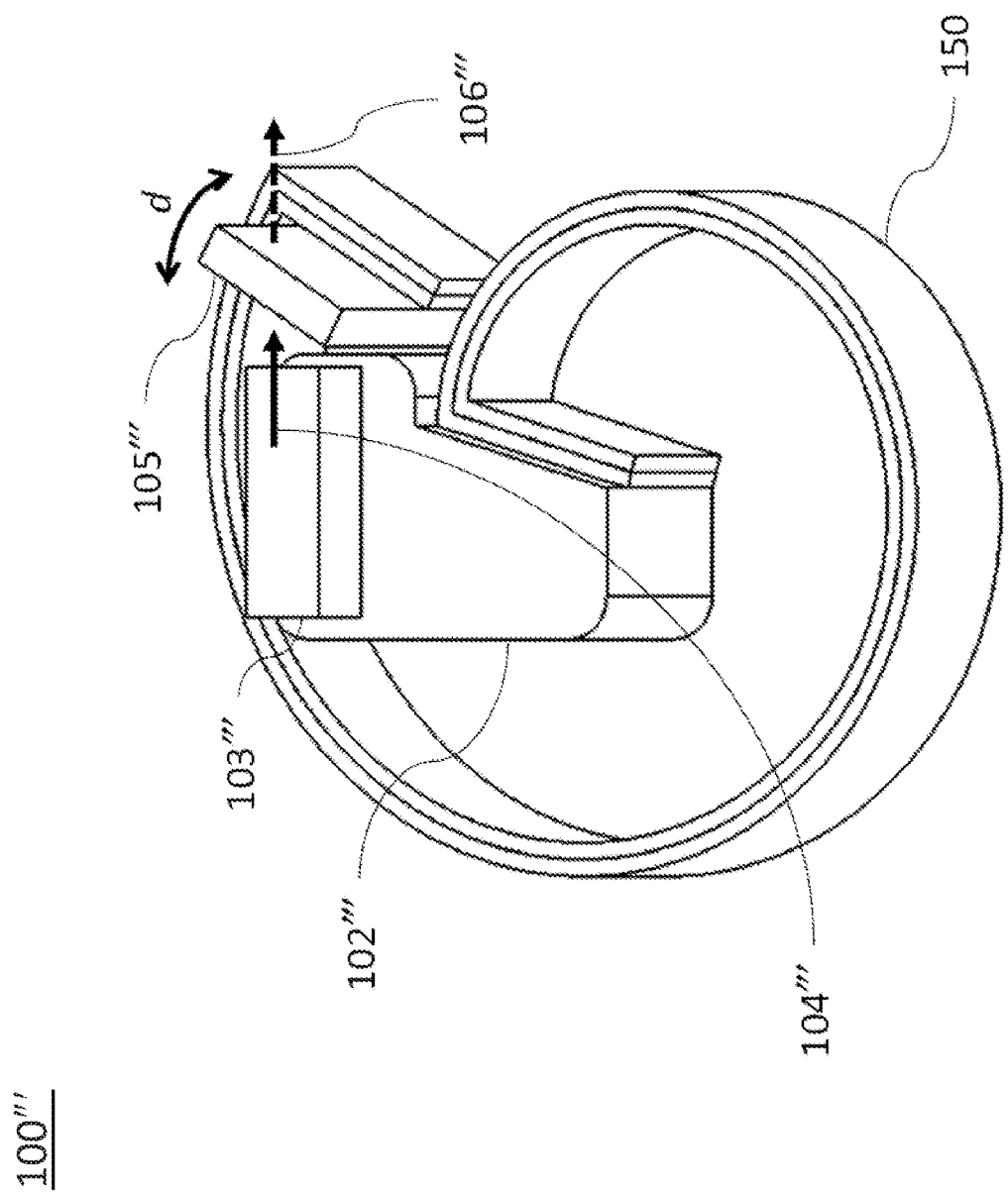
FIG. 25 is a schematic view of the apparatus of FIG. 8, further comprising a bi-material strip according to another embodiment.

FIG. 24 indicates that an exemplary dependence of angle of incidence p on temperature T of (−0.5 nm/° C.)/(−3.2 nm/°)=0.156°/° C. would be desirable in the case described. FIG. 25 is a schematic view of passively wavelength-stabilized broadband light source apparatus 100''' comprising bi-material strip 150 that is attached and in thermal contact with mount 102'''. Bi-material strip 150 includes two materials with dissimilar coefficients of thermal expansion for inducing a temperature-dependent deflection as known in the art. Bi-material strip 150 is shown in FIG. 25 to have the form of a spiral. Alternatively bi-material strip 150 may have a different form, for example a beam.

Filter 105''' is mechanically attached to the other end of bi-material strip 150 such that the emission light 104''' from source 103''' is aimed to transmit through filter 105''', resulting in output light 106'''. Bi-material strip 150 is designed to position filter 105''' such that emission light 104''' is incident upon filter 105''' at a 300 angle at temperature $T_0$, for example 25° C., corresponding to a low limit of the operating range of wavelength-stabilized light source apparatus 100'''. It is known in the art that such a bi-material strip with the form of a spiral will exhibit a clockwise angular deflection of d degrees with an increase in temperature from $T_0$ to $T_1$ according to Eq. (7):

$$d = \frac{360a(T_1 - T_0)\ell}{\pi s}$$

where a is the specific deflection of the bi-material strip, e is the length of the bi-material strip, and s is the thickness of the bi-material strip. Preferably the specific deflection a is large and/or the thickness s is small so that l can be reasonably small for a desired value of d to achieve a compact design. For example, the bi-material strip KANTHAL™ 200 is known to have a relatively high specific deflection a=20.8×10$^{-6}$K$^{-1}$, so a strip with thickness s=0.4 mm would require a strip length l of only 26.2 mm to achieve an angular deflection rate of 0.156°/° C., which is the desired dependence for the example described.

Figure 26:
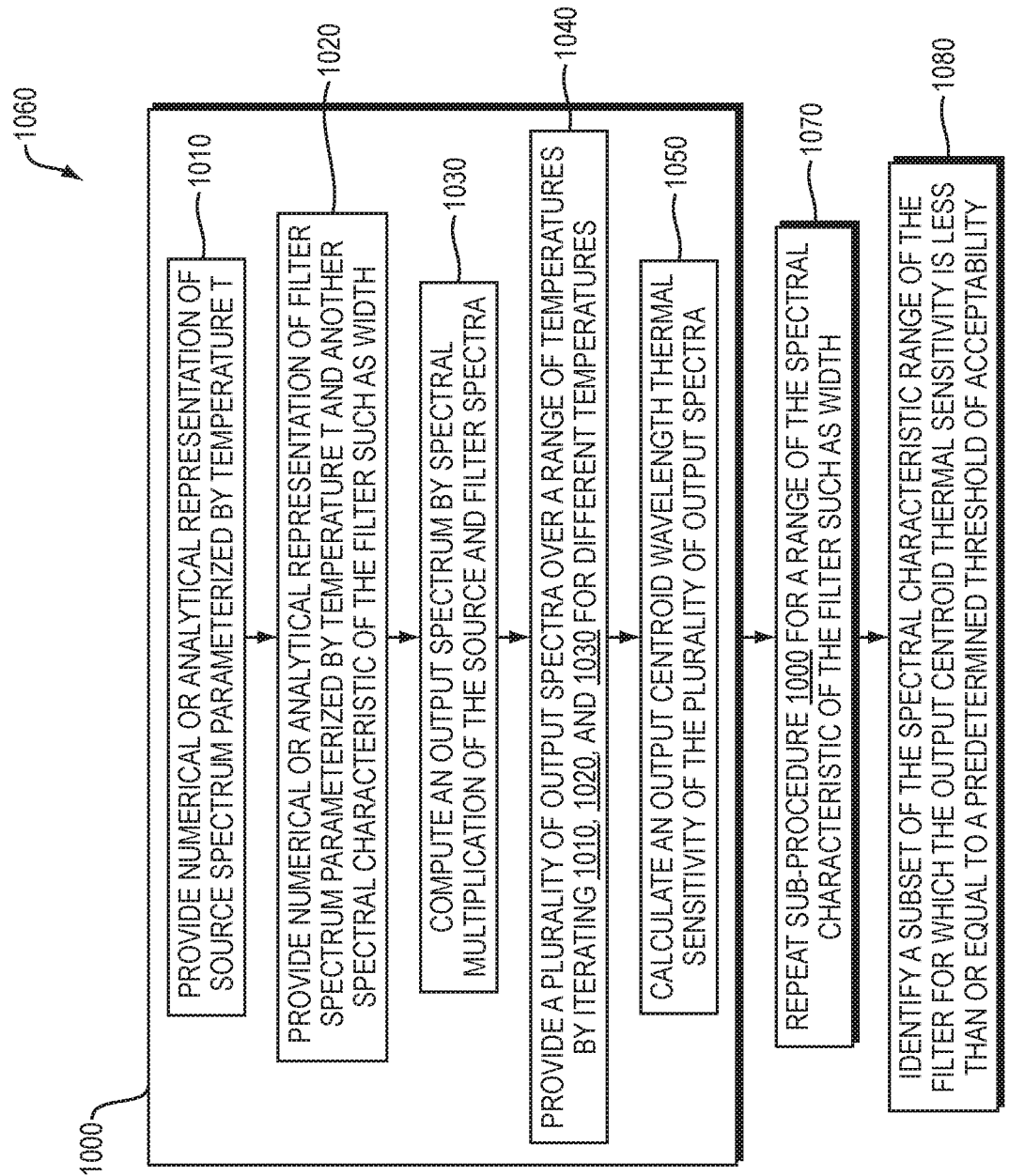
FIG. 26 is a flow diagram illustrating a method that can be used in connection with embodiments to configure broadband optical filters.

As described hereinabove, embodiment methods can include configuring a broadband optical filter to minimize the thermal sensitivity of the output centroid wavelength (variation of an output wavelength spectrum centroid with temperature), or maximize output power, or both, for a broadband optical light source apparatus. Modeling and computation techniques can assist in configuring the optical filter parameters to be optimum. FIG. 26 illustrates this general principle.

FIG. 26 is a flow diagram illustrating an embodiment procedure 1060 that can be used in configuring the broadband optical filter to produce the output wavelength spectral features described herein. At a sub-procedure 1000, a particular spectral characteristic of the filter, such as spectral shape or spectral width, is selected for a multi-temperature analysis of the resulting output spectrum of an embodiment broadband source. In particular, at 1010, a numerical or analytical representation of the source wavelength spectrum is provided for a temperature T. At 1020, a numerical or analytical representation of the filter wavelength spectrum at the temperature T and the value selected for the other spectral characteristic of the filter, such as width, is provided. At 1030, an output wavelength spectrum is computed by spectral multiplication of the source and filter wavelength spectra. At 1040, a plurality of output wavelength spectra over a range of temperatures is provided by repeating 1010, 1020, and 1030 for different temperatures. At 1050, a thermal sensitivity of the output centroid wavelength is calculated based on the plurality of output spectra determined for the different temperatures.

At 1070, the sub-procedure 1000 is repeated for a range of the spectral characteristic of the filter, such as width. At 1080, a subset of the spectral characteristic range of the filter is identified for which the thermal sensitivity of the output centroid wavelength is less than or equal to a predetermined threshold of acceptability.

As will be understood by those skilled in the art, in view of the disclosure herein, the procedure 1060 may also be repeated for different spectral characteristics, such as different spectral filtering functions or different thermal sensitivities of the filter wavelength spectrum, which can be provided by filter design. Furthermore, it will be understood that the procedure 1060 illustrated in FIG. 26 can be modified in various ways, including providing nested loops for iteration of the procedure over multiple filter characteristics.

Figure 27:
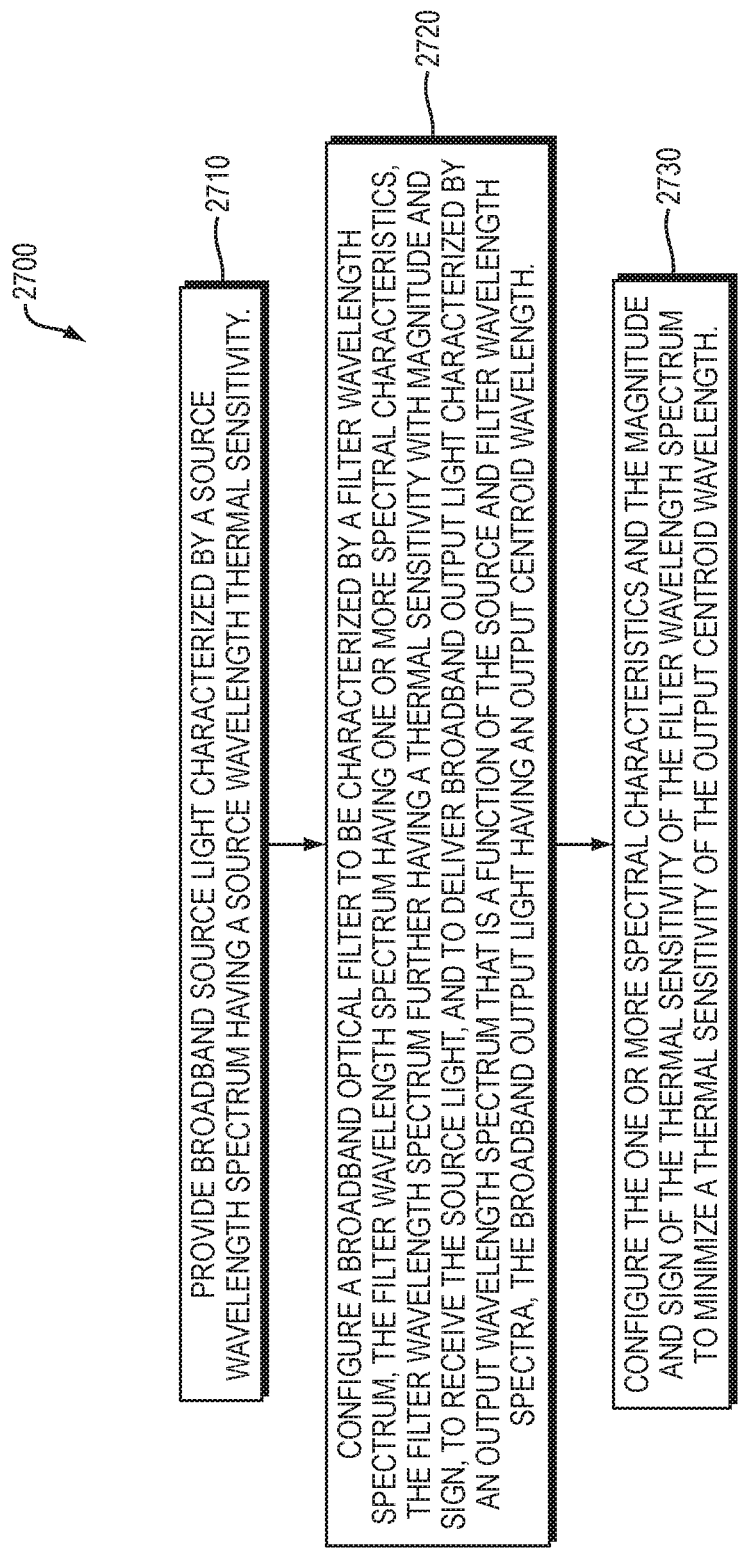
FIG. 27 is a flow diagram illustrating an embodiment method for optimizing a broadband light source.

FIG. 27 is a flow diagram illustrating a procedure 2700 for optimizing broadband light, according to an embodiment method. At 2710, a broadband light source or broadband light having a source wavelength spectrum characterized by a source centroid wavelength with a thermal sensitivity is provided. At 2720, a broadband optical filter is configured to be characterized by a filter wavelength spectrum having one or more spectral characteristics, the filter wavelength spectrum further having a thermal sensitivity with magnitude and sign, to receive the source light, and to deliver broadband output light characterized by an output wavelength spectrum that is a function of the source and filter wavelength spectra, the broadband output light having an output centroid wavelength. At 2730, the one or more spectral characteristics and the magnitude and sign of the thermal sensitivity of the filter wavelength spectrum are configured to minimize a thermal sensitivity of the output centroid wavelength.

An alternative embodiment method includes optimizing broadband light by filtering broadband source light having a source wavelength spectrum characterized by a source centroid wavelength with a thermal sensitivity. The method also includes filtering the broadband source light using a filter wavelength spectrum having one or more spectral characteristics and a thermal sensitivity with magnitude and sign. The source light is received and filtered. Filtering further includes filtering with the one or more spectral characteristics and the magnitude and sign of the thermal sensitivity of the filter wavelength spectrum to minimize a thermal sensitivity of an output centroid wavelength of an output wavelength spectrum of broadband output light that is a function of the source and filter wavelength spectra.

As also described hereinabove, in connection with any of the methods described above, the output wavelength spectrum can have an output centroid wavelength, and the method can further include configuring at least one of the spectral characteristics of the filter wavelength spectrum and the thermal sensitivity of the filter wavelength spectrum such that a variation of the output centroid wavelength with ambient temperature is minimized. The method may further include configuring the broadband optical filter to minimize the output centroid wavelength variation with temperature to within 10 ppm over an ambient temperature range of 10° C.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength to within ±50 parts per million per degree C. (ppm/° C.), ±5 ppm/° C., ±0.5 ppm/° C., or ±0.2 ppm/° C. Achieving these thermal sensitivities may be accomplished by using the iterative procedure illustrated in FIG. 26, for example, or similar procedures that iterate over filter parameter space, until thermal sensitivity of the output centroid wavelength is minimized to the desired degree.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength over a temperature range of 0.1° C., 1° C., 10° C., or 100° C. Achieving these thermal sensitivity ranges may be accomplished by using the iterative procedure illustrated in FIG. 26, for example, or similar procedures that iterate over filter parameter space, until a desired thermal sensitivity of the output centroid wavelength is determined by simulation or measurement to be minimized to the desired degree over the desired range of ambient temperatures.

The methods may further include configuring the one or more spectral characteristics and the magnitude and sign of the thermal sensitivity of the filter wavelength spectrum to maximize a relative integrated output power of the broadband output light, including maximizing the relative integrated output power of the broadband output light to at least 0.3, 0.6, or 0.9. The method may further include configuring the sign of the thermal sensitivity of the filter wavelength spectrum to be negative.

Configuring or filtering using the one or more spectral characteristics and the magnitude and sign of the thermal sensitivity of the filter wavelength spectrum may include configuring or filtering using the spectral characteristics and the magnitude and sign of the thermal sensitivity of the filter wavelength spectrum of an asymmetric Mach-Zehnder interferometer structure or a waveguide Bragg grating structure. The methods can also include configuring or filtering using a waveguide Bragg grating structure to include at least one of a core and a cladding comprising TiO2.

Configuring or filtering using the one or more spectral characteristics and the magnitude and sign of the thermal sensitivity of the filter wavelength spectrum may include using an interference filter mechanically attached to a bi-material strip to which a broadband light source providing the source light is also attached. Configuring or filtering using the sign of the thermal sensitivity of the filter wavelength spectrum may also include configuring or filtering using an effective negative sign of the thermal sensitivity of the filter wavelength spectrum due to relative angular displacement of the light source and the interference filter as a function of ambient temperature.

Configuring or filtering using the one or more spectral characteristics and the magnitude and sign of the thermal sensitivity of the filter wavelength spectrum filter wavelength spectrum may include using two or more sub-filters. The filter wavelength spectrum thermal sensitivity can be negative in sign, and using the two or more sub-filters can include using sub-filters with respective wavelength thermal sub-sensitivities, at least one of the sub-sensitivities being positive in sign. Configuring or filtering using the one or more spectral characteristics of the filter wavelength spectrum can include configuring the filter or using the filter to deliver broadband output light with the output wavelength spectrum having a width of at least 5 nm. The width may be measured or calculated using the FWHM method.

Providing the broadband source light can include providing light from at least one of an SLD, a REDSLS, and an LED.

In yet another embodiment, a method of optimizing a FOG includes optimizing broadband light according to any embodiment method disclosed herein or using any embodiment apparatus disclosed herein. An example FOG incorporating the embodiment broadband light source apparatus of FIG. 8 is described hereinafter in connection with FIG. 28. As described in connection with FIG. 26, and as will be understood in view of the additional disclosure provided herein, the procedure 1060 in FIG. 26 is an example illustrating one method for determining filter parameters for broadband optical filters in minimizing thermal sensitivity of the output centroid wavelength to stabilize a broadband light source with respect to ambient temperature or deliver broadband light that is stabilized with respect to ambient temperature.

FIG. 28 is a schematic diagram illustrating an embodiment FOG 2800 that incorporates the broadband light source apparatus 100 illustrated in FIG. 8. The FOG 2800 includes a coupler 2810 that is configured to couple the broadband output light from the apparatus 100 into a coil 2820 of the FOG, which is used to form a Sagnac interferometer to sense rotation with high precision that depends upon the thermally stabilized output centroid wavelength of the embodiment broadband light source apparatus 100. Embodiment broadband light sources, such as the light source apparatus 100, can be passively filter-stabilized to the example tolerances described above, for example, for enhanced precision of rotational measurement.

Embodiments Including Magneto-Optical Polarization-Based Filtration

As described in detail above, FIGS. 1-3 relate to existing broadband optical sources that are not configured to minimize thermal sensitivity of an output centroid wavelength of a broadband output spectrum. In contrast to existing broadband optical sources, the embodiments described hereinabove, including the embodiment illustrated in FIG. 33, may be used to minimize thermal sensitivity for significantly improved thermal stability of a broadband output spectrum. Moreover, embodiments described hereinafter can further stabilize broadband light sources using polarization-based filtration for further advantages that will be apparent from the description herein. Some of these polarization-based filtration embodiments use magneto-optical polarization-based filtration, using one or more Faraday rotators, for example, while other polarization-based filtration embodiments described hereinafter use birefringence polarization-based filtration.

Figure 29A:
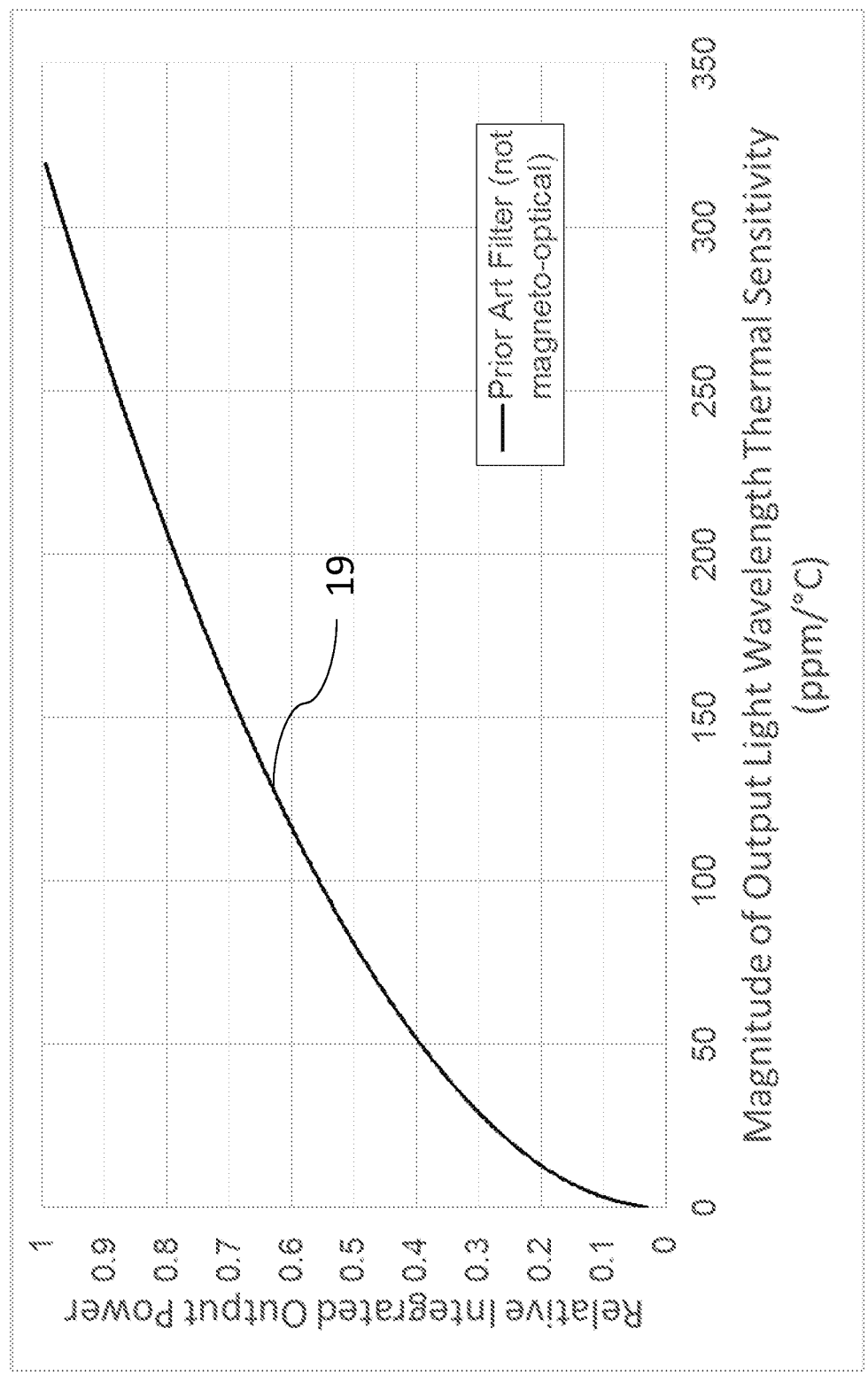
FIG. 29A shows a plot of the simulated dependence of the relative integrated optical power of FIG. 3 on the centroid wavelength thermal sensitivity of FIG. 3.
Figure 29B:
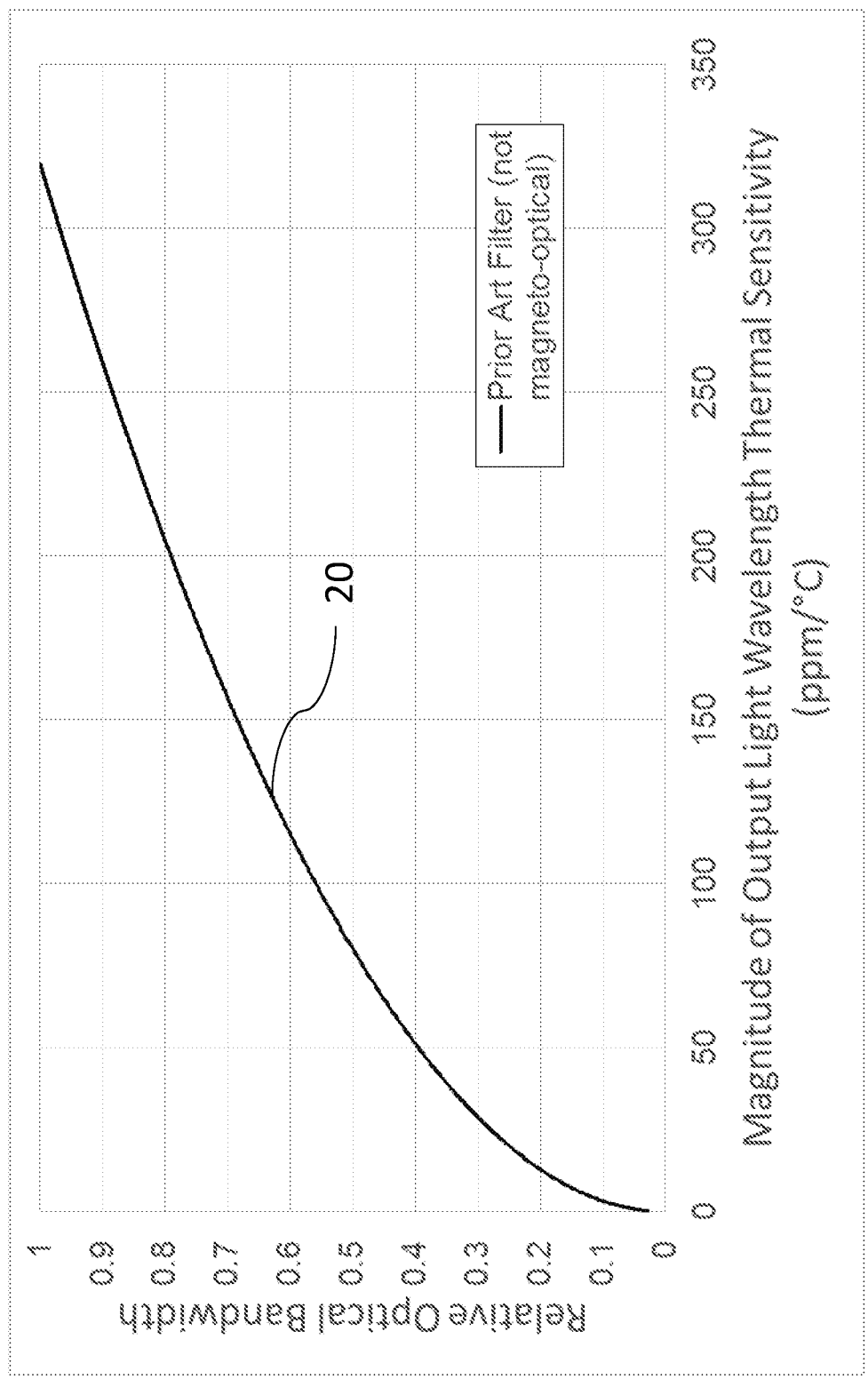
FIG. 29B shows a plot of the simulated dependence of the corresponding relative optical bandwidth on the centroid wavelength thermal sensitivity of FIG. 3.

In order to point out differences between performance of existing broadband optical sources and embodiments described herein, reference may be made to FIGS. 29A and 29B, which extend the calculations illustrating the need for broadband light source apparatuses with improved thermal stability.

FIG. 29A, in particular, is a graph showing a simulated dependence 19 of the relative integrated optical power 18 of output light 6 shown in FIG. 3 on the wavelength thermal sensitivity 17 shown in FIG. 3.

FIG. 29B is a graph showing a simulated dependence 20 of the corresponding relative optical bandwidth (FWHM) of output light 6 on the wavelength thermal sensitivity 17 shown in FIG. 3.

Figure 30:
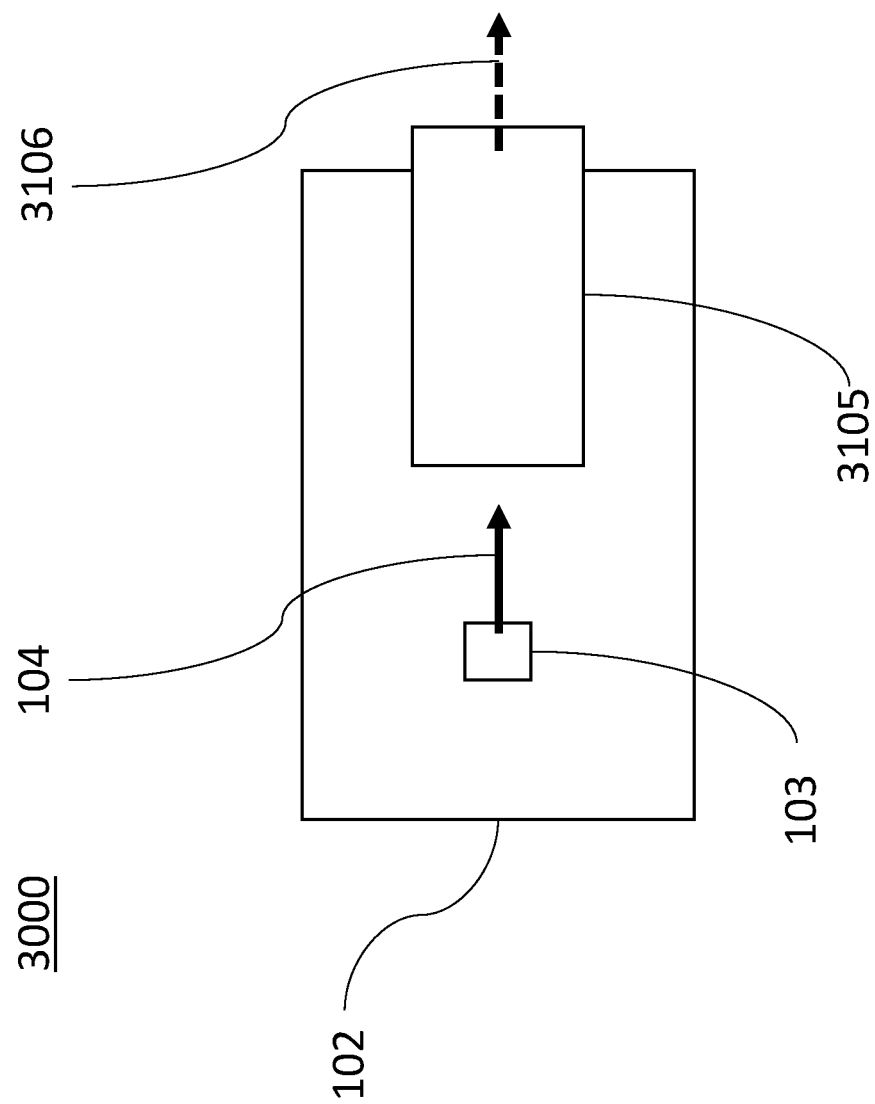
FIG. 30 is a schematic top plan view of a magneto-optically filtered passively wavelength-stabilized broadband light source apparatus for delivering output light with output centroid wavelength having minimized thermal sensitivity.

FIG. 30 is a schematic top plan view of an embodiment magneto-optically filtered passively wavelength-stabilized broadband light source apparatus 3000 for delivering broadband output light 3106 with output centroid wavelength having minimized thermal sensitivity. The apparatus 3000 includes a mount 102 that serves as a mechanical base for broadband light source 103, such as a superluminescent diode (SLD), rare-earth-doped superluminescent source (REDSLS), or light emitting diode (LED). Emission light 104 (also referred to herein as broadband source light) emitted from source 103 is characterized by a temperature-dependent source wavelength spectrum (also referred to herein as a source spectrum or broadband source spectrum) that has an output centroid wavelength.

The apparatus 3000 also includes a broadband optical filter 3105. The filter 3105 includes a magneto-optical polarization changer that is a Faraday rotator 200, as well as an exit polarizer 201, both of which are illustrated in greater detail in FIG. 35. The broadband magneto-optical filter 3105 is configured to receive broadband light 104 from source 103 at one side of the filter and to deliver output light 3106 from the opposite side of the filter. The polarization changer 3105 has a length 3550, as also illustrated in FIG. 35, which is configured to minimize a thermal sensitivity of the output centroid wavelength, as will be described in greater detail hereinafter.

Configuration of the broadband optical filter 3105 in view of spectral characteristics of the source 103 can result in optimization of the broadband output light 3106, which is characterized by an output wavelength spectrum. Some output wavelength spectra, and their variation with ambient temperature (thermal sensitivity), are described hereinafter in connection with elements 3113 and 3116 of FIG. 32, for example. The output wavelength spectrum characterizing the output light 3106 can be stabilized such that a thermal sensitivity of an output centroid wavelength of the output wavelength spectrum can be minimized. This can be done by appropriately configuring the polarization changer length as further described hereinafter. This thermal sensitivity can preferably be within ±50 ppm/° C. and more preferably within ±5 ppm/° C., ±0.5 ppm/° C., or ±0.2 ppm/° C. The polarization changer length may also be configured to minimize a thermal sensitivity of the output centroid wavelength to minimize the thermal sensitivity over a temperature range of 0.1° C., 1.0° C., 10° C., or 100° C., for example.

The apparatus may also include an entrance polarizer configured to polarize the source light for receipt by the broadband optical filter, the entrance polarizer being set to a polarization offset angle to minimize the thermal sensitivity of the output centroid wavelength, as described hereinafter. In various embodiments, the Faraday rotator may be a rare-earth iron garnet (RIG) Faraday rotator or a magneto-optical glass (MOG) Faraday rotator. The polarization changer further may include two or more Faraday rotators, as further described hereinafter.

The broadband optical filter may include a bulk optic filter, a waveguide filter, or a fiber optic filter. The broadband optical filter may include two or more sub-filters. The broadband filter wavelength spectrum may have a full width at half maximum (FWHM) of at least 5 nm.

Figure 31:
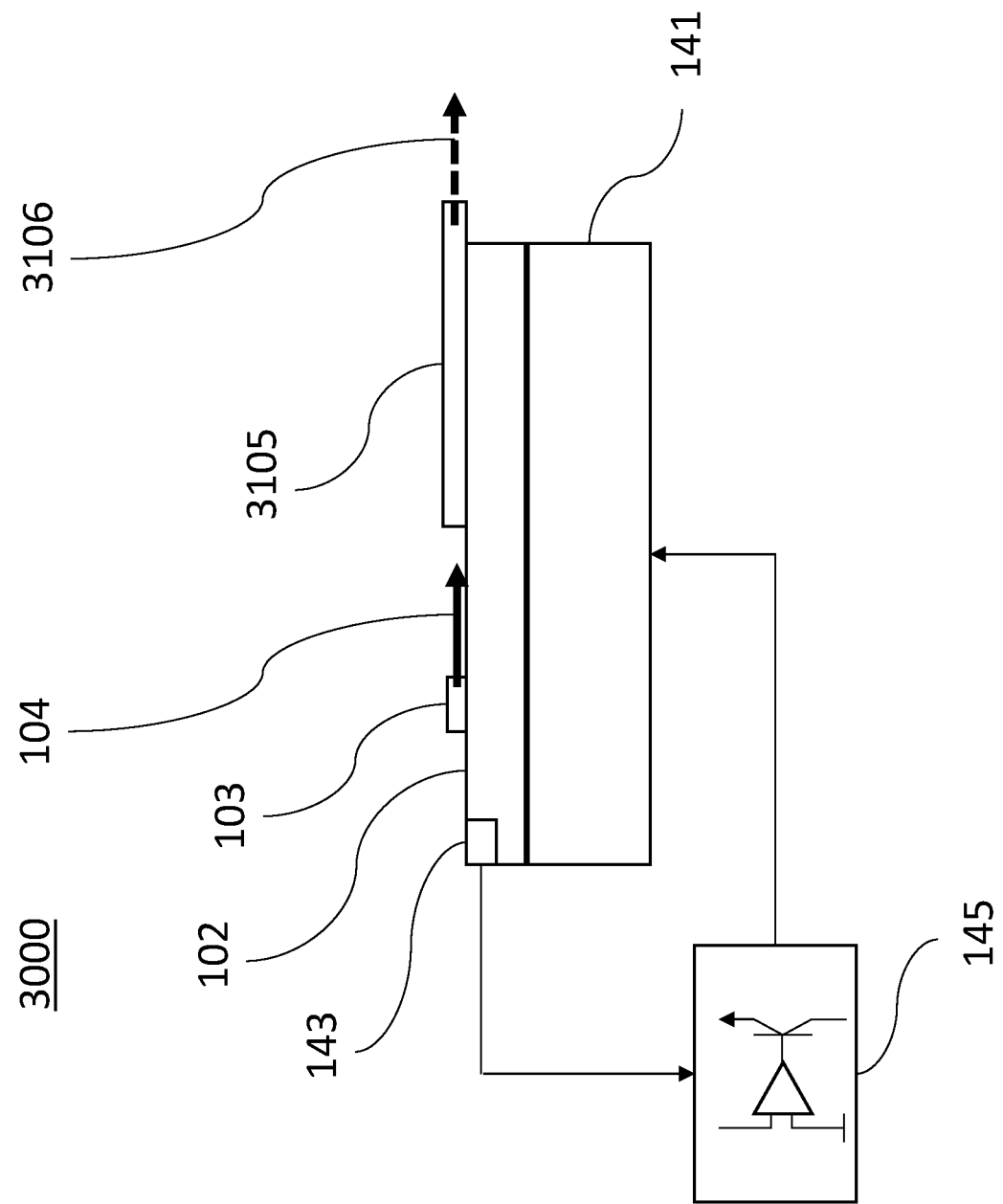
FIG. 31 is a schematic lateral view of the apparatus of FIG. 30 in thermal contact with an active temperature control element according to a preferred embodiment of the present disclosure.

In another embodiment, a fiber-optic gyroscope (FOG) includes the broadband light source apparatus with any of the features summarized above. The FOG may further include a coil of optical fiber and an optical coupling configured to couple the broadband output light into the coil of optical fiber of the FOG, as illustrated in FIG. 28, for example, FIG. 31 is a schematic lateral view of magneto-optically filtered passively wavelength-stabilized light source apparatus 3000. Preferably mount 102 includes a common temperature stabilizer in thermal contact with both source 103 and magneto-optical filter 3105 for defining the relative temperature of source 103 and filter 3105 against environmental (ambient) temperature fluctuations in the vicinity of apparatus 3000, or even temperature fluctuations within apparatus 3000. The temperature stabilization may simply be passive. Alternatively, mount 102 may be in thermal contact with an active temperature control device, for example a thermoelectric cooler 141 acting, together with a temperature sensor 143 and a temperature controller 145, as a temperature stabilizer against environmental temperature fluctuations.

Figure 32:
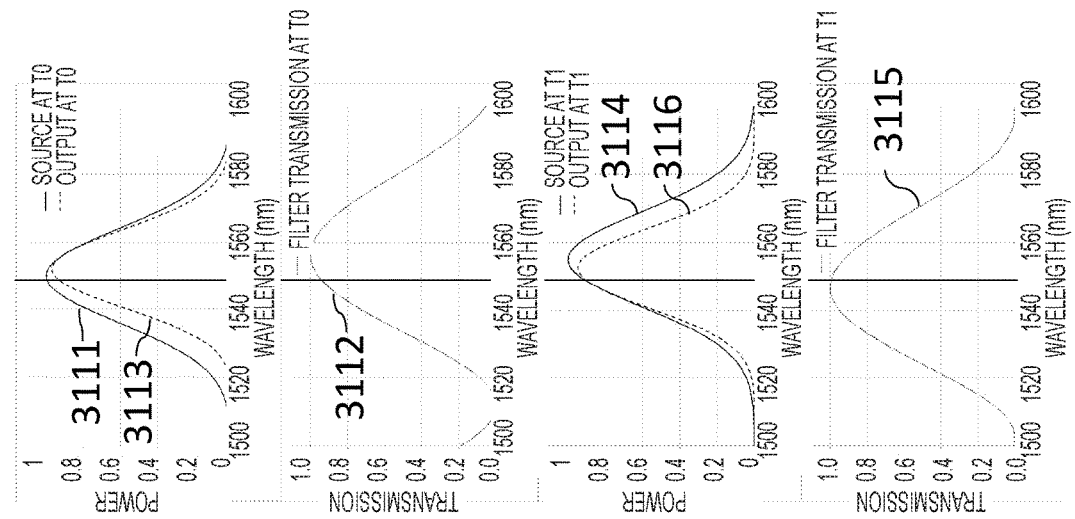
FIG. 32 shows plots of exemplary simulated source, filter, and output spectra for the apparatus shown in FIG. 30 for a magneto-optical filter configured to minimize the centroid wavelength thermal sensitivity of broadband light that is output from the filter.

FIG. 32 shows exemplary simulated source spectrum 3111, filter spectrum 3112, and output spectrum 3113, determined by the product of the source spectrum and filter spectrum, at temperature $T_0$; and exemplary simulated source spectrum 3114, filter spectrum 3115, and output spectrum 3116, determined by the product of the source spectrum and filter spectrum, at temperature $T_1$, where $T_1 > T_0$, for example greater by 10° C.; for light source apparatus 3000 whereby source spectra 3111 and 3114 are characterized by Gaussian functions, filter spectra 3112 and 3115 are characterized by magneto-optical filter functions, both source spectrum 3111 and filter spectrum 3112 have a maximum at 1550 nm at $T_0$, and $FWHM_{SOURCE}$ is 33 nm (typical for FOG applications using SLDs or REDSLSs). The spectral characteristic of filter spectrum 3112 is optimized to minimize the output centroid wavelength of the output wavelength spectra of output light 3106.

Although the exemplary source and filter spectra shown in FIG. 32 depict specific spectral characteristics such as peak wavelength, spectral width and generally spectral shape or spectral functional form, embodiments within the scope of the present disclosure are not limited to any particular set of spectral characteristics. For example, source and filter spectra may be non-Gaussian, non-symmetric, etc.

Figure 33:
FIG. 33 shows a plot of output centroid wavelength variation with temperature corresponding to the plots shown in FIG. 32.

FIG. 33 shows a plot of average output wavelength variation with temperature corresponding to the plots shown in FIG. 32. The maximum variation is only ±4 ppm over the temperature range of 10° C., and the maximum of the minimized thermal sensitivity of the output centroid wavelength of the output wavelength spectra of the output light is only 2 ppm/° C.

Figure 34A:
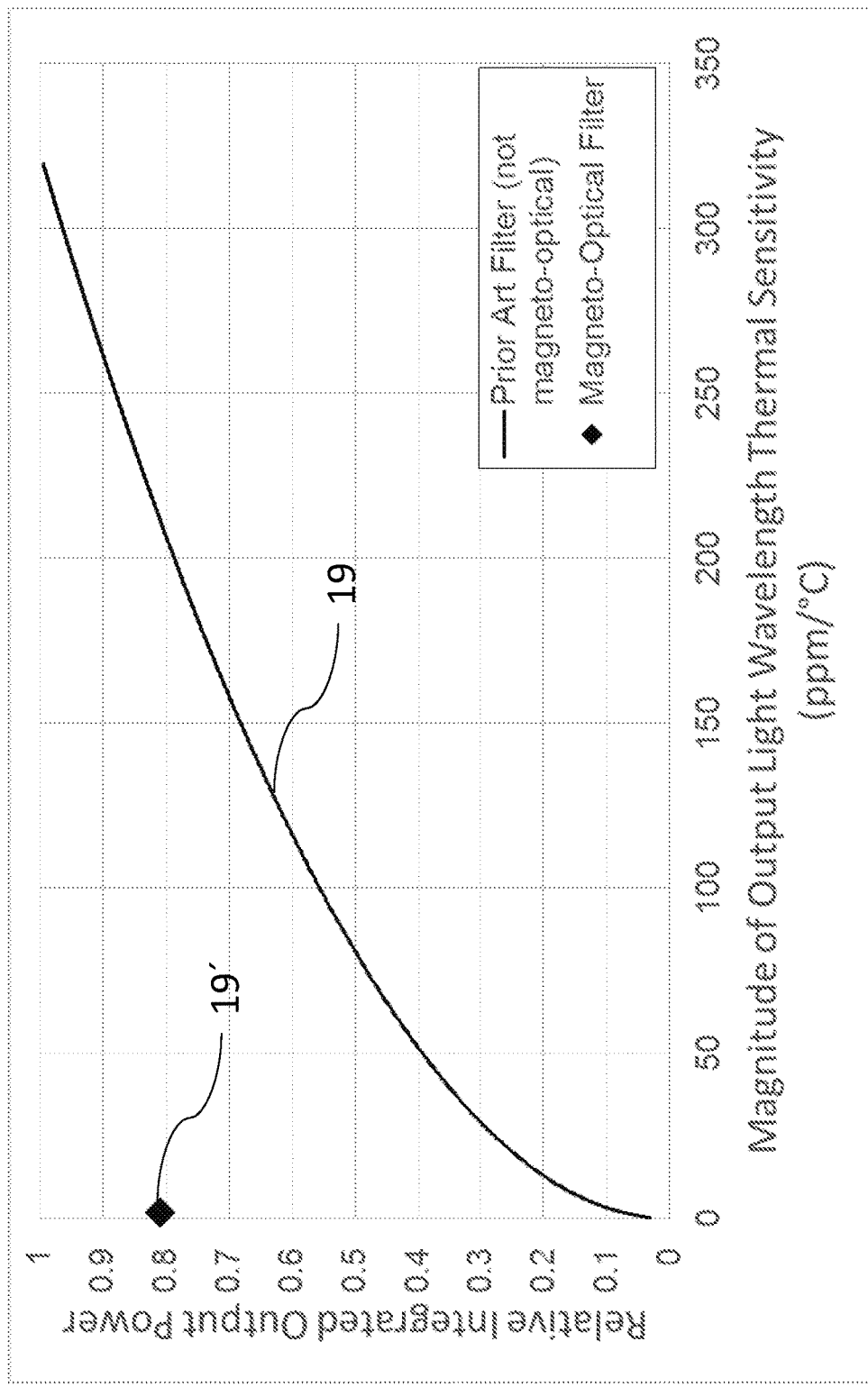
FIG. 34A shows an indication of the relative integrated optical power for the minimized thermal sensitivity of the output centroid wavelength of the output wavelength spectrum of the magneto-optically filtered output light given the spectra shown in FIG. 32 overlaid onto the plot shown in FIG. 29A.

FIG. 34A shows an indication 19' of the relative integrated optical power value of 0.81, or 81%, averaged over a 10° C. temperature range from +25° C. to +35° C., for the maximum of the minimized thermal sensitivity of the output centroid wavelength 2 ppm/° C., of magneto-optically filtered output light 3106 given the spectra shown in FIG. 32, overlaid onto the plot shown in FIG. 29A. An advantage of embodiments encompassed by the present disclosure is evident from FIG. 34A in that the thermal sensitivity of the output centroid wavelength $\alpha_{OUTPUT}$ of output light 3106 can be minimized while the reduction of relative integrated optical power of output light 3106 is only slightly limited to 81%, which is relatively efficient, specifically about 10 times more efficient than the simulated value of 8% for the prior art for the same thermal sensitivity of the output centroid wavelength.

Figure 34B:
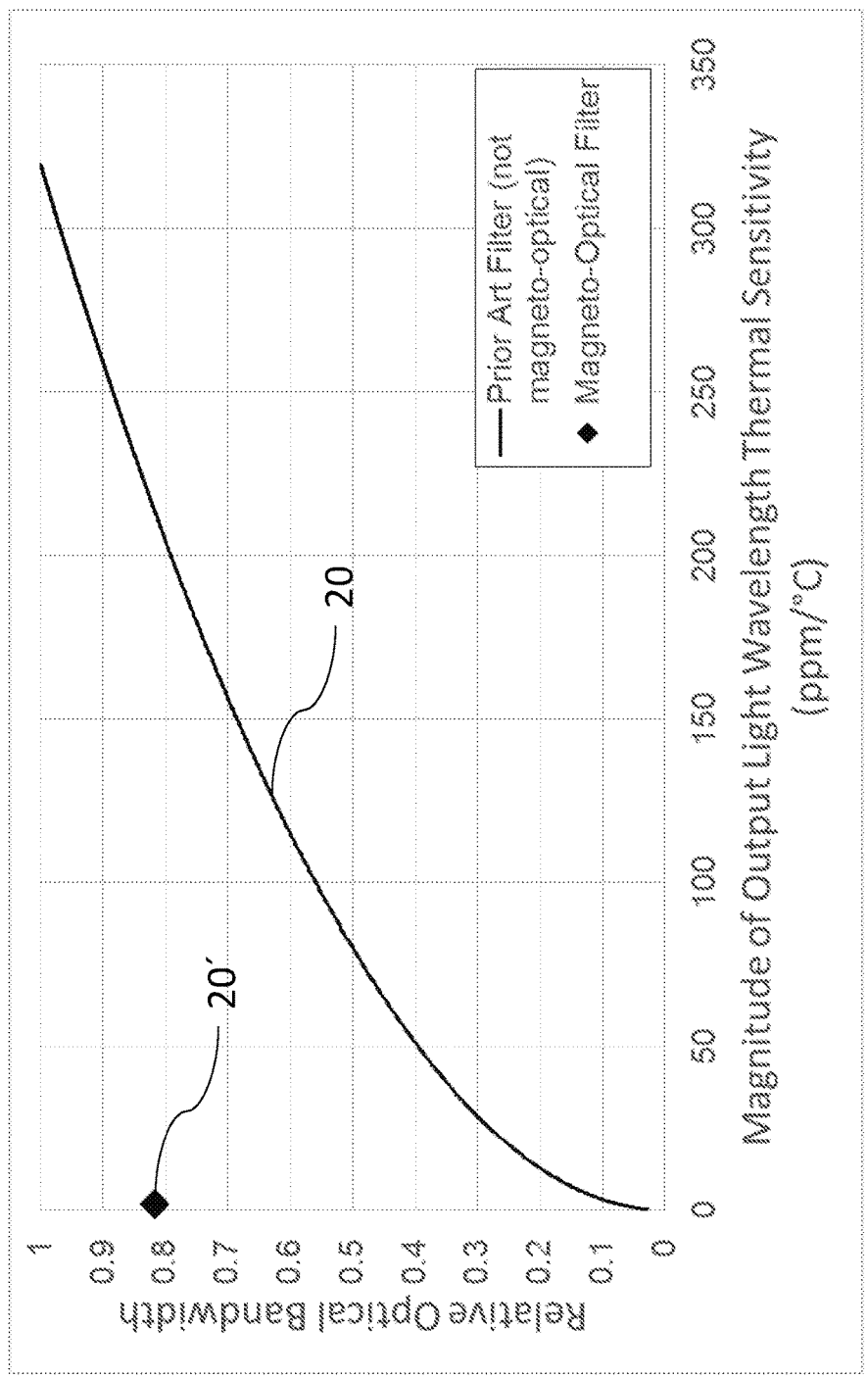
FIG. 34B shows an indication of the relative optical bandwidth for the minimized thermal sensitivity of the output centroid wavelength of the output wavelength spectrum of the magneto-optically filtered output light given the spectra shown in FIG. 32 overlaid onto the plot shown in FIG. 29B.

FIG. 34B shows an indication 20' of the relative optical bandwidth value of 0.82, or 82%, averaged over a 10° C. temperature range from +25° C. to +35° C., for the maximum of the minimized thermal sensitivity of the output centroid wavelength 2 ppm/° C., of the magneto-optically filtered output light 3106 given the spectra shown in FIG. 32, overlaid onto the plot shown in FIG. 29B. A further advantage of embodiments encompassed by the present disclosure is evident from FIG. 34B in that the thermal sensitivity of the output centroid wavelength $\alpha_{OUTPUT}$ of output light 3106 can be minimized while the reduction of relative optical bandwidth is only slightly limited to 82%, which is relatively efficient, specifically about 10 times more efficient than the simulated value of 8% for the prior art for the same thermal sensitivity of the output centroid wavelength.

FIG. 35 shows a detail view of an embodiment of magneto-optical filter 3105 shown in FIG. 30. Magneto-optical filter 3105 includes at least one polarization changer Faraday rotator 200 and at least one exit polarizer 201. The polarization changer 200 has a length 3550 that may be configured to minimize a thermal sensitivity of an output centroid wavelength of the output wavelength spectra of broadband output light according to various embodiments. The Faraday rotator 200 and exit polarizer 201 may have a gap between them, as illustrated in FIG. 35. Alternatively, Faraday rotator 200 and exit polarizer 201 may be glued, cemented, or bonded together.

The Faraday rotator 200 may include an RIG Faraday rotator, for example a TGG Faraday rotator, a YIG Faraday rotator, or a BIG Faraday rotator. The RIG Faraday rotator may be a latching magnet-free type RIG Faraday rotator. Alternatively, the RIG Faraday rotator may be a non-latched magnet-ready type RIG Faraday rotator, and the magneto-optical filter may further include at least one magnet 202 having at least one magnetic field.

The non-latched magnet-ready type RIG Faraday rotator may be magnetically saturated by the at least one magnet 202. Alternatively, the at least one non-latched magnet-ready type RIG Faraday rotator may be not magnetically saturated by the at least one magnet 202, and the magneto-optical filter may further include an adjustment means to adjust the at least one magnetic field generated by the at least one magnet 202 so as to adjust the characteristics of the Faraday rotator. Since the thermal sensitivity of the source centroid wavelength of the source wavelength spectra of SLDs is known to vary as a function of drive current, an adjustable magnetic field may be particularly useful to tune the characteristics of magneto-optical filter 3105 for use with different SLD drive currents.

In alternative embodiments, the Faraday rotator 200 is a magneto-optical glass (MOG) Faraday rotator (for example, a terbium doped glass (TDG) Faraday rotator).

Furthermore, the magneto-optical filter may include an adjustable mount for adjusting the polarization axis of the exit polarizer to maximize transmission.

Figure 36B:
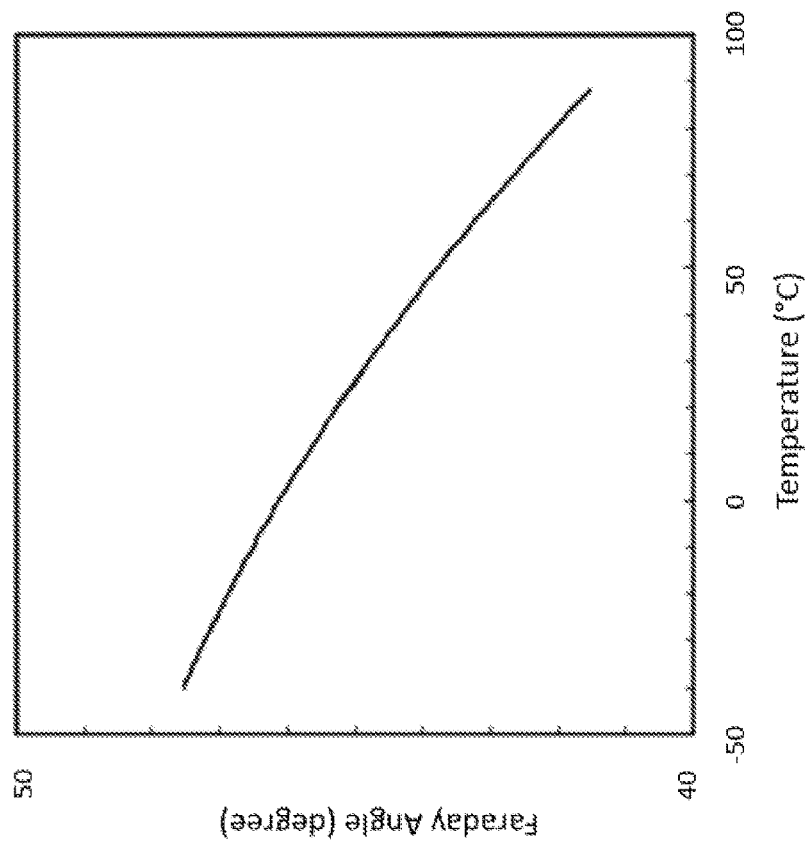
FIG. 36B shows an exemplary dependence of the Faraday angle of a Faraday rotator of the magneto-optical filter of FIG. 35 on temperature.
Figure 36A:
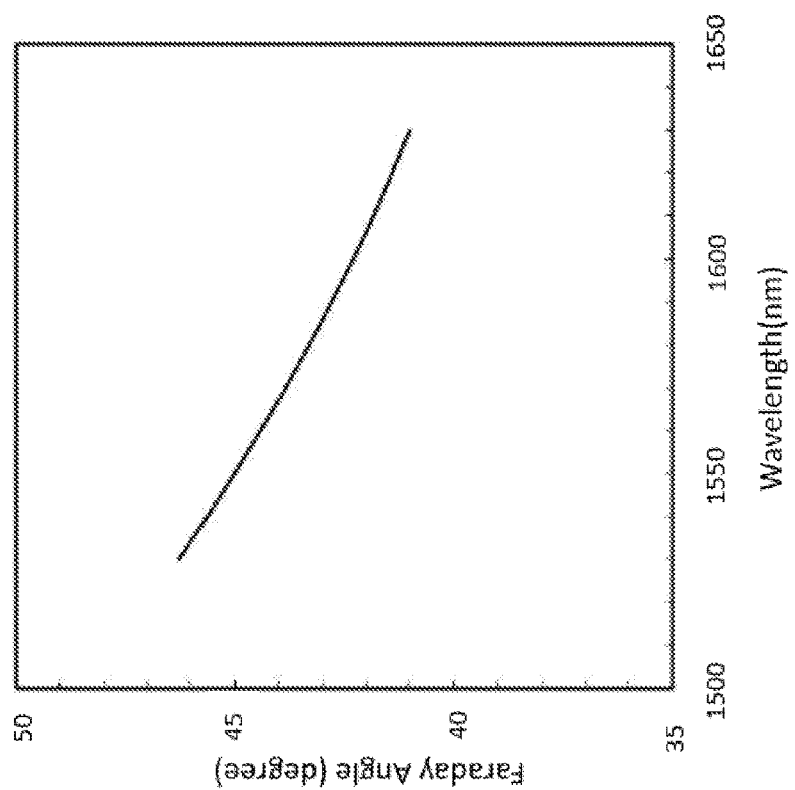
FIG. 36A shows an exemplary dependence of the Faraday angle of a Faraday rotator of the magneto-optical filter of FIG. 35 on wavelength.

FIG. 36A shows an exemplary dependence of the Faraday angle of Faraday rotator 200 on wavelength. FIG. 36B shows an exemplary dependence of the Faraday angle of Faraday rotator 200 on temperature. Magneto-optical filter 3105 works on the principle that by careful design of the Faraday rotator length for a given set of source spectral characteristics, thermal sensitivity of source centroid wavelength, dependence of the Faraday angle on wavelength, and dependence of the Faraday angle on temperature, the spectral characteristics of magneto-optical filter 3105 are optimized based on the spectral characteristics of the source 103, the thermal sensitivity of the source centroid wavelength of source 103, and the thermal sensitivity of the magneto-optical filter 3105.

FIGS. 37A and 37B illustrate the principle of operation for minimizing the thermal sensitivity of the output centroid wavelength. FIG. 37A shows the detail view of magneto-optical filter 3105 of FIG. 35 overlaid onto the exemplary simulated source spectrum 3111 and output spectrum 3114 of FIG. 32. FIG. 37B shows the detail view of magneto-optical filter 3105 of FIG. 35 overlaid onto the exemplary simulated source spectrum 3113 and output spectrum 3116 of FIG. 32. Faraday rotator 200 of magneto-optical filter 3105 receives broadband source light at one side. For temperature $T_0$ as shown in FIG. 37A and $T_1$ as shown in FIG. 37B, the broadband source light is spectrally characterized as 3111 and 3114, respectively, and is uniformly polarized throughout its spectrum, for example linearly polarized as indicated by the vertical arrows. Alternatively the uniform polarization may be circular or elliptical.

In FIGS. 37A and 37B, Faraday rotator 200 transmits broadband light, spectrally characterized as 3111' and 3114', respectively, at the other side without changing the source spectrum, but imparting a wavelength-dependent polarization rotation, as indicated by the varyingly rotated arrows, that also depends on temperature. Exit polarizer 201 then receives the rotated broadband light at one side and transmits filtered broadband light, spectrally characterized as 3113 and 3116, respectively, at the other side that is linearly polarized, thereby exiting the magneto-optical filter. The filtering is effected because the broadband light transmitted by Faraday rotator 200 has wavelength-dependent polarization so the transmission is determined by Malus' cosine squared law, as will be understood by those skilled in the art in view of this description.

By careful configuration of the Faraday rotator length for a given set of source spectrum, thermal sensitivity of the source centroid wavelength, dependence of the Faraday angle on wavelength, and dependence of the Faraday angle on temperature, the spectral characteristics of magneto-optical filter 3105 are configured to minimize average output wavelength variation with temperature, for example preferably to within ±50 ppm variation over an ambient temperature range of 10° C.; and more preferably to within ±5 ppm variation over an ambient temperature range of 10° C. In FIG. 32, the spectra were simulated assuming a BIG Faraday rotator having a length of 1.07 cm, a Faraday angle dependence on wavelength of 0.07°/nm [0.00122 rad/nm], and a Faraday angle dependence on temperature of 0.065°/° C. [0.003113 rad/° C.].

FIG. 38 shows a detail view of another embodiment of magneto-optical filter 3105' shown in FIG. 30. Magneto-optical filter 3105' includes Faraday rotators 200' and 200", comprising a plurality of Faraday rotators forming a polarization changer, and exit polarizer 201. Magneto-optical filter 3105' may further include at least one magnet 202. Although the number of Faraday rotators shown in FIG. 38 is two, it is known in the art that two or more Faraday rotators may be combined to form a plurality. The Faraday rotators 200' and 200" have respective lengths 3850a and 3850b. In a manner similar to that described herein for embodiments having only one Faraday rotator, the combined length 3850*a*+3850*b* may be configured to minimize thermal sensitivity of an output centroid wavelength of the output wavelength spectra of broadband light that is output from the magneto-optical filter 3105'.

Any or all of Faraday rotators 200' and 200" and exit polarizer 201 may have a gap between them, or may be glued, cemented, or bonded together. The Faraday rotators among the plurality may be made of the same or different materials, and therefore have the same or different dependency of their Faraday angle with respect to wavelength and/or their Faraday angle with respect to temperature.

Figure 39A:
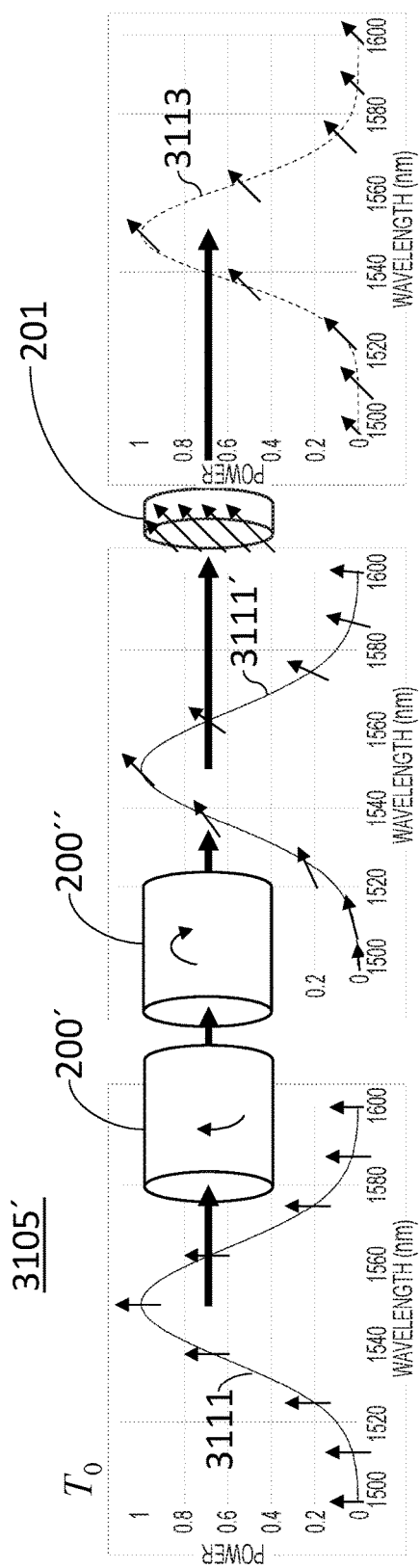
FIGS. 39A and 39B show the detail view of the magneto-optical filter of FIG. 38 overlaid onto the exemplary simulated source and output spectra of FIG. 32 to illustrate the principle of operation.
Figure 39B:
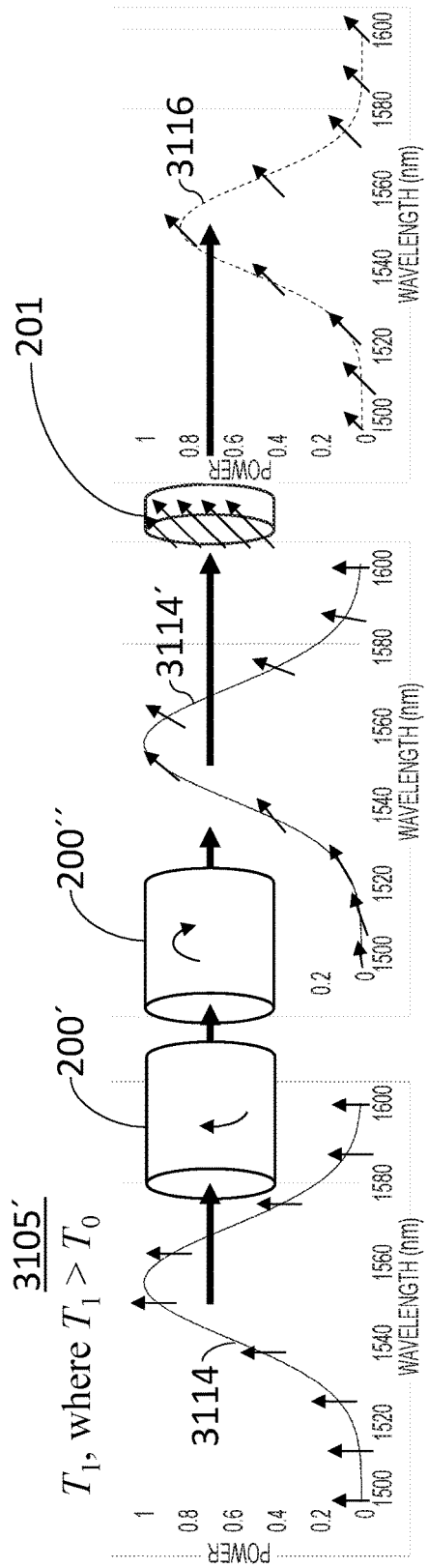

FIGS. 39A and 39B illustrate the principle of operation, whereby the only difference relative to FIGS. 37A and 37B is that wavelength-dependent rotated broadband light transmitted by Faraday rotator 200' is received by Faraday rotator 200", which imparts additional wavelength-dependent rotation before transmitting the wavelength-dependent further-rotated broadband light to polarizer 201. An advantage of using a plurality of Faraday rotators is that relatively thin, and hence relatively less expensive, Faraday rotators can be combined or stacked to effect an optimal Faraday rotator length (the optical path length experienced by the broadband source light beam) to minimize average output wavelength variation with temperature, for example preferably to within ±50 ppm variation over an ambient temperature range of 10° C.; and more preferably to within ±5 ppm variation over an ambient temperature range of 10° C.

FIG. 40 shows a detail view of another embodiment of magneto-optical filter 3105" shown in FIG. 30. Magneto-optical filter 3105" includes the basic elements of magneto-optical filter 3105 combined with entrance polarizer 203. The addition of entrance polarizer 203 is particularly useful to increase the degree of polarization (DOP) of the light entering Faraday rotator 200 in the case where the source light does not inherently have adequate DOP to achieve the desired characteristics for the output light. Furthermore, an optical isolator may include magneto-optical filter 3105" in the special case where entrance polarizer 203 is configured to have its polarization axis oriented ±45° [π/4 radians] with respect to exit polarizer 201, and magneto-optical filter 3105" is configured to have a Faraday angle of πK+(π/4) radians for its nominal operating wavelength and temperature, where K is an integer inclusive of zero.

As described hereinabove, embodiments include broadband optical sources that are passively, magneto-optically filtered to minimize thermal sensitivity of an output centroid wavelength of resulting broadband output wavelength spectra. In particular centroid shift resulting from temperature variations may be minimized. Modeling and computation techniques can assist in configuring the magneto-optical or birefringent optical filter parameters to minimize centroid thermal sensitivity.

Figure 41A:
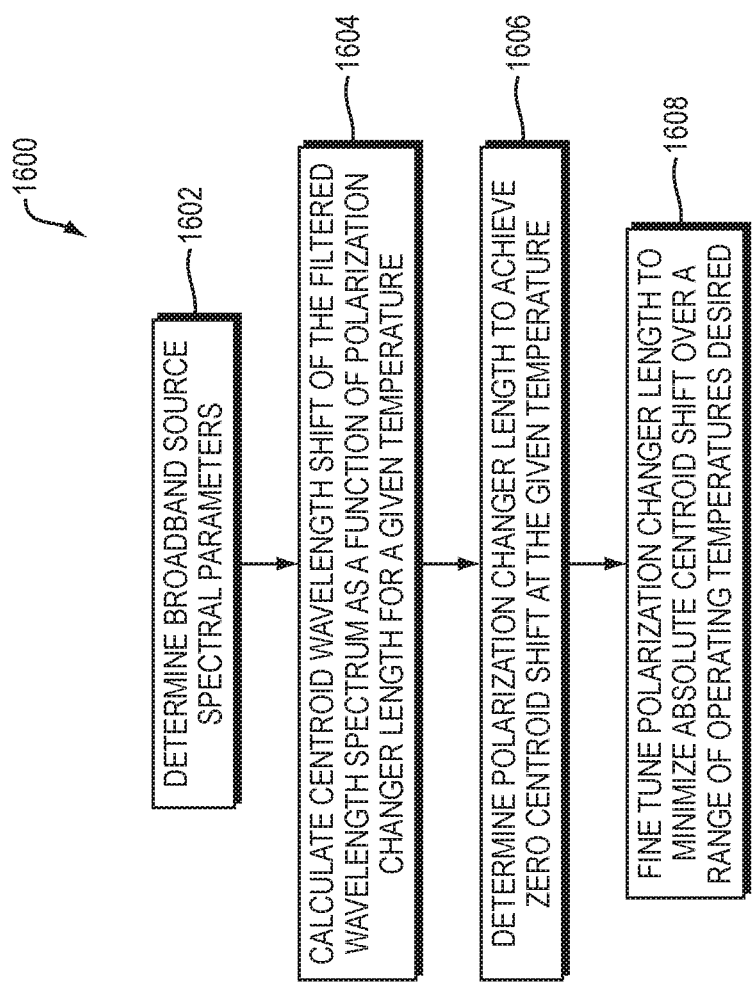
FIG. 41A is a flow diagram illustrating an example procedure 1600 that may be used to configure a polarization changer length in order to minimize centroid wavelength shift.

FIG. 41A is a flow diagram illustrating an example procedure 1600 that may be used to configure a length of a polarization changer, including a Faraday rotator polarization changer, in order to minimize centroid wavelength thermal sensitivity of broadband light that is output from the polarization changer. At 1602, basic broadband source spectral parameters are determined by assumption or measurement. A desired temperature range for operation may also be determined by assumption or measurement. At 1604, a centroid wavelength shift of the filtered wavelength spectrum output from the broadband optical filter is calculated as a function of polarization changer length for a given temperature in the desired range of operating temperatures. At 1606, polarization changer length to achieve zero centroid wavelength shift at the given temperature in the operating range is determined. Optionally, at 1608, the polarization changer length is fine-tuned to minimize absolute centroid wavelength shift over the range of operating temperatures desired.

Figure 41B:
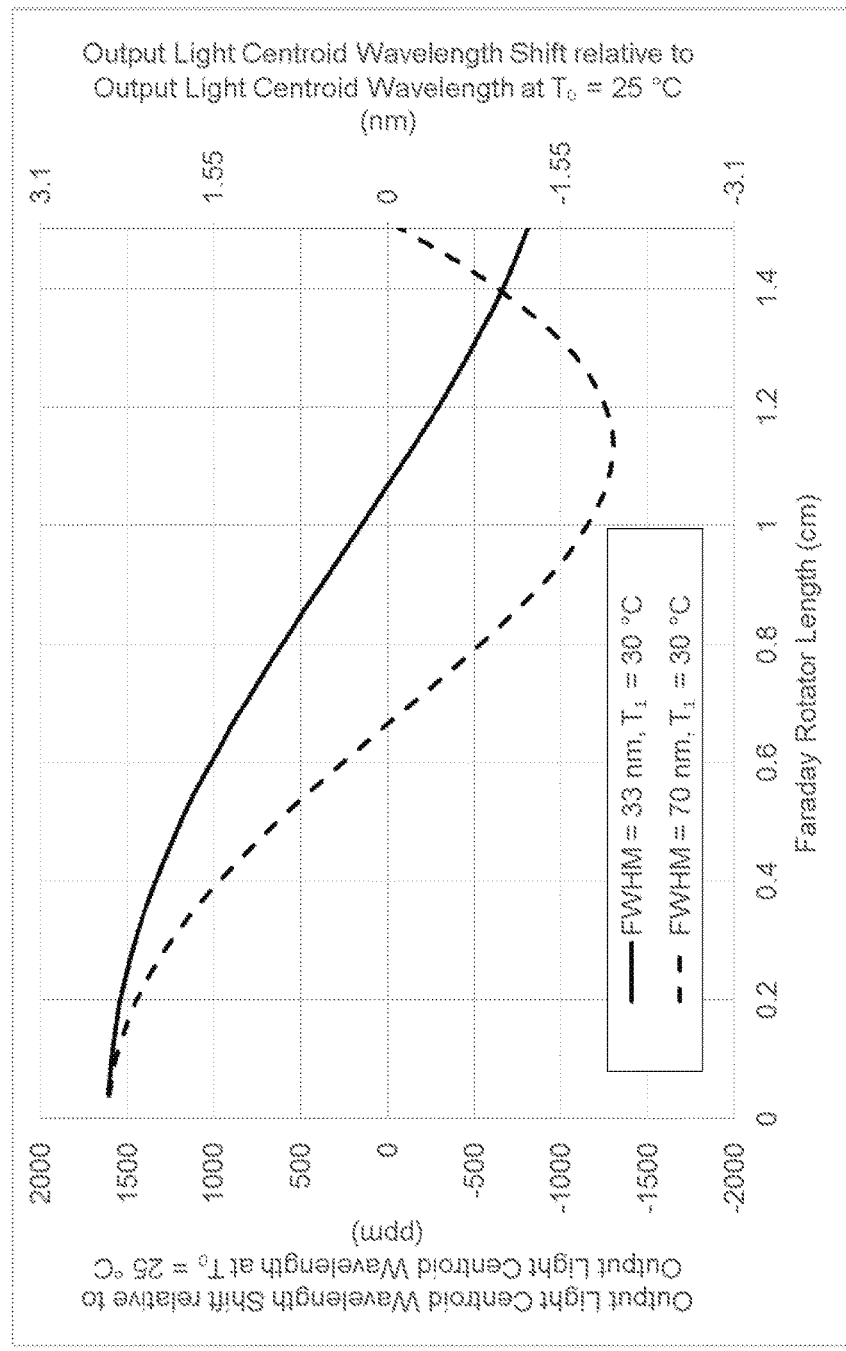
FIG. 41B is a graph showing calculated centroid wavelength shift, in parts per million and in nanometers, as a function of Faraday rotator length at 25° C.
Figure 42A:
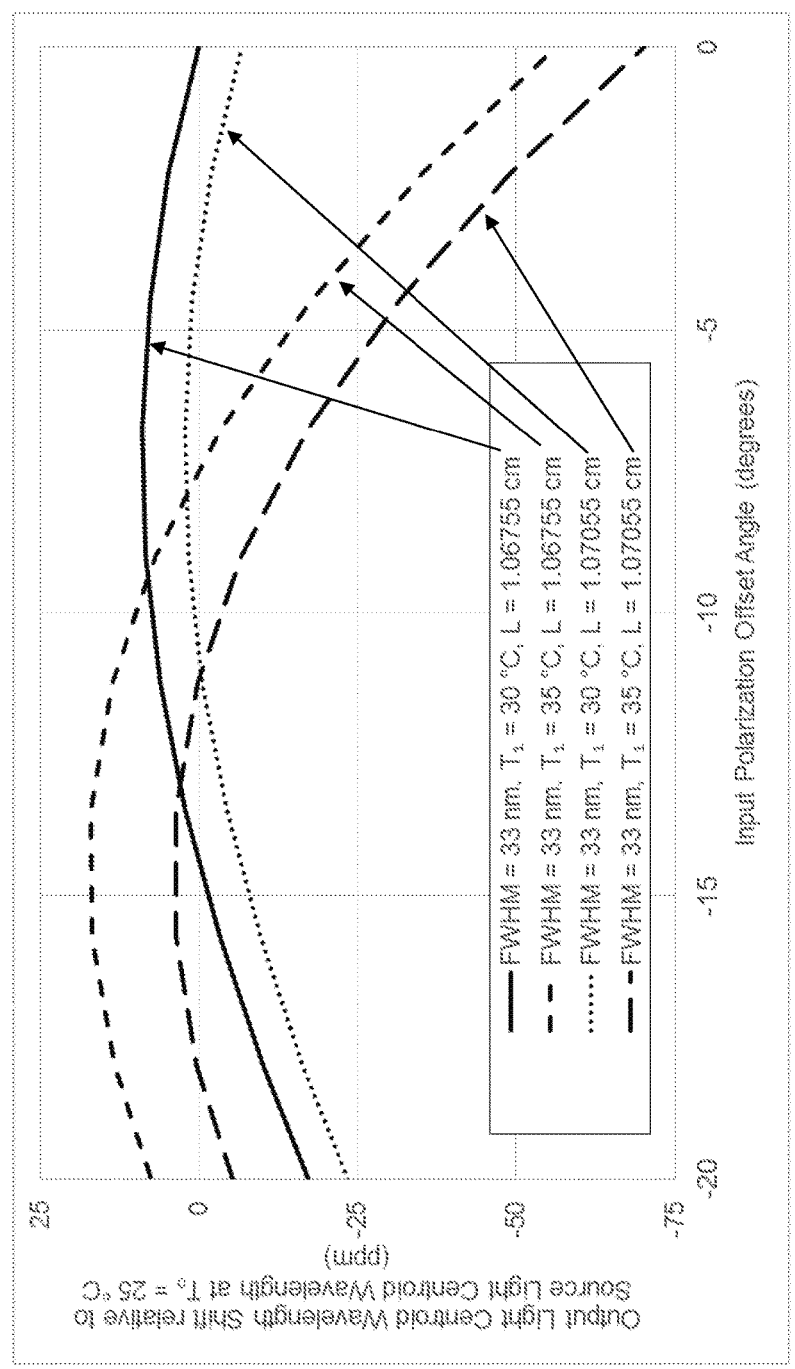
FIG. 42A is a graph illustrating filtered centroid wavelength shift, relative to the centroid wavelength shift at 25° C., determined as a function of input polarization offset angle for 30° C. and 35° C. operating temperatures for an assumed broadband source input spectrum having a FWHM equal to 33 nm.
Figure 42B:
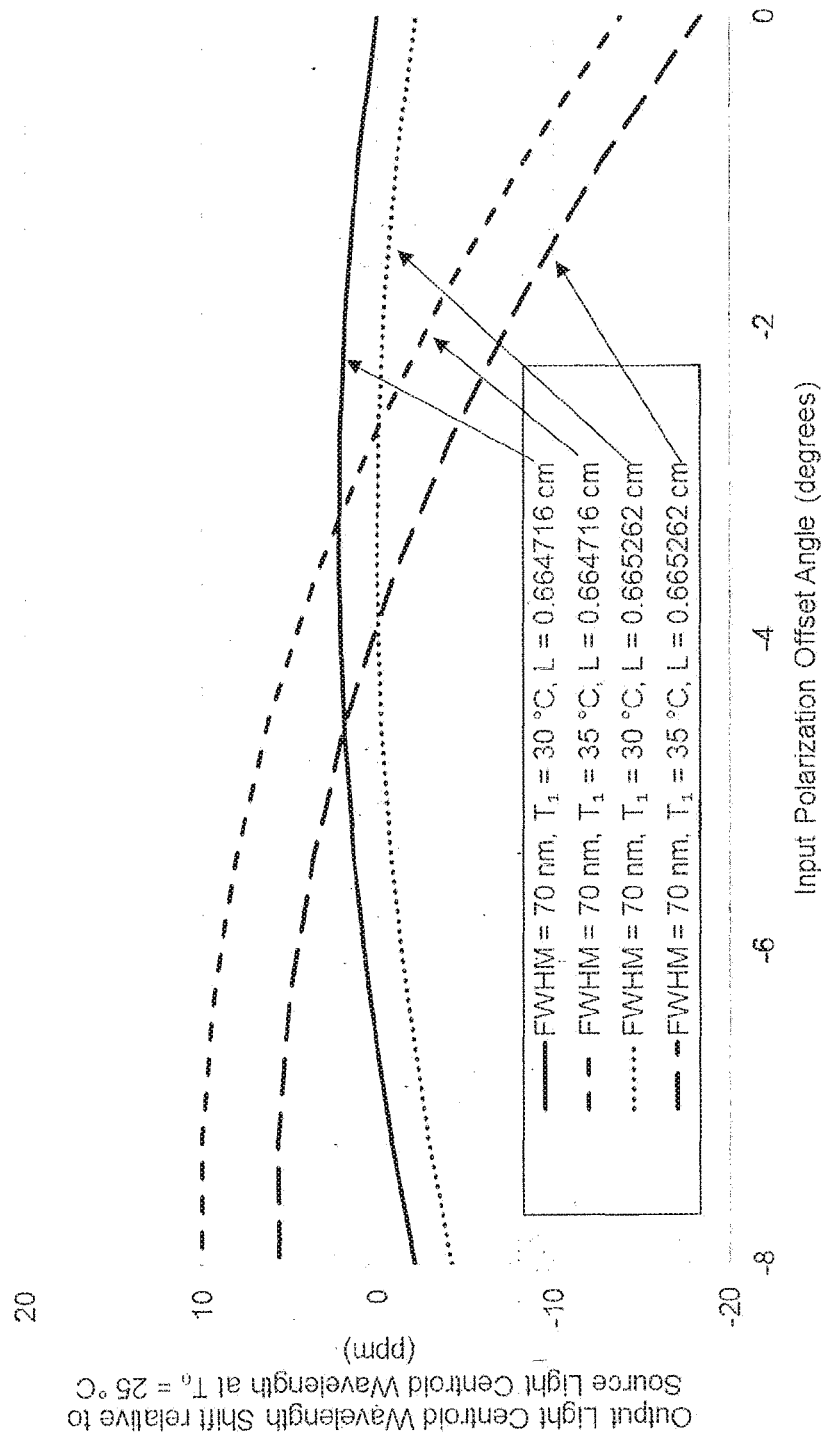
FIG. 42B is a graph illustrating calculations similar to those of FIG. 42A for an assumed broadband source input spectrum having a FWHM equal to 70 nm.

FIGS. 41B and 42A-42B are graphs illustrating two example sets of calculations to optimize polarization changer length consistent with the example procedure 1600 in FIG. 41A. The calculations in FIGS. 41B and 42A-42B are particularly for a case of a magneto-optical filter including a Faraday rotator polarization changer.

In the two example sets of calculations of FIGS. 41B and 42A-42B, basic parameters were assumed for the source wavelength spectra of two different broadband optical sources. A first source with a FWHM spectral width of 33 nm and source centroid wavelength at 1550 nm at 25° C. and a second source with a FWHM spectral width of 70 nm and source centroid wavelength at 1550 nm at 25° C. were assumed. An operating temperature range desired for centroid stabilization was assumed to be 25-35° C. In various example optimization procedures, broadband source centroid wavelength and spectral width, as well as a temperature range to which an embodiment may be subjected, may come from measurements. Nonetheless, for the current illustrative purpose and in various optimization procedures, parameters may be assumed.

For the example of FIGS. 41B and 42A-42B, the absolute centroid wavelength shift of the filtered wavelength spectrum was defined to be zero at the minimum of the desired temperature range, which is 25° C. in this case. For the middle of the temperature range of interest (30° C. in this example case), the centroid wavelength shift of the filtered wavelength spectrum was calculated as a function of the Faraday rotator crystal length. The centroid wavelength shift at 30° C., for each given crystal length, was calculated relative to the centroid wavelength of the filtered spectrum at 25° C. through the same given crystal length.

FIG. 41B is a graph showing calculated centroid wavelength shift, in parts per million and in nanometers, as a function of Faraday rotator length. The solid line shows the calculated shift for the set of parameters given above, including a broadband source having FWHM of 33 nm. For comparison, the dashed line shows the calculation for a broadband source having FWHM of 70 nm. For the calculations of FIG. 41B, the polarization of the light output from the broadband optical filter including the Faraday rotator and output polarizer was kept constant, consistent with an assumed fixed output polarizer.

The polarization of the broadband source light input to the Faraday rotator was chosen to be at an angle equal to the rotation induced by the crystal of the length in question at the reference temperature (25° C.) and source centroid wavelength (1550 nm). This choice of polarization for the broadband source light may be used to ensure high transmission. The data illustrated graphically in FIG. 41B were then interpolated to determine the Faraday rotator length at which the centroid wavelength shift is zero. In FIG. 41B, for the solid line showing the calculation for FWHM=33 nm, the rotator length at which the centroid wavelength shift is zero is about 1.06775 cm; and for the dashed line showing the calculation for FWHM=70 nm, the rotator length at which the centroid wavelength shift is zero is about 0.664716 cm.

The initial rotator length, determined to be 1.06775 cm for the FWHM=33 nm source and 0.664716 cm for the FWHM=70 nm source, as described in connection with FIG. 41B can be considered to produce minimized thermal sensitivity of the output centroid wavelength. However, consistent with optional procedural element 1608 in FIG. 41A, in this example the rotator length was fine-tuned for further minimized thermal sensitivity of the output centroid wavelength as described hereinafter. The rotator length and the input polarization angle were fine-tuned in order to minimize the absolute centroid shift at both the middle of the temperature range and the extreme of the temperature range (35° C.).

FIG. 42A is a graph illustrating filtered centroid wavelength shift, relative to the centroid wavelength shift at 25° C., determined as a function of input polarization offset angle for 30° C. and 35° C. operating temperatures. It will be understood that the centroid wavelength shift at 25° C. may be considered as a reference, as this is the temperature at which the centroid wavelength shift was defined to be zero, as described above. While the filtered wavelength spectrum at 25° C. is still shifted with respect to the unfiltered spectrum, here this shift is considered to be a baseline reference, and the centroid wavelength shifts at other temperatures in the desired operating range are determined relative to the shift at 25° C.

In FIG. 42A, the centroid wavelength shifts at the two temperatures are illustrated for both the initial rotator length, determined as described above to be 1.06775 cm, and for a fine-tuned rotator length of 1.07055 cm. It will be noted from FIG. 42A that, at −11 degree input polarization offset angle, the absolute centroid wavelength shift at the 30° C. and 35° C. operating temperatures relative to the shift at 25° C. is close to zero for a fine-tuned rotator length of 1.07055 cm. It should be understood that similar calculations for various lengths and temperatures may be made and illustrated similarly as part of determining a fine-tuned rotator length.

The graph of FIG. 42A illustrates that, by fine-tuning the crystal length and choosing an appropriate input polarization angle, centroid wavelength shift can be suppressed at multiple temperatures in a desired operating range (in this case, 25° C., 30° C., and 35° C.). While not shown in FIG. 42A, it will be understood that similar calculations may be made for various other temperatures for the fine-tuned rotator length of 1.07055 cm, or for other lengths, in order to confirm that the chosen length corresponds to a minimized centroid wavelength shift over the entire chosen temperature range.

FIG. 42B is a graph illustrating calculations similar to those of FIG. 42A for an assumed broadband source input spectrum having a FWHM equal to 70 nm. The centroid wavelength shifts at 30° C. and 35° C. relative to the shift at 25° C. are plotted as a function of input polarization offset angle for both an initial and fine-tuned rotator lengths. The initial rotator length of 0.664716 cm was determined by interpolation in a manner similar to that described in connection with FIG. 41B. The fine-tuned rotator length of 0.665262 cm was determined by performing similar calculations repeatedly for various lengths. As will be noted from FIG. 42B, the fine-tuned rotator length of 0.665262 cm, in combination with an input polarization offset angle of about −4 degrees, suppresses centroid wavelength shift for 30° C. and 35° C. operating temperatures relative to the shift at 25° C. for very minimized thermal sensitivity of the centroid over the operating range.

Embodiments Including Birefringent Polarization-Based Filtration

Further described herein are a birefringently filtered, passively centroid wavelength-stabilized broadband light source apparatus and method for delivering output light with output centroid wavelength having minimized thermal sensitivity.

The polarization changer may include a birefringent polarization changer, and the birefringent polarization changer may be a Lyot-type retarder or a Šolc-type retarder pair including a first retarder and a second retarder. The birefringent polarization changer may include a plurality of Lyot-type retarders, a plurality of Šolc-type retarder pairs, or at least one Lyot-type retarder and at least one Šolc-type retarder pair.

Figure 43:
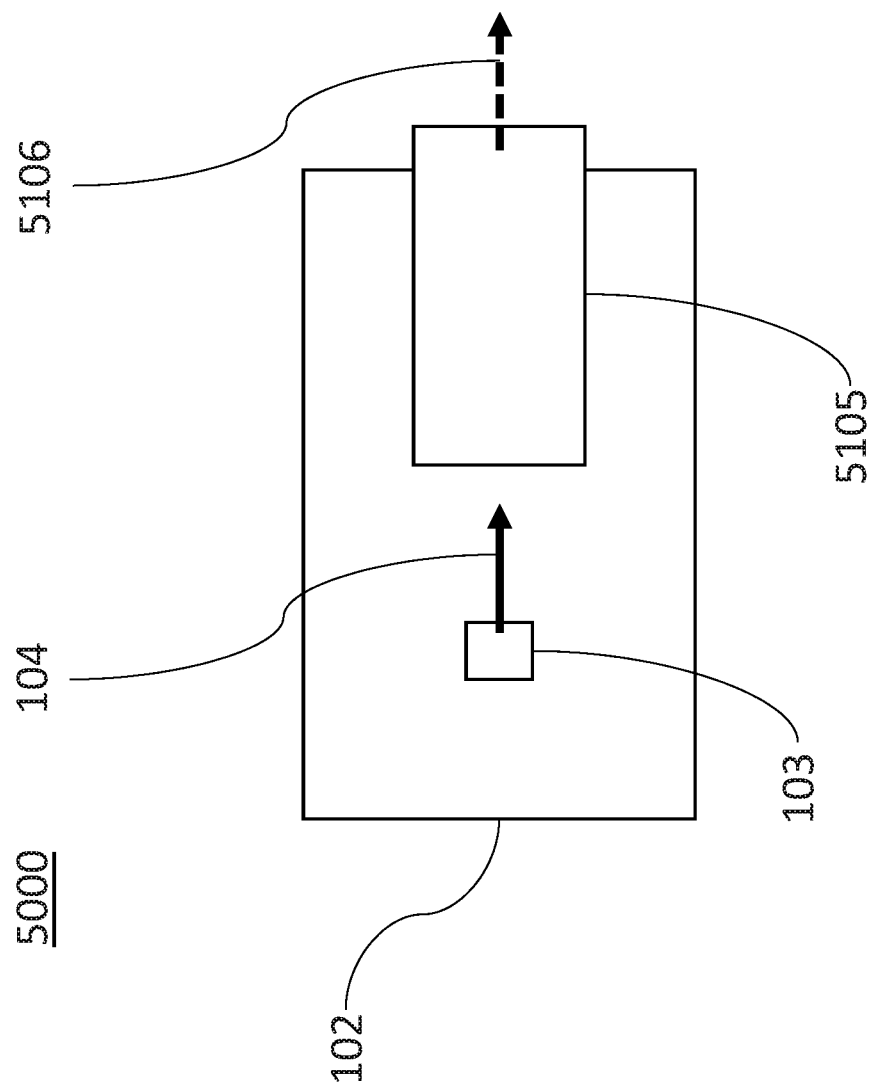
FIG. 43 is a schematic top plan view of a birefringently filtered passively wavelength-stabilized broadband light source apparatus for delivering output light with thermally stabilized centroid wavelength.

FIG. 43 is a schematic top plan view of birefringently filtered passively wavelength-stabilized broadband light source apparatus 5000 for delivering broadband output light 5106 with output centroid wavelength having minimized thermal sensitivity including a mount 102 that serves as a mechanical base for broadband light source 103, such as a superluminescent diode (SLD), rare-earth-doped superluminescent source (REDSLS), or light emitting diode (LED). The emission light 104 (also referred to herein as broadband source light) of the apparatus 5000 is characterized by a temperature-dependent source spectrum (also referred to herein as a source wavelength spectrum). The apparatus 5000 also includes at least one birefringent optical filter 5105 that has a birefringent retarder polarization changer with a length, as well as an exit polarizer. Retarder length is configured to minimize a thermal sensitivity of an output centroid wavelength of broadband output light that is output from the filter, where the broadband output light has a wavelength spectrum.

Configuring the birefringent optical filter 5105 appropriately in view of spectral characteristics of source 103 can particularly result in minimizing thermal sensitivity of the output centroid wavelength of the output wavelength spectra of broadband output light 5106. Some output wavelength spectra, and their variation with ambient temperature, are described hereinafter in connection with elements 5113*a*, *b* and 5116*a*, *b* of FIGS. 45A and 45B, for example. The output wavelength spectrum characterizing the output light 5106 can be optimized such that a variation of an output centroid wavelength with ambient temperature can be minimized, as further described hereinafter. This thermal sensitivity can preferably be within ±50 parts per million per degree C. (ppm/° C.), ±5 ppm/° C., ±0.5 ppm/° C., or ±0.2 ppm/° C. The polarization changer length may be further configured to minimize the thermal sensitivity of the output centroid wavelength over a temperature range of 0.1° C. The polarization changer length may be further configured to minimize the thermal sensitivity of the output centroid wavelength over a temperature range of 1.0° C., 10° C., or 100° C., for example. Furthermore, in some embodiments described hereinafter, filter 5105 may be configured to be characterized by a filter wavelength spectrum or filter wavelength thermal sensitivity that are optimized such that relative integrated output power of output light 5106 is maximized.

Birefringent optical filter 5105 is configured to receive broadband light 104 from source 103 at one side of the filter and to deliver output light 5106 from the opposite side of the filter. The birefringent optical filter may be a bulk optic device, a waveguide device, or a fiber optic device.

Figure 44:
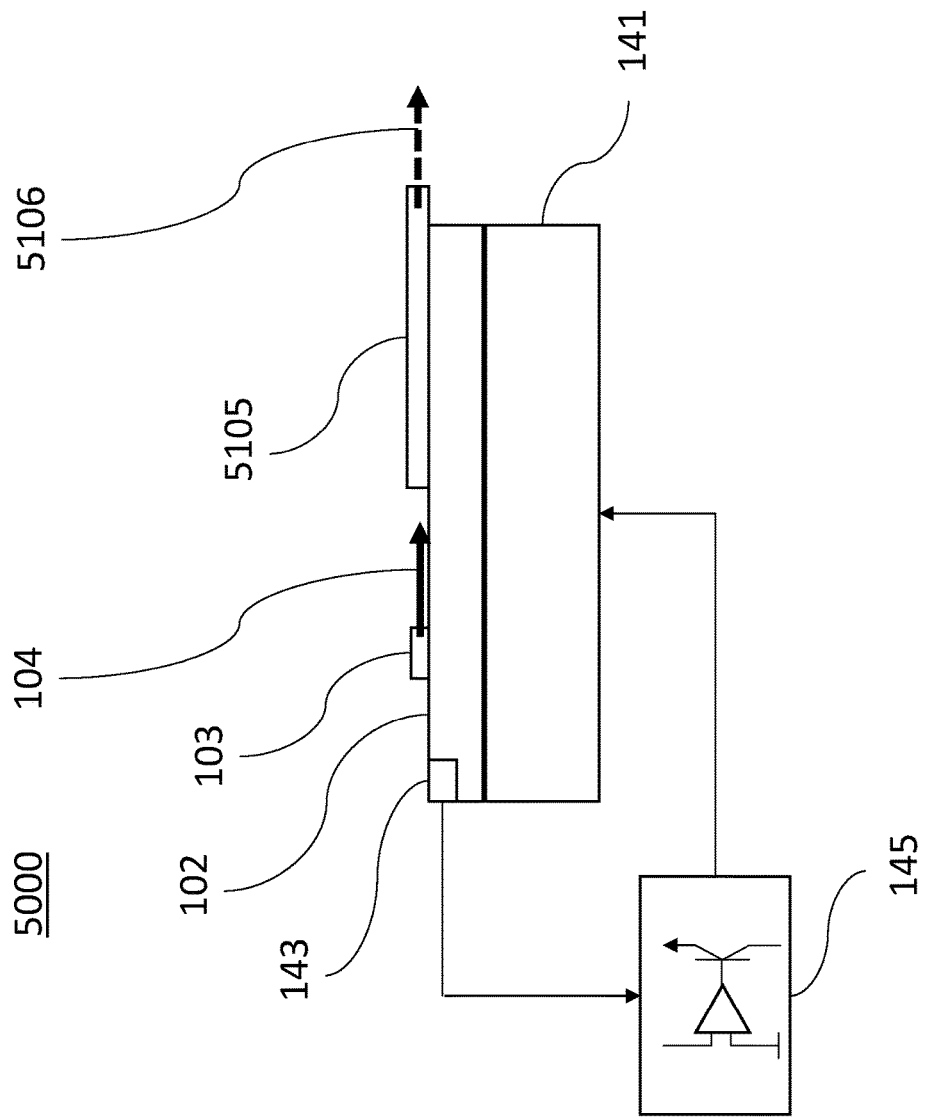
FIG. 44 is a schematic lateral view of the apparatus of FIG. 43 in thermal contact with an active temperature control element according to a preferred embodiment of the present disclosure.

FIG. 44 is a schematic lateral view of birefringently filtered passively wavelength-stabilized light source apparatus 5000. Preferably, mount 102 includes a common temperature stabilizer in thermal contact with both source 103 and birefringent filter 5105 for defining the relative temperature of source 103 and filter 5105 against environmental (ambient) temperature fluctuations in the vicinity of apparatus 5000, or even temperature fluctuations within apparatus 5000. The temperature stabilization may simply be passive. Alternatively, mount 102 may be in thermal contact with an active temperature control device, for example a thermoelectric cooler 141 acting, together with a temperature sensor 143 and a temperature controller 145, as a temperature stabilizer against environmental temperature fluctuations. Active temperature stabilization may, therefore, supplement and be included in any embodiment apparatus described herein.

Figures 45A, 45B:
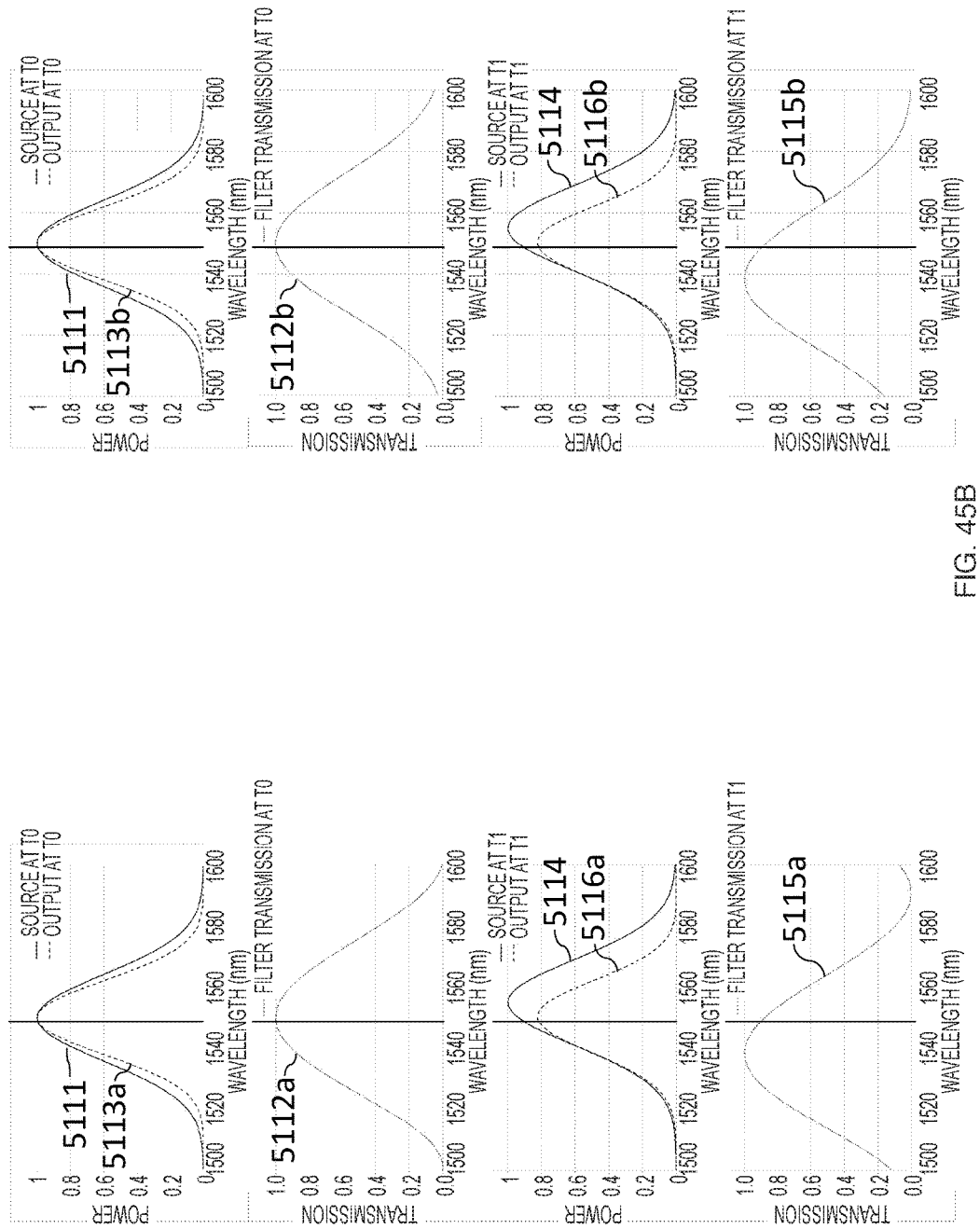
FIG. 45A shows plots of exemplary simulated source, filter transmission, and output spectra for the apparatus shown in FIG. 43 for a birefringent optical filter having configuration to minimize the thermal sensitivity of the output centroid wavelength, wherein the birefringent optical filter is a Lyot-type filter including at least one retarder fabricated from a congruent lithium niobate material.
FIG. 45B shows plots of exemplary simulated source, filter transmission, and output spectra for the apparatus shown in FIG. 43 for a birefringent optical filter having length configured to minimize the thermal sensitivity of the output centroid wavelength, wherein the birefringent optical filter is a Šolc-type filter including two retarders fabricated from congruent lithium niobate material.

FIG. 45A shows exemplary simulated source wavelength spectrum 5111, filter wavelength spectrum 5112*a*, and output wavelength spectrum 5113*a*, determined by the product of the source wavelength spectrum and filter wavelength spectrum, at temperature $T_0$; and exemplary simulated source wavelength spectrum 5114, filter wavelength spectrum 5115*a*, and output wavelength spectrum 5116*a*, determined by the product of the source wavelength spectrum and filter wavelength spectrum, at temperature $T_1$, where $T_1>T_0$, for example greater by 10° C.; for light source apparatus 5000 whereby source wavelength spectra 5111 and 5114 are characterized by Gaussian functions, filter wavelength spectra 5112*a* and 5115*a* are characterized by Lyot-type birefringent optical filter functions, both source wavelength spectrum 5111 and filter wavelength spectrum 5112*a* have a maximum at 1550 nm at $T_0$, and $FWHM_{SOURCE}$ is 33 nm (typical for FOG applications using SLDs or REDSLSs). The thermal sensitivity of the output centroid wavelength of the output wavelength spectra of output light 5106 may be thermally stabilized by configuring the length of the retarder of the Lyot-type birefringent optical filter according to the temperature dependence of its birefringence (in the example of FIG. 45A, a retarder length of 0.29 mm for a retarder fabricated from congruent lithium niobate material having a temperature coefficient of birefringence, or change in birefringence per change in temperature, of $-6\times10^{-5}$/° C. at 1550 nm).

FIG. 45B shows exemplary simulated source wavelength spectrum 5111, filter wavelength spectrum 5112*b*, and output wavelength spectrum 5113*b*, determined by the product of the source wavelength spectrum and filter wavelength spectrum, at temperature $T_0$; and exemplary simulated source wavelength spectrum 5114, filter wavelength spectrum 5115*b*, and output wavelength spectrum 5116*b*, determined by the product of the source wavelength spectrum and filter wavelength spectrum, at temperature $T_1$, where $T_1>T_0$, for example greater by 10° C.; for light source apparatus 5000, wherein source wavelength spectra 5111 and 5114 are characterized by Gaussian functions, filter wavelength spectra 5112*b* and 5115*b* are characterized by Šolc-type birefringent optical filter functions, both source wavelength spectrum 5111 and filter wavelength spectrum 5112*b* have a maximum at 1550 nm at $T_0$, and $FWHM_{SOURCE}$ is 33 nm (typical for FOG applications using SLDs or REDSLSs).

The filter is configured to minimize thermal sensitivity of the output centroid wavelength of the output wavelength spectra of output light 5106 by optimizing the length of the two retarders of the Šolc-type birefringent optical filter according to the temperature dependence of their birefringence (in the example of FIG. 45B, two retarders, each with length of 0.107 mm for retarders fabricated from congruent lithium niobate material having a temperature coefficient of birefringence, or change in birefringence per change in temperature, of $-6\times10^{-5}$/° C. at 1550 nm).

Although the exemplary source and filter spectra shown in FIGS. 45A and 45B depict specific spectral characteristics such as peak wavelength, spectral width and generally spectral shape or functional form, embodiments within the scope of the present disclosure are not limited to any particular set of spectral characteristics.

Figure 46:
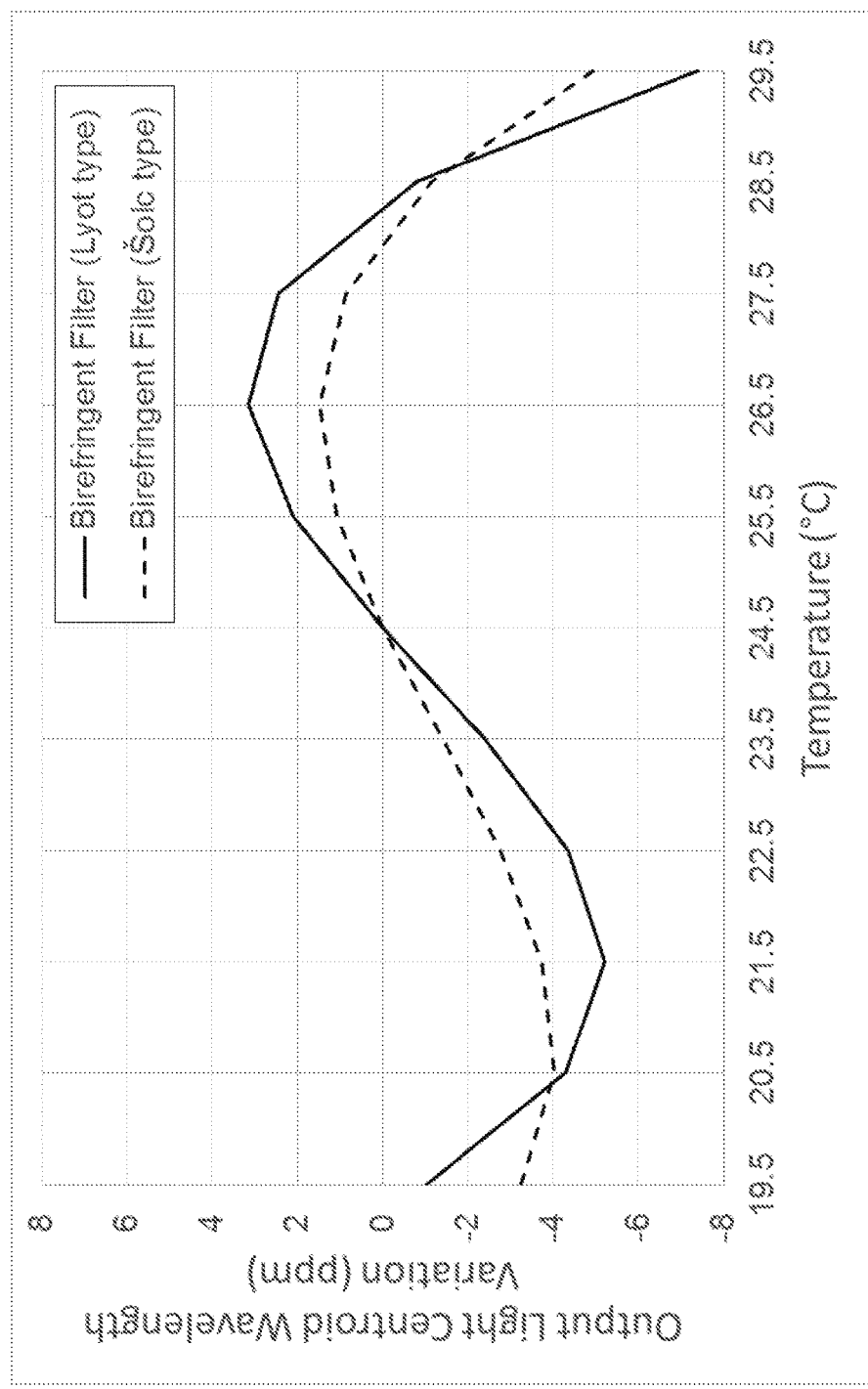
FIG. 46 shows a plot of output centroid wavelength variation with temperature corresponding to the plots shown in FIGS. 45A and 45B.

FIG. 46 shows a plot of centroid output wavelength variation with temperature corresponding to the plots shown in FIGS. 45A and 45B. The maximum variation is within 11 ppm for the Lyot-type filter and within 6 ppm for the Šolc-type filter over the temperature range of 10° C., and the maximum of the minimized thermal sensitivity of the output centroid wavelength of the output wavelength spectra of the output light is only 2 ppm/° C.

Figure 47A:
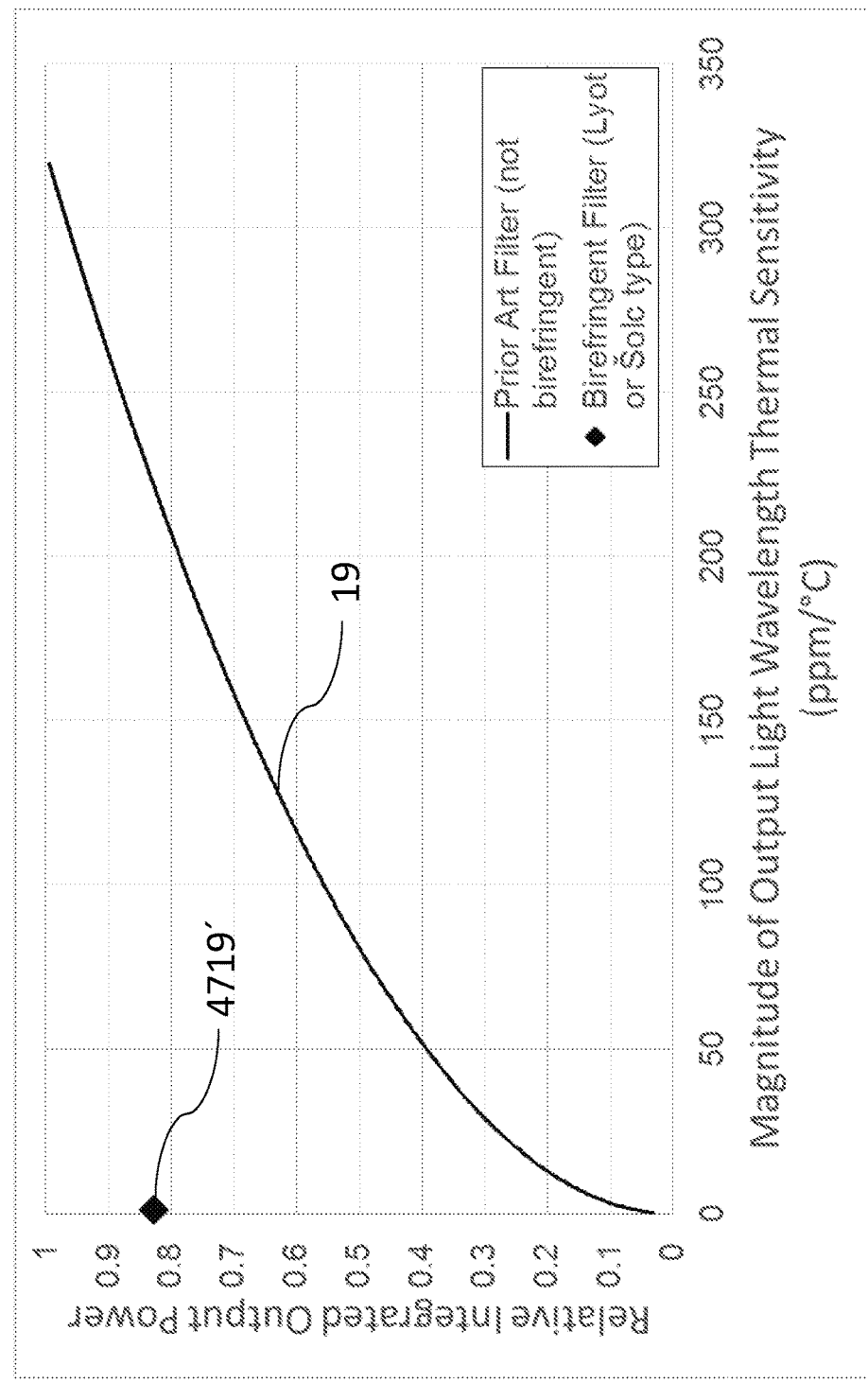
FIG. 47A shows an indication of the relative integrated optical power for the minimized thermal sensitivity of the output centroid wavelength of the output wavelength spectrum of the birefringently filtered output light given the spectra shown in FIGS. 45A and 45B overlaid onto the plot shown in FIG. 29A.

FIG. 47A shows an indication 4719' of the relative integrated optical power value of 0.83, or 83%, averaged over a 10° C. temperature range from +19.5° C. to +29.5° C., for the maximum of the minimized thermal sensitivity of the output centroid wavelength 2 ppm/° C., of birefringently filtered output light 5106 given the wavelength spectra shown in FIGS. 45A and 45B, overlaid onto the plot shown in FIG. 4A. An advantage of embodiments encompassed by the present disclosure is evident from FIG. 47A in that the thermal sensitivity of the output centroid wavelength $\alpha_{OUTPUT}$ of output light 5106 can be minimized while the reduction of relative integrated optical power of output light 5106 is only slightly limited to 83%. This is relatively efficient, specifically about 10 times more efficient than the simulated value of 8% for the prior art for the same thermal sensitivity of the output centroid wavelength.

Figure 47B:
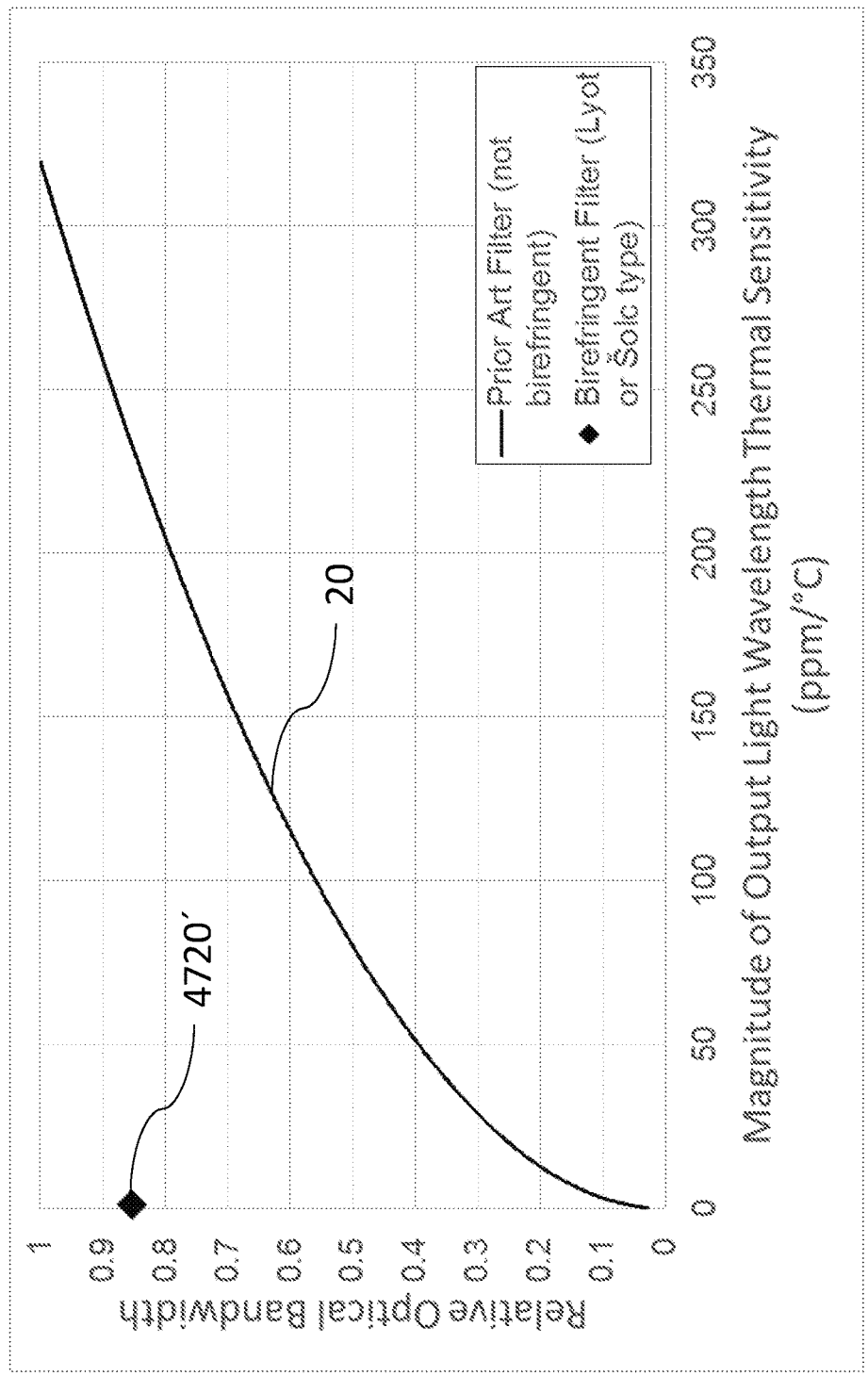
FIG. 47B shows an indication of the relative optical bandwidth for the minimized thermal sensitivity of the output centroid wavelength of the output wavelength spectrum of the birefringently filtered output light given the spectra shown in FIGS. 45A and 45B overlaid onto the plot shown in FIG. 29B.

FIG. 47B shows an indication 4720' of the relative optical bandwidth value of 0.85, or 85%, averaged over a 10° C. temperature range from +19.5° C. to +29.5° C., for the maximum of the minimized thermal sensitivity of the output centroid wavelength 2 ppm/° C., of the birefringently filtered output light 5106 given the spectra shown in FIGS. 45A and B, overlaid onto the plot shown in FIG. 4B. A further advantage of embodiments encompassed by the present disclosure is evident from FIG. 47B in that the thermal sensitivity of the output centroid wavelength $\alpha_{OUTPUT}$ of output light 5106 can be minimized while the reduction of relative optical bandwidth is only slightly limited to 85%, which is relatively efficient, specifically about 10 times more efficient than the simulated value of 8% for the prior art for the same thermal sensitivity of the output centroid wavelength.

Figure 48A:
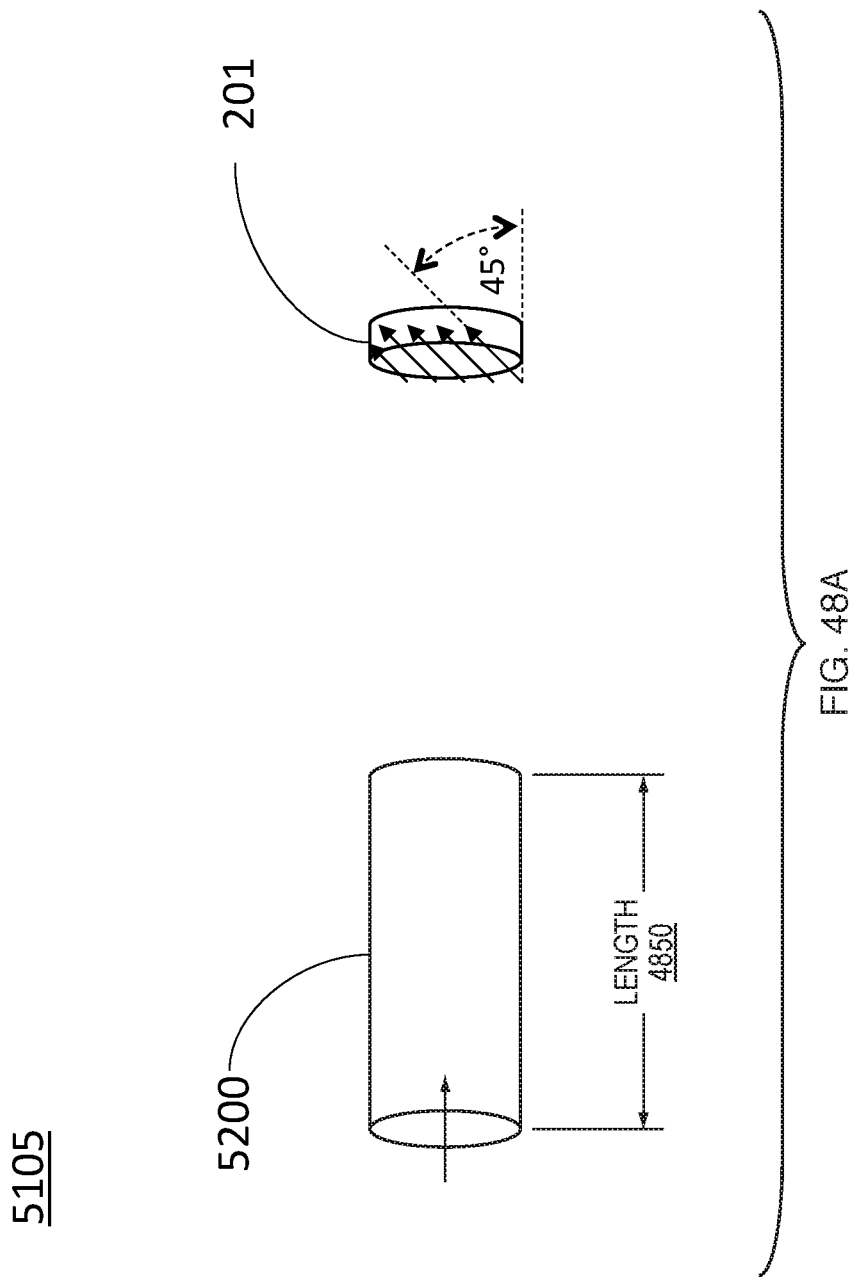
FIG. 48A shows a detail view of an embodiment of the birefringent optical filter of FIG. 43, wherein the birefringent optical filter is a Lyot-type filter.

FIG. 48A shows a detail view of an embodiment of birefringent optical filter 5105 shown in FIG. 43, whereby the birefringent optical filter is a Lyot-type filter. Birefringent optical filter 5105 includes at least one retarder 5200 and at least one exit polarizer 201. Retarder 5200 and exit polarizer 201 may have a gap between them. Alternatively retarder 5200 and exit polarizer 201 may be glued, cemented, or bonded together. The azimuth angle between the fast axis of retarder 5200 and the polarization axis of the exit polarizer 201 is 45°.

FIG. 48B shows a detail view of an embodiment of birefringent optical filter 5105' shown in FIG. 43, whereby the birefringent optical filter is a Šolc-type filter. Birefringent optical filter 5105' includes first retarder 5200', second retarder 5200", and at least one exit polarizer 201, whereby the azimuth angle between the fast axis of first retarder 200' and the polarization axis of exit polarizer 201 is 22.5°, the azimuth angle between the fast axis of second retarder 5200" and the fast axis of first retarder 5200' is 45°, and first retarder 5200' and second retarder 5200" are identical with respect to material and length.

The retarder, retarder pair, or plurality of retarders or retarder pairs of the birefringent optical filter may be fabricated from a birefringent material having a nonzero temperature coefficient of birefringence, including but not limited to congruent or stoichiometric lithium niobate, calcite, quartz, magnesium fluoride, ruby, rutile, sapphire, silicon carbide, tourmaline, paratellurite, zircon, YVO$_4$, and PbMoO$_4$.

Birefringent optical filters of embodiments may include a plurality of Lyot-type filters, a plurality of Šolc-type filters, or a plurality including both Lyot-type filters and Šolc-type filters. The broadband filter wavelength spectrum can be at least 5 nm in width. Width may be measured or calculated using the full width at half maximum (FWHM) method.

FIGS. 49A and 49B illustrate the principle of operation for birefringent optical filter 5105 of FIG. 48A. FIG. 49A shows the detail view of birefringent optical filter 5105 of FIG. 48A overlaid onto the exemplary simulated source spectrum 5111 and output spectrum 114a of FIG. 45A. FIG. 49B shows the detail view of birefringent optical filter 5105 of FIG. 48A overlaid onto the exemplary simulated source wavelength spectrum 113 and output wavelength spectrum 5116a of FIG. 45A. Retarder 5200 of birefringent optical filter 5105 receives broadband source light at one side. For temperature T$_0$ as shown in FIG. 49A and T$_1$ as shown in FIG. 49B, the broadband source light is spectrally characterized as 5111 and 5114, respectively, and is linearly polarized throughout its spectrum as indicated by the vertical arrows.

In FIGS. 49A and B, retarder 5200 transmits broadband light, spectrally characterized as 5111' and 5114', at the other side without changing the source spectrum, but imparting a wavelength-dependent retardance, as indicated by the varyingly elliptical arrows, that also depends on temperature. Exit polarizer 201 then receives the retarded broadband light at one side and transmits filtered broadband light, spectrally characterized as 5113a and 5116a, at the other side that is linearly polarized, thereby exiting the birefringent optical filter. The filtering is effected because the broadband light transmitted by retarder 5200 has wavelength-dependent retardance so the wavelength-dependent transmission is determined by $$\tau(\lambda, T) = \prod_{i=1}^{N} \cos^2\left[2^{2N-1} \cdot \frac{1}{2}\Gamma_{Lyot}(\lambda, T)\right] \text{ with}$$

$$\Gamma_{Lyot}(\lambda, T) = \beta(\lambda, T)d\frac{2\pi}{\lambda}$$

where ($\lambda$,T) indicates wavelength $\lambda$ dependence and temperature T dependence, $\tau(\lambda,T)$ is transmission, $\Gamma_{Lyot}(\lambda,T)$ is the retardance of the first Lyot filter stage, $\beta(\lambda,T)$ is the birefringence, d is the length of the retarder of the first Lyot filter stage for which i=1, and N is the number of cascaded Lyot filter stages whereby the retarder in each subsequent Lyot filter stage has double the length of its predecessor, as known in the art.

By careful design of the length of retarder 5200 for a given set of source spectrum, thermal sensitivity of source centroid wavelength, retarder birefringence, and retarder temperature coefficient of birefringence, the spectral characteristics of birefringent filter 5105 are optimized to minimize thermal sensitivity of the output centroid wavelength to the values indicated hereinabove FIGS. 50A and 50B illustrate the principle of operation for birefringent optical filter 5105' of FIG. 48B. FIG. 50A shows the detail view of birefringent optical filter 5105' of FIG. 48B overlaid onto the exemplary simulated source wavelength spectrum 5111 and output wavelength spectrum 114b of FIG. 45B. FIG. 50B shows the detail view of birefringent optical filter 5105' of FIG. 48B overlaid onto the exemplary simulated source wavelength spectrum 113 and output wavelength spectrum 5116b of FIG. 45B. Retarders 5200' and 5200" of birefringent optical filter 5105' receives broadband source light at one side. For temperature T$_0$ as shown in FIG. 50A and T$_1$ as shown in FIG. 50B, the broadband source light is spectrally characterized as 5111 and 5114, respectively, and is linearly polarized throughout its spectrum as indicated by the vertical arrows.

In FIGS. 50A and 50B, retarders 5200' and 5200" transmit broadband light, spectrally characterized as 111" and 5114", at the other side without changing the source spectrum, but imparting a wavelength-dependent retardance, as indicated by the varyingly elliptical arrows, that also depends on temperature. Exit polarizer 201 then receives the retarded broadband light at one side and transmits filtered broadband light, spectrally characterized as 5113b and 5116b, at the other side that is linearly polarized, thereby exiting the birefringent optical filter. The filtering is effected because the broadband light transmitted by retarders 5200' and 5200" has wavelength-dependent retardance so the wavelength-dependent transmission is determined by $$\tau(\lambda, T) = \left|\tan(2\rho)\cos[\chi(\lambda, T)]\frac{\sin[N\chi(\lambda, T)]}{\sin[\chi(\lambda, T)]}\right|^2 \text{ with}$$

$$\cos[\chi(\lambda, T)] = \cos(2\rho)\cos\left[\frac{1}{2}\Gamma_{\check{S}olc}(\lambda, T)\right]$$

where ($\lambda$,T) indicates wavelength $\lambda$ dependence and temperature T dependence, $\tau(\lambda,T)$ is transmission, $\Gamma_{\check{S}olc}(\lambda,T)$ is the retardance, $\rho$ is the azimuth angle, $\chi(\lambda,T)$ is a variable, and N is the number of retarders, as known in the art.

By careful design of the length of retarders 5200' and 5200" for a given set of source wavelength spectrum, thermal sensitivity of source centroid wavelength, retarder birefringence, and retarder temperature coefficient of birefringence, the spectral characteristics of birefringent filter 5105' are optimized to minimize output centroid wavelength variation with temperature, for example preferably to within ±50 ppm variation over an ambient temperature range of 10° C.; and more preferably to within ±5 ppm variation over an ambient temperature range of 10° C.

Figure 51A:
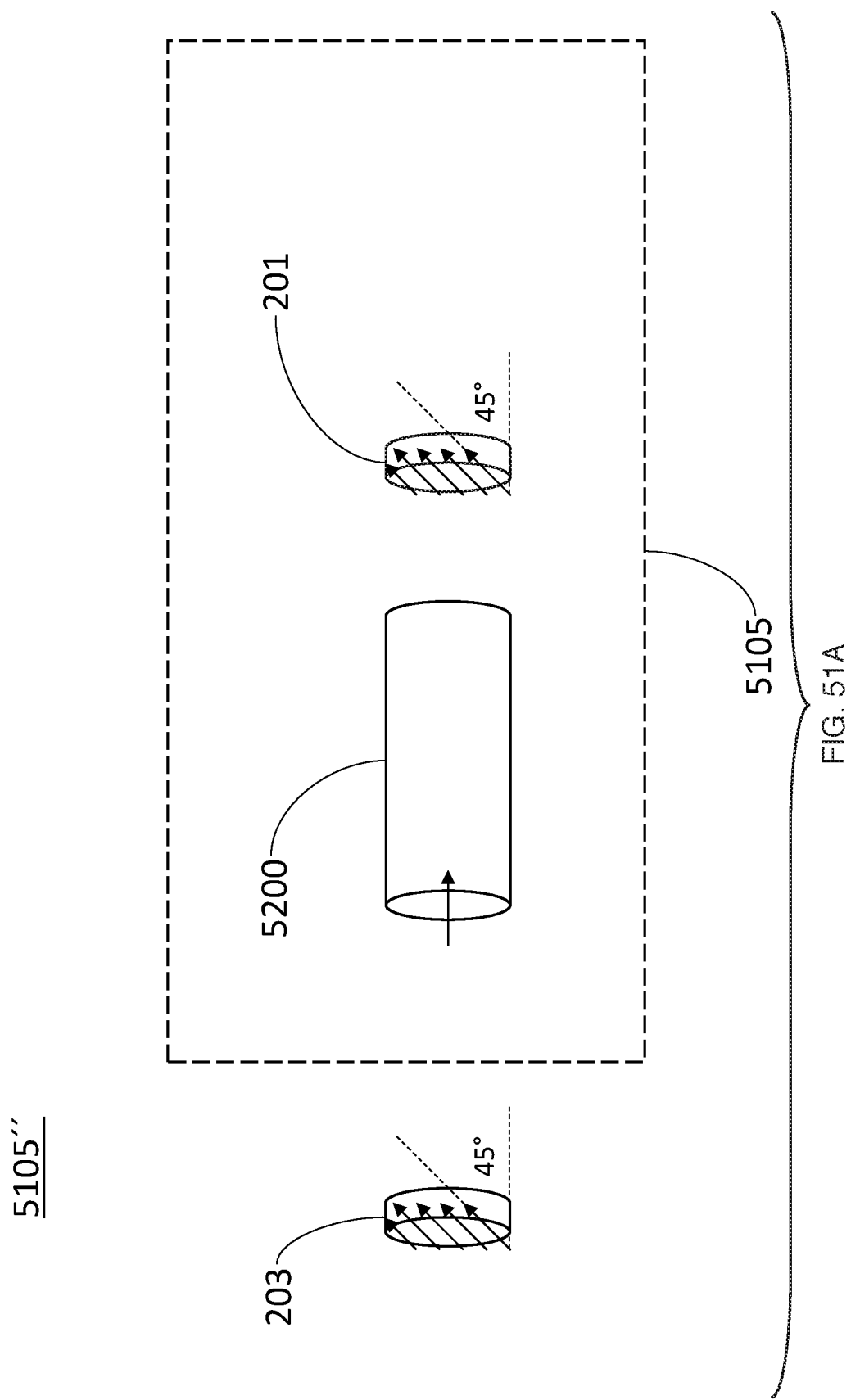

FIG. 51A shows a detail view of another specific embodiment birefringent optical filter 5105". Birefringent optical filter 5105" includes the basic elements of birefringent optical filter 5105 illustrated in FIG. 43, and FIG. 48A, combined with an entrance polarizer 203. The addition of entrance polarizer 203 is particularly useful to increase the degree of polarization (DOP) of the light entering retarder 5200 in the case where the source light does not inherently have adequate DOP to achieve the desired characteristics for the output light.

FIG. 51B shows a detail view of another embodiment birefringent optical filter 5105'". Birefringent optical filter 5105'" includes the basic elements of birefringent optical filter 5105', further combined with entrance polarizer 203. The addition of entrance polarizer 203 is particularly useful to increase the degree of polarization (DOP) of the light entering retarder 5200' in the case where the source light does not inherently have adequate DOP to achieve the desired characteristics for the output light.

As described hereinabove, embodiment methods can include optimizing a birefringent optical filter to minimize variation of an output wavelength spectrum with temperature for a broadband optical light source apparatus. Modeling and computation techniques can assist in configuring the birefringent optical filter parameters to be optimum. Methods similar to the modelling process described hereinabove for embodiments with magneto-optical filtering may be used for embodiments with birefringent optical filtering.

Figure 52:
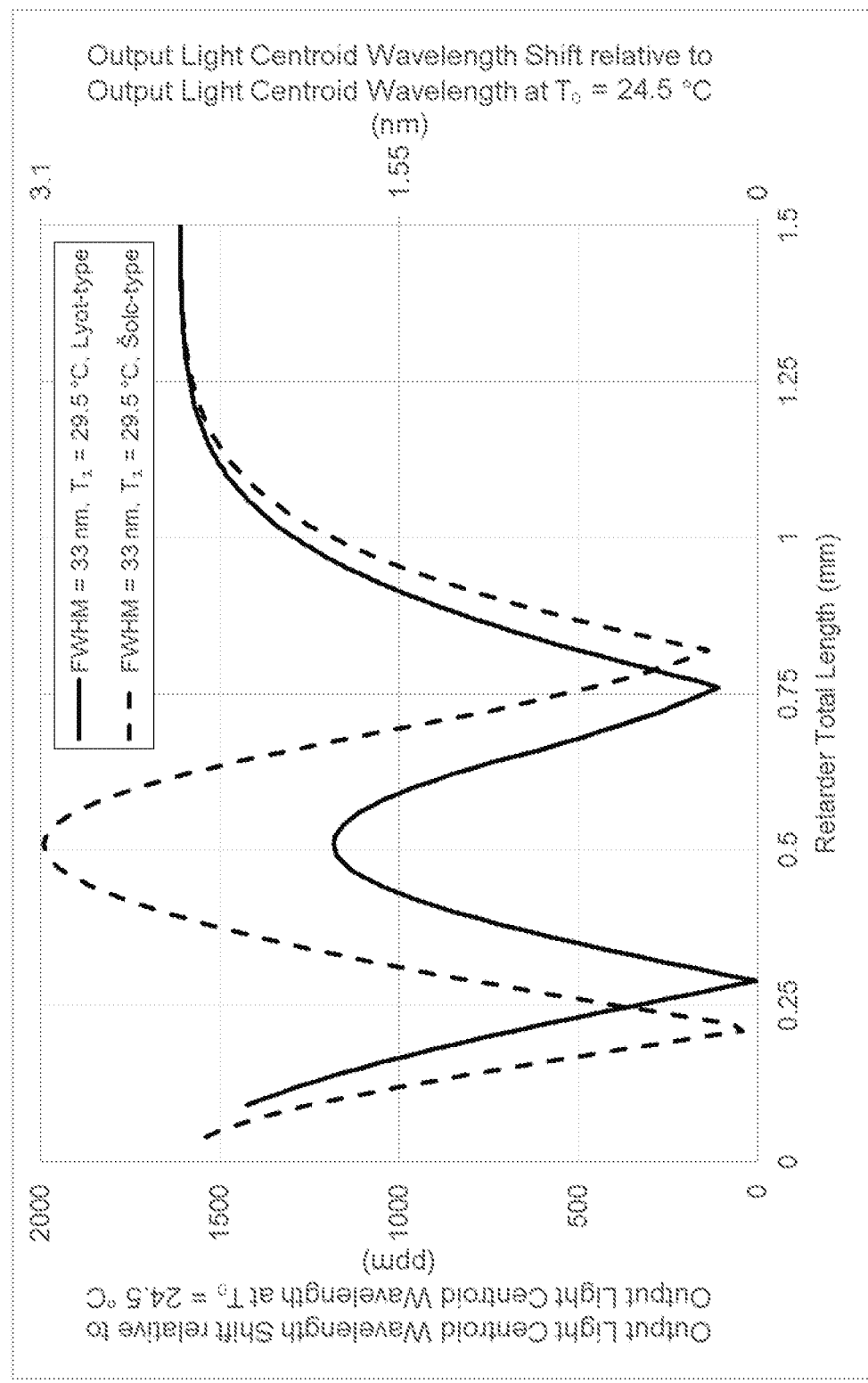
FIG. 52 is a graph showing calculated centroid shift, in parts per million and in nanometers, as a function of birefringent optical filter retarder total length at 24.5° C.

In particular, FIG. 52 is a graph showing calculated centroid wavelength shift, in parts per million and in nanometers, as a function of birefringent optical filter retarder total length at 24.5° C. Similar to the optimization process described above in connection with FIGS. 41A-41B and 42A-42B, points in the graph of FIG. 52 corresponding to low output centroid wavelength shift at 24.5° C. may be initially selected for initial minimizing of centroid wavelength shift.

After initial selection, the retarder length and the input polarization angle may be optionally fine-tuned in order to minimize the absolute centroid wavelength shift at multiple points in the desired range of ambient operating temperatures, such as at a middle of the temperature range (e.g., 30° C.) and an extreme of the temperature range (e.g., 35° C.). Similar to the analysis in relation to FIGS. 42A-42B, a retarder length may be selected that minimizes the absolute centroid shift for multiple points in the desired range of ambient operating temperatures.

Figure 53:
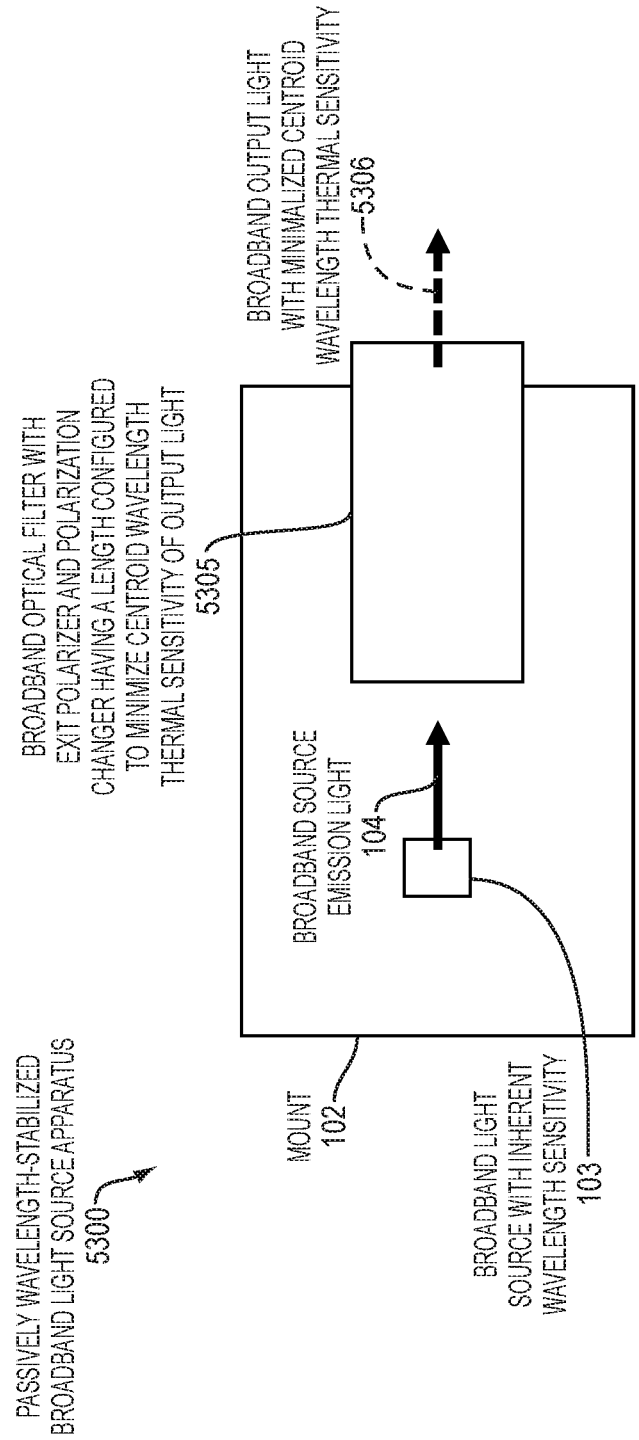
FIG. 53 is a schematic top plan view of an embodiment polarization-filtering-based, passively wavelength-stabilized broadband light source apparatus for delivering output light with output centroid wavelength having minimized thermal sensitivity.

FIG. 53 is a schematic top plan view of an embodiment polarization-filtering-based, passively wavelength-stabilized broadband light source apparatus 5300. The apparatus 5300 includes the broadband light source 103, delivering broadband source emission light 104, as in embodiments described above. The apparatus 5300 further includes a broadband optical filter 5305 with a polarization changer and exit polarizer (not shown in detail in FIG. 53; described in connection with FIG. 35, for example). The polarization changer may be a magneto-optical polarization changer, as described in connection with FIG. 30, for example, or a birefringent retarder, as described in connection with FIG. 43, for example. The polarization changer has a length that is configured to minimize a thermal sensitivity of a centroid wavelength of broadband output light 5306 output from the filter 5305. The polarization changer length may be configured using any of the embodiment methods described herein.

In a further embodiment, more generally, a broadband light source apparatus includes any means described herein, or its equivalent, for providing broadband source light characterized by a source wavelength spectrum. The apparatus further includes any means described herein, or its equivalent, for receiving the broadband source light at a polarization changer having a polarization changer length. The apparatus also includes any means described herein, or its equivalent, for delivering the broadband source light as filtered, broadband output light characterized by an output wavelength spectrum having an output centroid wavelength. The apparatus also includes any means described herein, or its equivalent, for using the polarization changer length to minimize a thermal sensitivity of the output centroid wavelength.

The invention has been described in detail with particular reference to certain preferred embodiments thereof, but it will be understood that variations and modifications can be effected within the scope of the invention as described above by a person of ordinary skill in the art without departing from the scope of the invention.

While this invention has been particularly shown and described with references to example embodiments thereof, it will be understood by those skilled in the art that various changes in form and details may be made therein without departing from the scope of the invention encompassed by the appended claims.

The teachings of all patents, published applications and references cited herein are incorporated by reference in their entirety.

What is claimed is:

1. A broadband light source apparatus comprising:
    a broadband light source configured to provide broadband source light characterized by a source wavelength spectrum having a source centroid wavelength with a thermal sensitivity having a sign; and
    a broadband optical filter including a polarization changer and an exit polarizer, the broadband optical filter characterized by a filter wavelength spectrum having a thermal sensitivity with a sign, the polarization changer having a polarization changer length, the broadband optical filter configured to receive the source light and to deliver broadband output light characterized by an output wavelength spectrum having an output centroid wavelength, the output wavelength spectrum being a function of the source wavelength spectrum and the polarization changer length,
    wherein the sign of the thermal sensitivity of the source centroid wavelength is opposite the sign of the thermal sensitivity of the filter wavelength spectrum, and
    wherein the polarization changer length is configured to minimize a thermal sensitivity of the output centroid wavelength.

2. The apparatus of claim 1, wherein the polarization changer length is further configured to minimize the thermal sensitivity of the output centroid wavelength to within ±5 ppm/° C.

3. The apparatus of claim 2, wherein the polarization changer length is further configured to minimize the thermal sensitivity of the output centroid wavelength to within ±0.5 ppm/° C.

4. The apparatus of claim 3, wherein the polarization changer length is further configured to minimize the thermal sensitivity of the output centroid wavelength to within ±0.2 ppm/° C.

5. The apparatus of claim 1, wherein the polarization changer length is further configured to minimize the thermal sensitivity of the output centroid wavelength over a temperature range of 10° C.

6. The apparatus of claim 1, further including an entrance polarizer configured to polarize the source light for receipt by the broadband optical filter, the entrance polarizer being set to a polarization offset angle to minimize the thermal sensitivity of the output centroid wavelength.

7. The apparatus of claim 1, wherein the polarization changer is a magneto-optical polarization changer comprising at least one Faraday rotator.

8. The apparatus of claim 1, wherein the polarization changer is a birefringent polarization changer.

9. The apparatus of claim 1, wherein the broadband optical filter is a bulk optic filter, a waveguide filter, or a fiber optic filter.

10. A fiber-optic gyroscope (FOG) including the broadband light source apparatus of claim 1, the FOG further including a coil of optical fiber and an optical coupling configured to couple the broadband output light into the coil of optical fiber.

11. A method for optimizing broadband light, the method comprising:
provided broadband source light characterized by a source wavelength spectrum having a source centroid wavelength with a thermal sensitivity having a sign;
configuring a broadband optical filter to include a polarization changer and an exit polarizer, the polarization changer having a polarization changer length, and the broadband optical filter characterized by a filter wavelength spectrum having a thermal sensitivity with a sign, wherein the sign of the thermal sensitivity of the source centroid wavelength is opposite the sign of the thermal sensitivity of the filter wavelength spectrum;
configuring the broadband optical filter to receive the source light and to deliver broadband output light characterized by an output wavelength spectrum having an output centroid wavelength, the output wavelength spectrum being a function of the source wavelength spectrum and the polarization changer length; and
configuring the polarization changer length to minimize a thermal sensitivity of the output centroid wavelength.

12. The method of claim 11, wherein configuring the polarization changer length to minimize a thermal sensitivity of the output centroid wavelength includes configuring the polarization changer length to minimize the sensitivity to within ±5 ppm/° C.

13. The method of claim 12, wherein configuring the polarization changer length to minimize a thermal sensitivity of the output centroid wavelength includes configuring the polarization changer length to minimize the sensitivity to within ±0.5 ppm/° C.

14. The method of claim 13, wherein configuring the polarization changer length to minimize a thermal sensitivity of the output centroid wavelength includes configuring the polarization changer length to minimize the sensitivity to within ±0.2 ppm/° C.

15. The method of claim 12, wherein configuring the polarization changer length to minimize a thermal sensitivity of the output centroid wavelength includes configuring the polarization changer length to minimize the sensitivity over a temperature range of 10° C.

16. The method of claim 11, further including configuring an entrance polarizer to polarize the source light for receipt by the broadband optical filter with a polarization offset angle to minimize the thermal sensitivity of the output centroid wavelength.

17. The method of claim 11, wherein configuring the broadband optical filter to include a polarization changer includes using a magneto-optical polarization changer comprising at least one Faraday rotator.

18. The method of claim 11, wherein configuring the broadband optical filter to include a polarization changer includes using a birefringent polarization changer.

19. The method of claim 11, wherein configuring the broadband optical filter includes using a bulk optic filter, a waveguide filter, or a fiber optic filter.

20. The method of claim 11, wherein providing the broadband source light includes providing light from at least one of an SLD, a REDSLS, and a LED.

21. A method of optimizing a FOG, the method comprising:
optimizing broadband light according to the method of claim 11; and
optically coupling the broadband output light into a coil of optical fiber of a FOG.

22. A broadband light source apparatus comprising:
means for providing broadband source light characterized by a source wavelength spectrum having a source centroid wavelength with a thermal sensitivity having a sign;
means for receiving the broadband source light at a polarization changer having a polarization changer length, the broadband optical filter characterized by a filter wavelength spectrum having a thermal sensitivity with a sign, wherein the sign of the thermal sensitivity of the source centroid wavelength is opposite the sign of the thermal sensitivity of the filter wavelength spectrum;
means for delivering the broadband source light as filtered, broadband output light characterized by an output wavelength spectrum having an output centroid wavelength; and
means for minimizing a thermal sensitivity of the output centroid wavelength using the polarization changer length.

* * * * *